United States Patent

Haas, Sr. et al.

[11] Patent Number: 5,955,129
[45] Date of Patent: Sep. 21, 1999

[54] DEVICE AND METHOD FOR PRODUCING BAKED, THIN-WALLED MOLDED ARTICLES

[75] Inventors: Franz Haas, Sr.; Franz Haas, Jr., both of Vienna; Johann Haas, Klosterneuburg; Erich Koletnik, Klosterneuburg/Kierling, all of Austria

[73] Assignee: Franz Haas Waffelmaschinen Industriegesellschaft m.b.H., Vienna, Austria

[21] Appl. No.: 08/859,283

[22] PCT Filed: Nov. 16, 1995

[86] PCT No.: PCT/AT95/00220

§ 371 Date: Apr. 19, 1997

§ 102(e) Date: Apr. 19, 1997

[87] PCT Pub. No.: WO96/14750

PCT Pub. Date: May 23, 1996

[30] Foreign Application Priority Data

| Nov. 16, 1994 | [AT] | Austria | 2121/94 |
| Nov. 16, 1994 | [AT] | Austria | 2122/94 |
| Nov. 16, 1994 | [AT] | Austria | 2123/94 |
| Nov. 16, 1994 | [AT] | Austria | 2124/94 |
| Nov. 15, 1995 | [AT] | Austria | 1871/95 |

[51] Int. Cl.$^6$ .............. A47J 37/01; A21B 1/46; A21B 5/02; A21C 11/00
[52] U.S. Cl. .............. 426/231; 99/353; 99/372; 99/380; 99/427; 99/450.6; 99/450.7; 426/94; 426/283; 426/496
[58] Field of Search ............ 99/353–355, 372–380, 99/381, 384, 426–428, 439, 450.6, 443 C, 450.7, 443 R; 249/166, 168; 425/451.9, 595, 451.5, DIG. 221; 292/256.72, 304, 210; 426/231–233, 94, 283, 284, 496

[56] References Cited

U.S. PATENT DOCUMENTS

| 3,793,938 | 2/1974 | Haas ........................... 99/450.6 |
| 3,867,559 | 2/1975 | Haas ........................... 426/283 |
| 4,308,790 | 1/1982 | Haas, Sr. et al. ........... 99/380 |
| 4,417,508 | 11/1983 | Haas, Sr. et al. ........... 99/355 |
| 4,550,655 | 11/1985 | Haas, Sr. et al. ........... 99/450.7 X |
| 4,953,453 | 9/1990 | Haas, Sr. et al. ........... 99/373 |
| 4,957,754 | 9/1990 | Munk et al. ................. 426/94 X |
| 5,032,413 | 7/1991 | Haas et al. .................. 426/231 |
| 5,048,403 | 9/1991 | Haas, Sr. et al. ........... 99/355 |
| 5,103,717 | 4/1992 | Haas, Sr. et al. ........... 99/353 |
| 5,194,272 | 3/1993 | Munk et al. ................. 426/94 |
| 5,201,403 | 4/1993 | Haas, Sr. et al. ........... 198/575 |
| 5,463,939 | 11/1995 | Kolethik et al. ............. 99/373 X |

*Primary Examiner*—Timothy F. Simone
*Attorney, Agent, or Firm*—Herbert L. Lerner; Laurence A. Greenberg; Werner H. Stemer

[57] ABSTRACT

Disclosed are devices and processes for producing baked thin-walled shaped articles from baking or pouring mixtures which expand during the baking process. The bottom half (18) of a baking mold (16) for producing thin-walled shaped articles is accommodated in the bottom tongs section (13) of a pair of baking tongs (7) and the top half (17) of the baking mold is accommodated in the top tongs section (15) of the tongs (7). The mold halves (17, 18) and tongs sections (13, 15) are provided with stop surfaces (68c, 64d) and sealing surfaces (17a, 18a, 21a, 22a) and are in mutual contact when the baking mold (16) is closed. At least one clamp device (30, 31) is provided to press the mold halves (17, 18, 21, 22) of the closed baking mold (16) together; said clamp device forces at least the two mold halves (17, 18) of the closed baking mold (16) together with a predetermined clamping force during clamping and eliminates at least the play between them. The upper tongs section (15) of the baking tongs (7) can be guided via a lateral guide strut (14) in the lower tongs section (13). With baking tongs which have two-part dies in the lower tongs section, mechanisms can be provided between the baking tongs in the tongs chain in the baking oven to open or close the dies when passing a deviation in the chain.

55 Claims, 33 Drawing Sheets

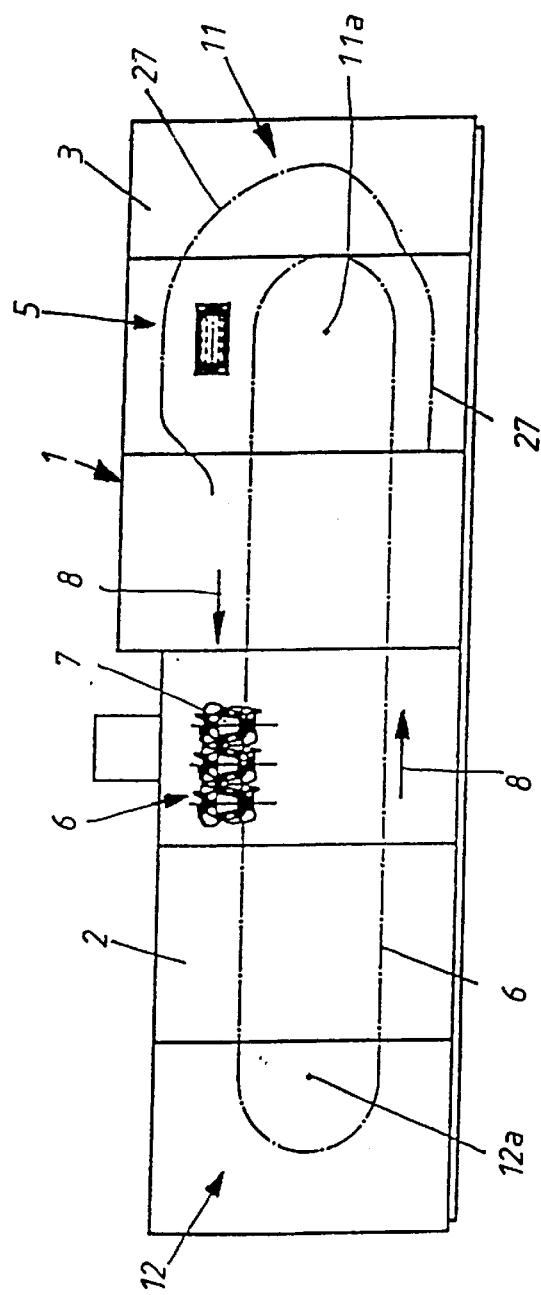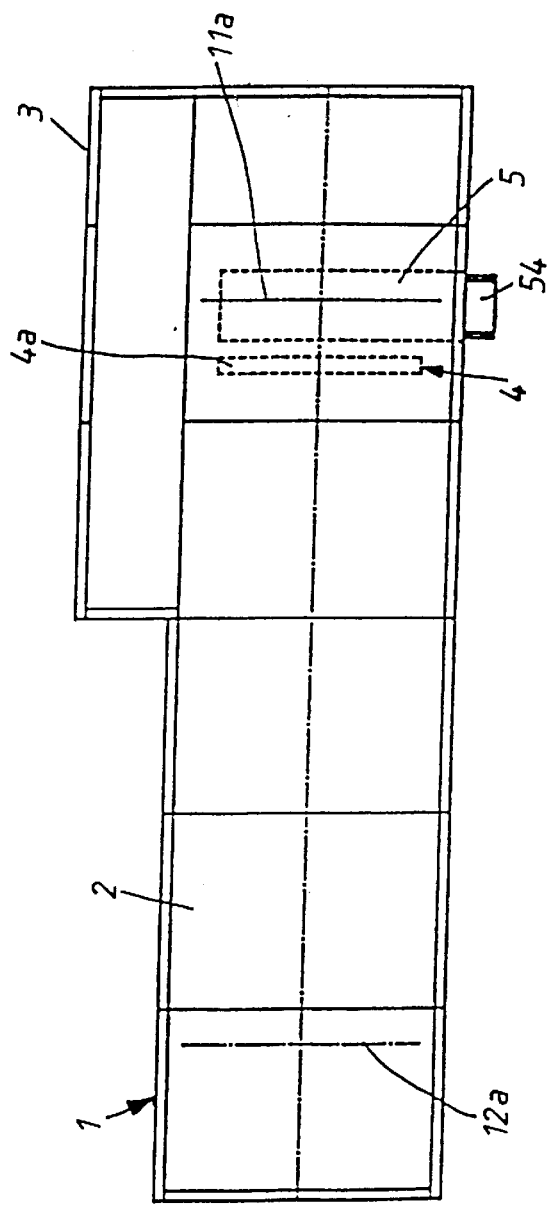
FIG. 1
FIG. 2

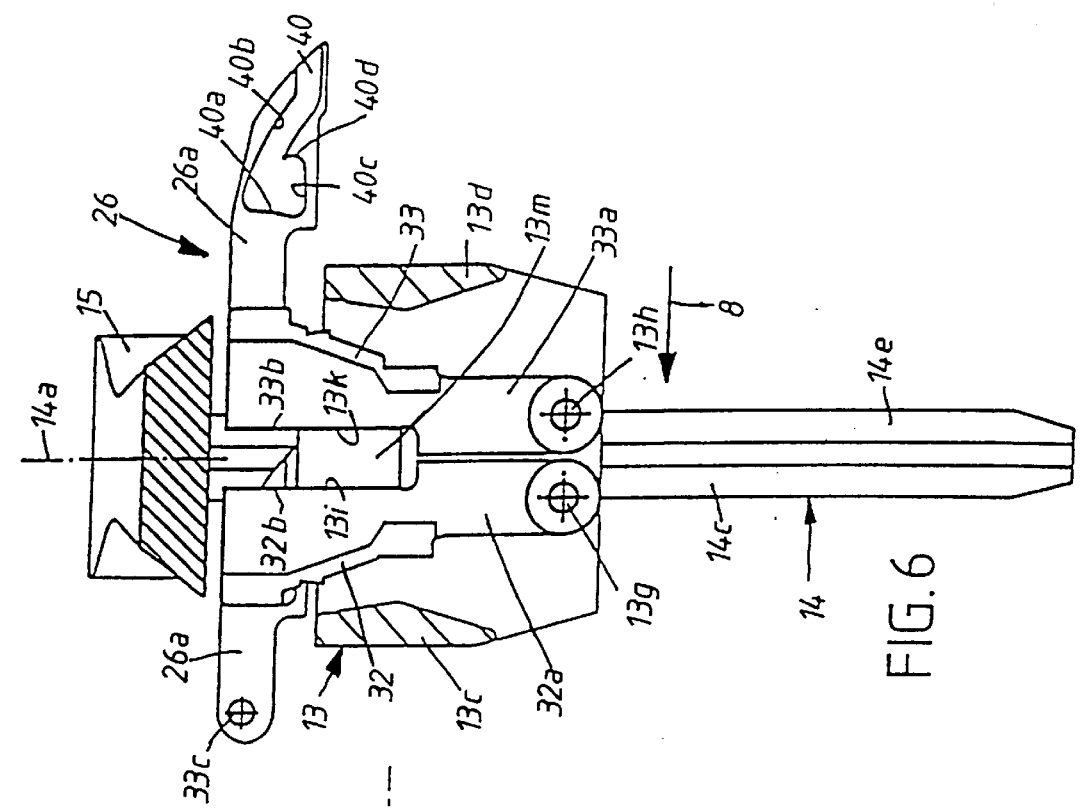
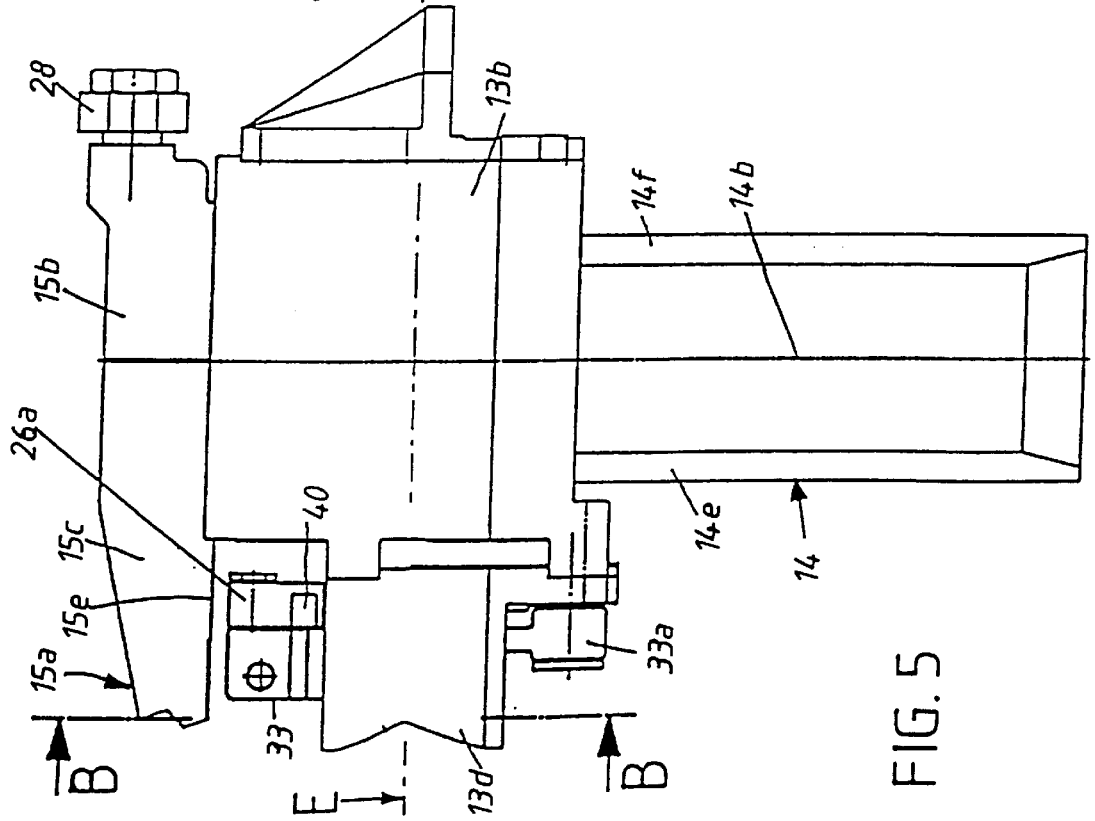
FIG. 6
FIG. 5

FIG.18
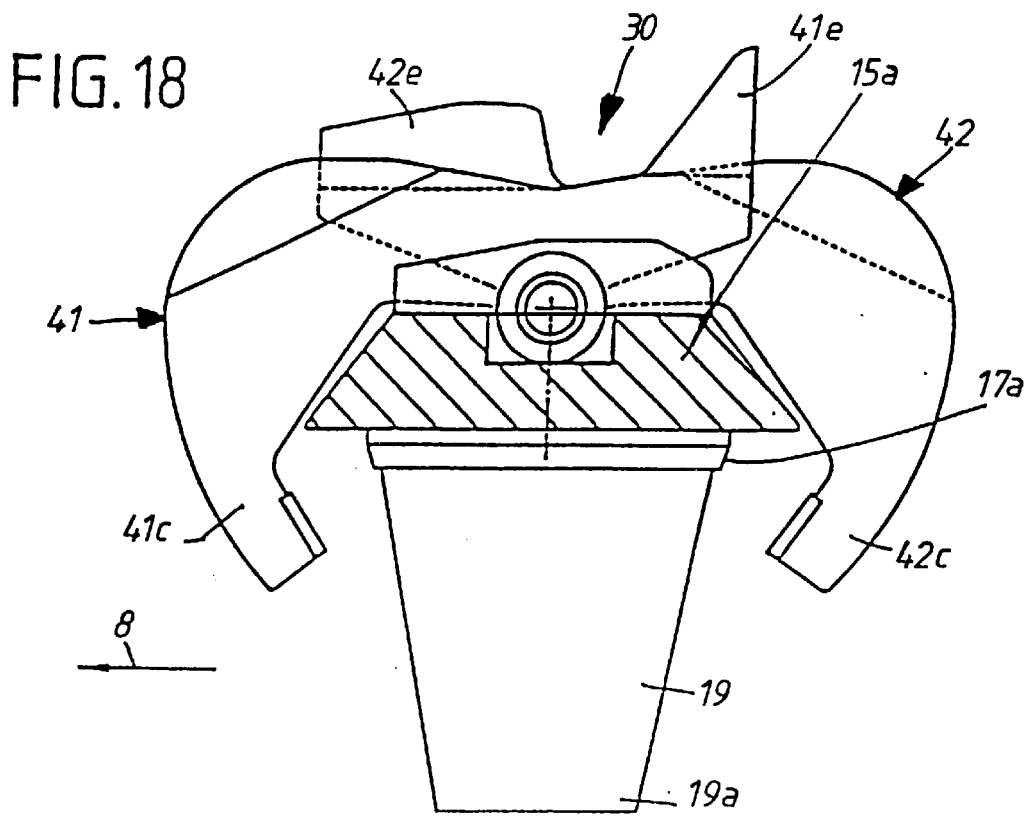
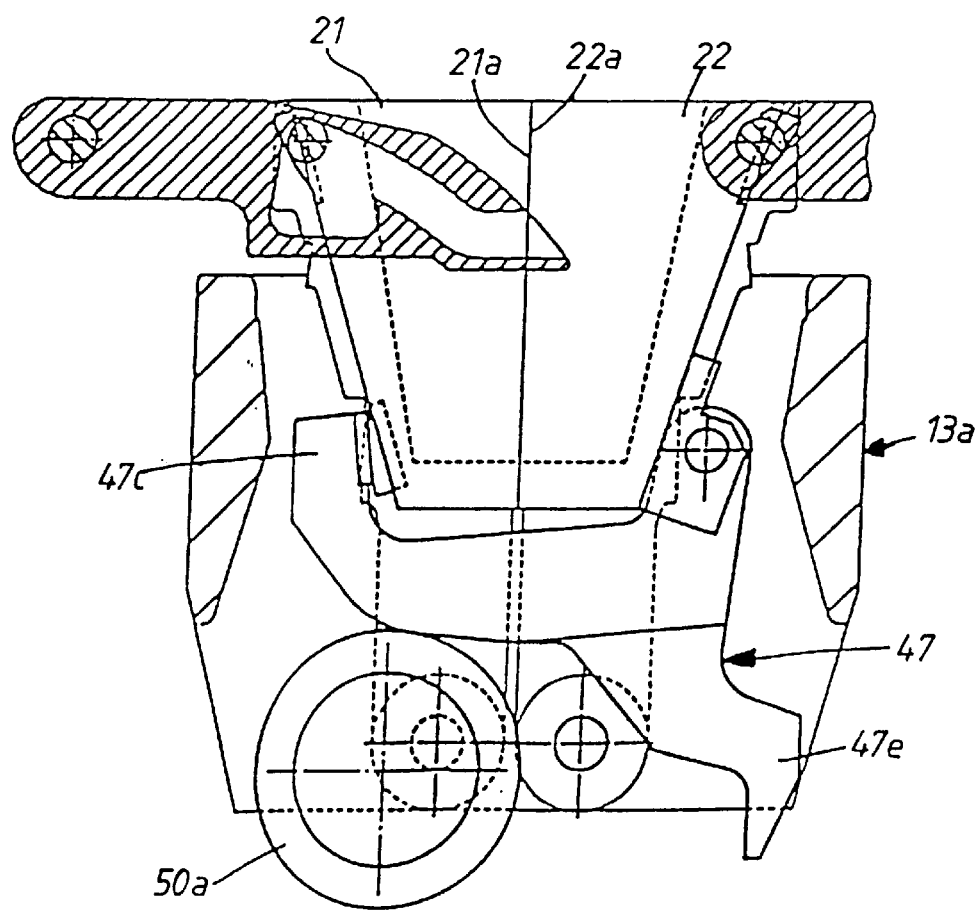

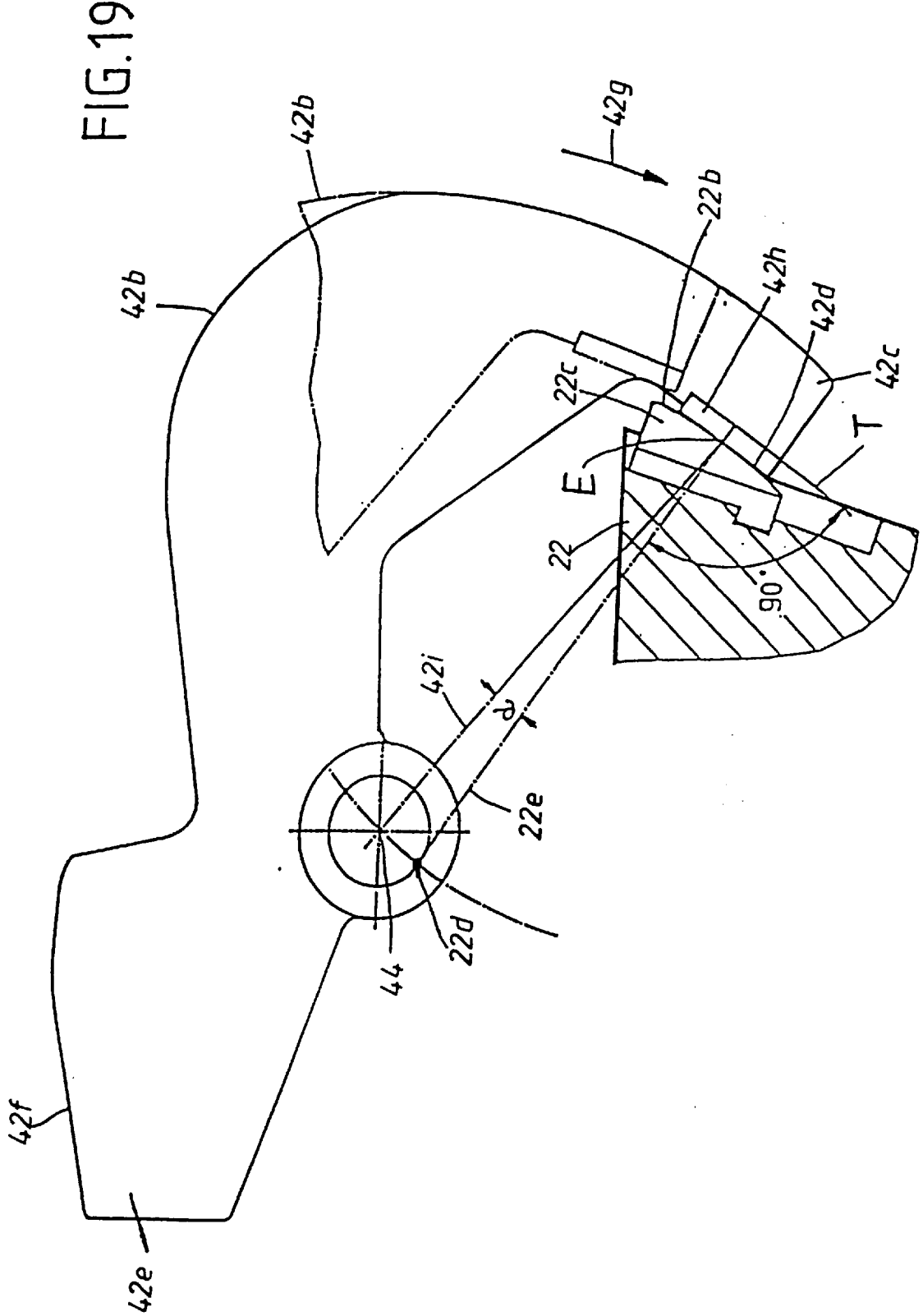

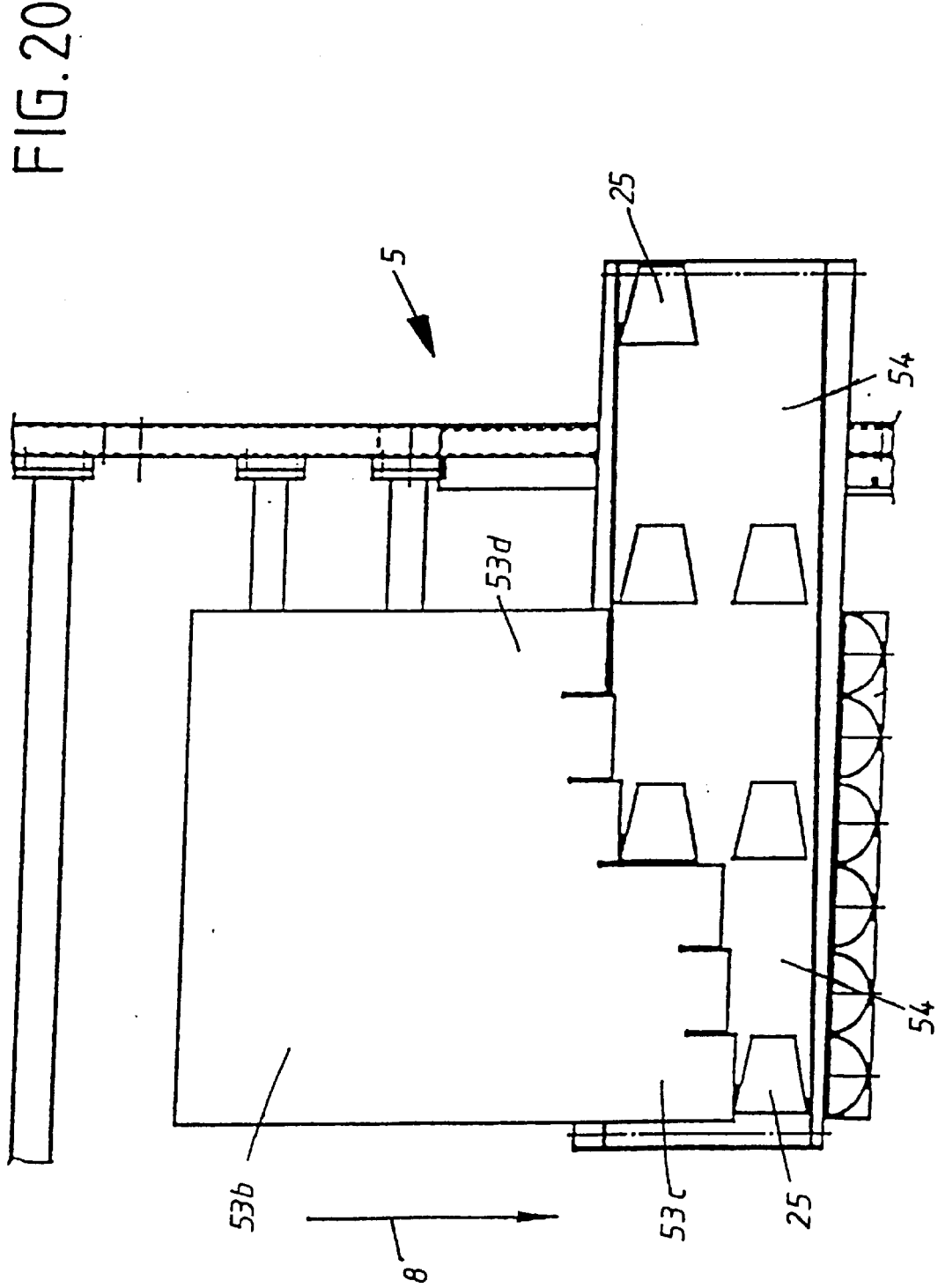

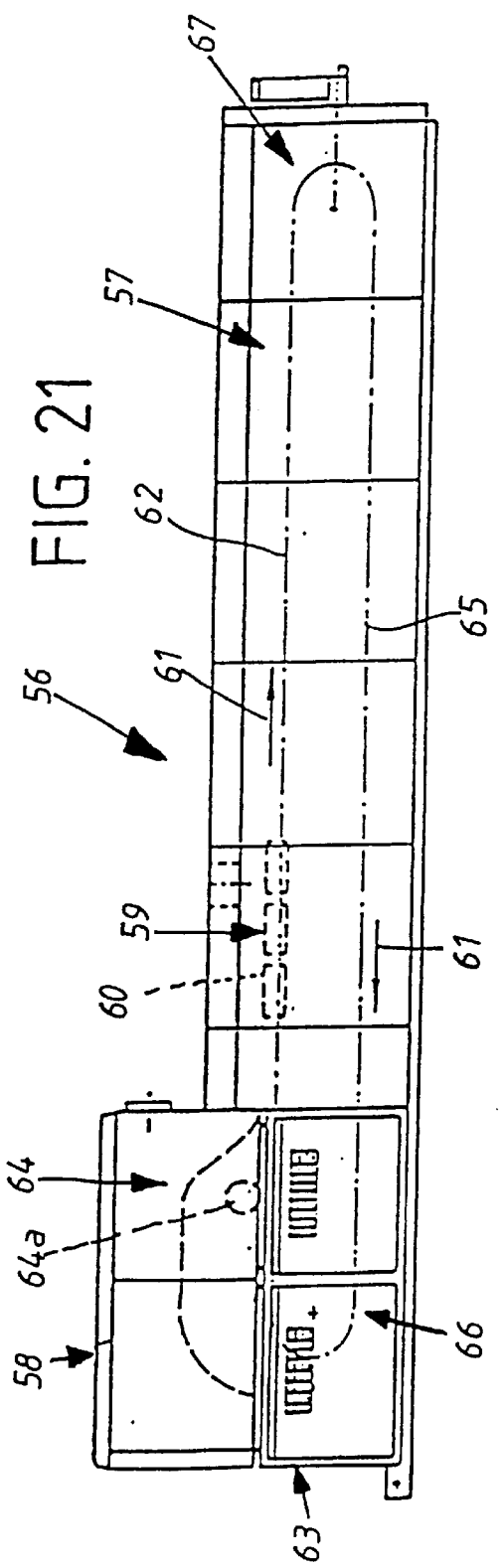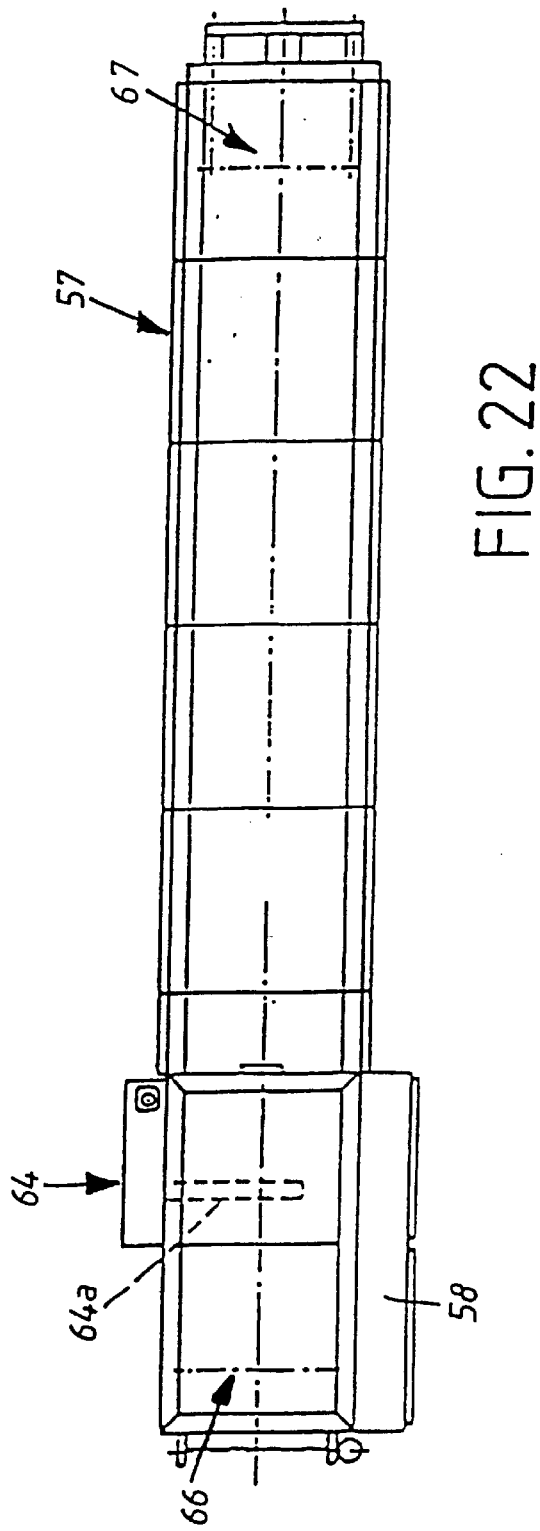

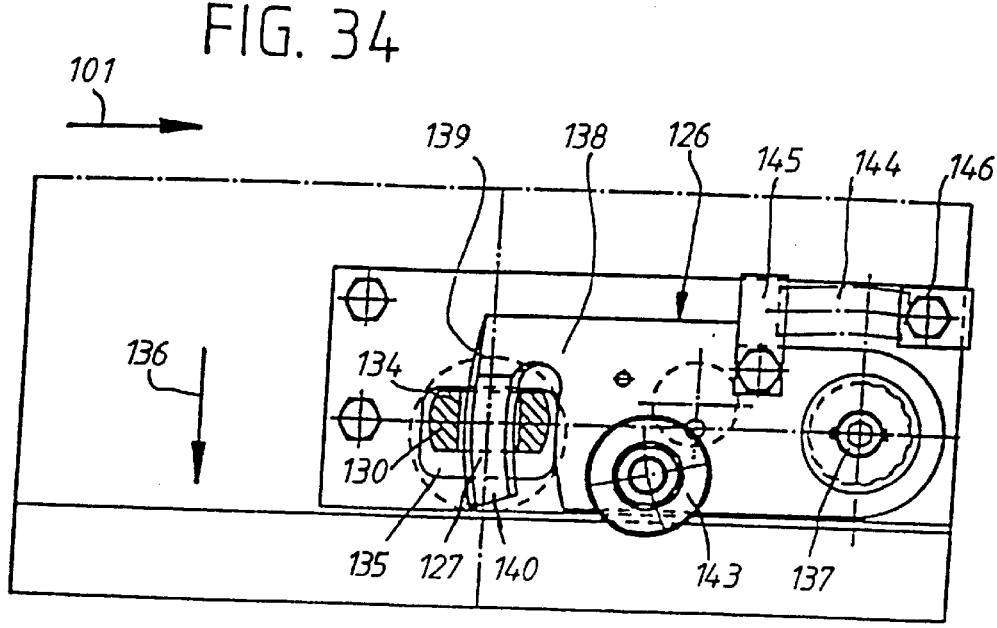
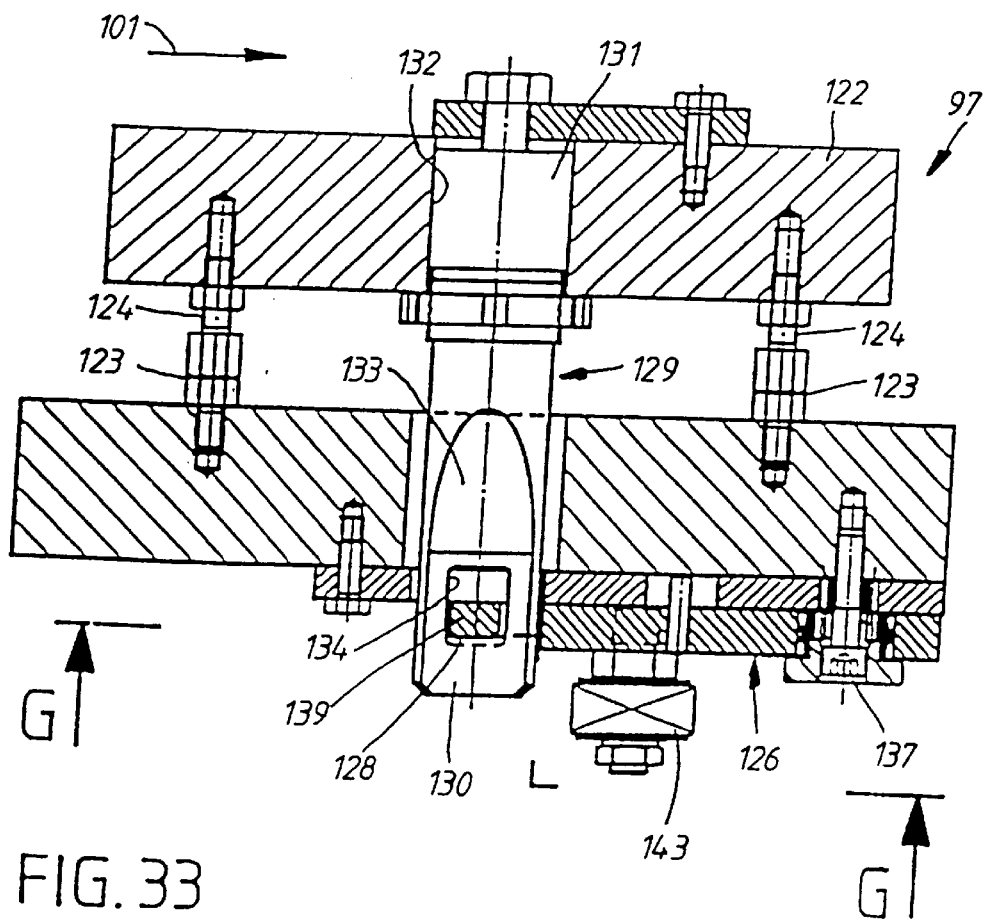

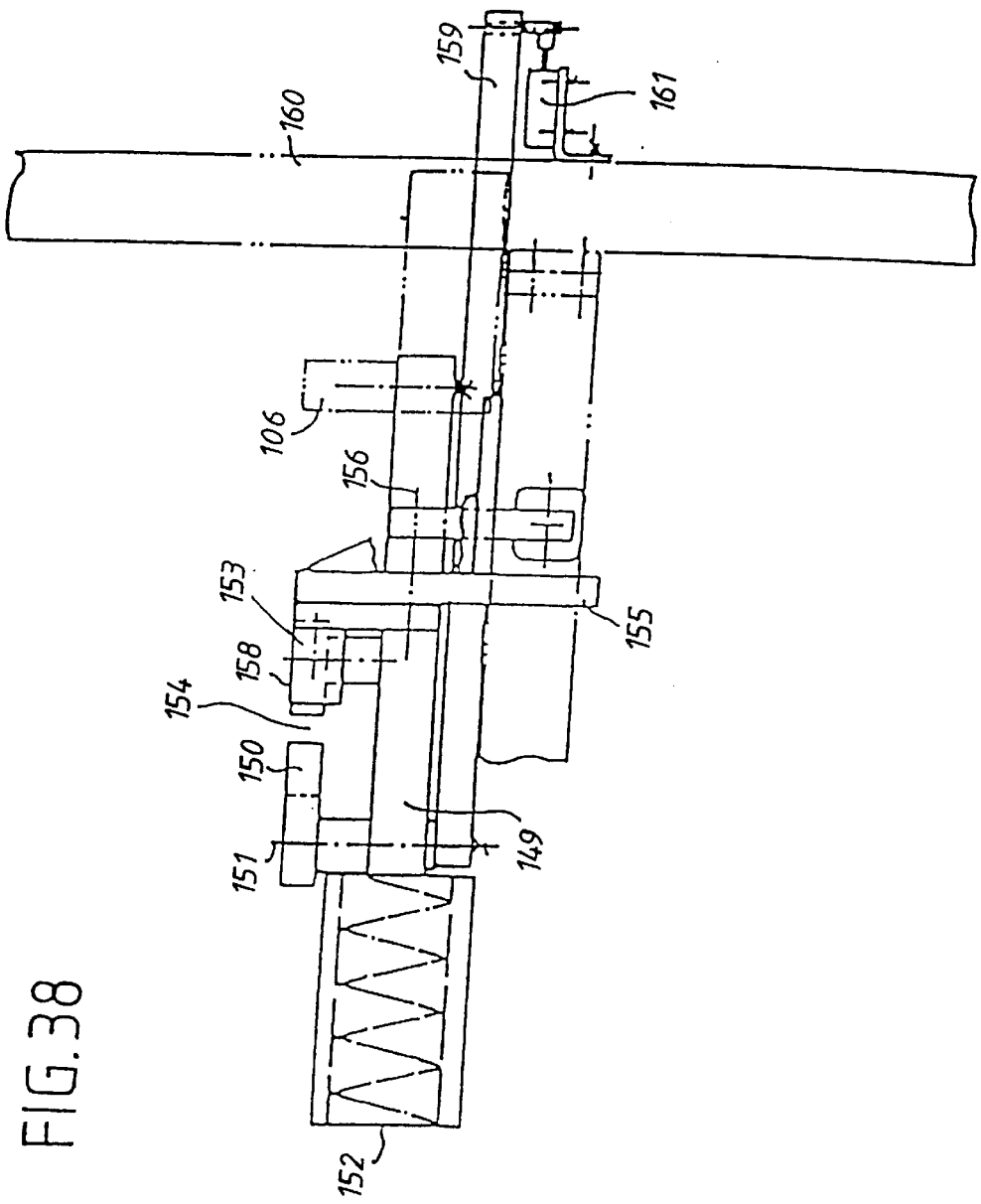

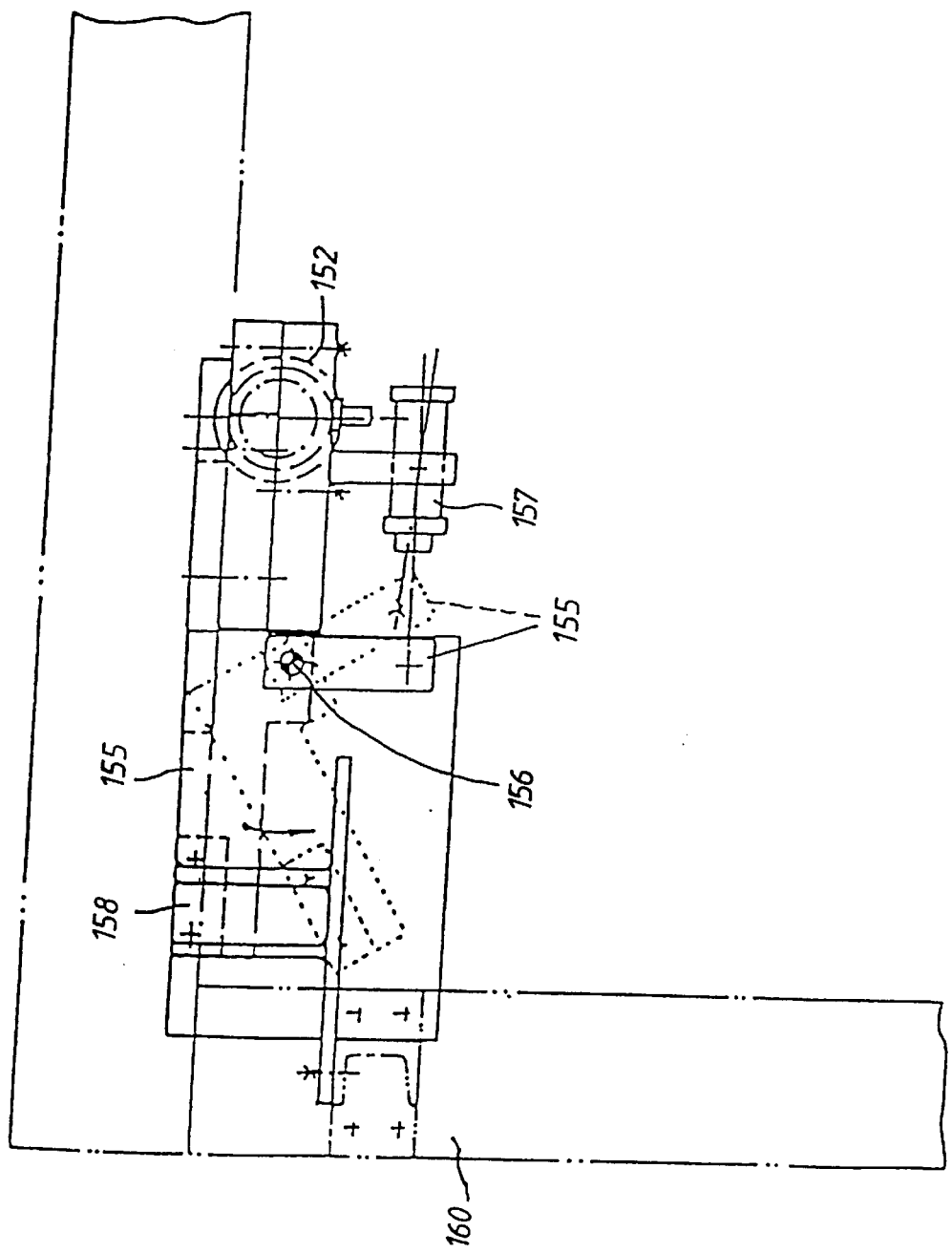

DEVICE AND METHOD FOR PRODUCING BAKED, THIN-WALLED MOLDED ARTICLES

FIELD OF THE INVENTION

The invention relates to the production of baked thin-walled molded articles in the openable and closable baking molds of baking ovens or baking devices, in which baking or pouring compositions that expand during the baking process are placed in the open baking molds and are baked in the closed baking molds, yielding the thin-walled molded articles. The usually pourable baking or pouring compositions used may be wafer batters, with or without a sugar content, intended for human consumption or other batters of the kind used to produce sweet baked goods or baked goods that are not sweet. The pourable baking or pouring compositions used may also be starch-based baking or pouring compositions or other baking or pouring compositions not intended for human consumption.

STATE OF THE ART

From the baked-goods, wafer-baking and dessert industry, wafer baking ovens are known in which a liquid wafer batter, primarily comprising wheat flour and water, as the baking or pouring composition is placed in the baking molds of the baking tongs of an endless baking tong chain and baked into thin-walled molded articles during the circulation of the baking tong chain through the oven. These baked thin-walled molded articles are called wafer sheets, wafer cones, ice cream cones, wafer cups, wafer plates, wafer figures, etc., depending on the three-dimensional shape of the hollow spaces in the baking molds of the baking tong chain. The baked thin-walled molded articles are crisp, brittle and break easily and have a moisture content of a maximum of 1% to 4%.

The wafer baking ovens are also called wafer baking machines or automatic wafer bakers, and each contains an endless baking tong chain, which can be set into circulation in one direction inside the oven by a drive motor. The baking tong chain includes from 18 to 140 identical openable and closable baking tongs, depending on the capacity of the oven, the baking tongs each being provided with a locking device; contained in the baking tongs are structurally identical open- and closable baking molds. The baking molds are transported by the circulating baking tong chain from the batter pouring station of the oven through its baking chamber to its wafer removal station and back again to the batter pouring station of the oven. During the circulation of the baking tong chain, the baking molds are opened with the aid of the movable parts of the baking tongs before reaching the wafer removal station and are closed again after leaving the dough pouring station. The locking devices of the baking tongs are unlocked before the baking molds are opened and are locked again after the baking tongs close. The requisite motions of the movable parts of the baking tongs and their locking devices are derived from the circulatory motion of the baking tong chain, via stationary devices of the oven.

Each of the baking tongs of the baking tong chain includes an elongated upper tong part disposed crosswise to the travel direction and having the upper mold half of the baking mold, and an elongated lower tong part, disposed crosswise to the travel direction and having the lower mold half of the baking mold. The upper tong part, for opening and closing the baking mold, is connected to the lower tong part either via a lateral joint or via guide columns.

In the case of baking tongs provided with a joint, the joint is disposed on a long side of the baking tong parallel to the travel direction and has a pivot axis that is parallel both to the travel direction and to the main mold parting plane of the baking mold. A locking device is disposed on the long side of the baking tong opposite the joint. The upper tong part is pivoted back and forth relative to the lower tong part to open and close the baking mold.

In the case of baking tongs with four guide columns, these columns are disposed on both long sides of the baking tong parallel to the travel direction, each of them perpendicular to the main mold parting plane of the baking mold. One locking device is disposed on each of the two long sides of the baking tong. The upper tong part is moved up and down relative to the lower tong part along the guide columns to open and close the baking mold.

The locking devices of the baking tongs are embodied as a hook closure with pivotable closing hooks, or as a hammerhead closure with a rotatable hammerhead, or as a locking bolt closure with a displaceable locking bolt.

The baking molds of the baking tongs may also be so-called flat- wafer baking molds for producing flat thin-walled molded articles, such as flat rectangular wafer sheets, flat rectangular wafer bars with hollow body halves protruding out of the plane, round wafer plates, etc. These baking molds usually include only a single hollow baking chamber for one flat thin- walled molded article and comprise an upper mold half and a lower mold half and have only one main mold parting plane.

The baking molds of the baking tongs may be so-called hollow-wafer baking molds to produce hollow thin-walled molded articles, such as wafer cones, ice cream cones, wafer cups, wafer figures, etc. These baking molds usually contain a plurality of structurally identical hollow baking chambers, disposed in a single row next to one another, for the hollow, thin-walled molded articles. These single-row baking molds comprise an upper mold half, embodied as a male die, and a lower mold half, separated from it by a main mold parting plane and embodied as a female die, which is itself divided by a second mold parting plane, perpendicular to the main mold parting plane, into two lower baking mold parts. The second mold parting plane divides all the hollow baking chambers of the baking mold disposed in a row side by side in half.

The single-row hollow-wafer baking molds are each received with their second mold parting plane in special baking tongs parallel to the travel direction of the baking tong chain. These baking tongs, in their lower tong parts that each receive the lower mold half, each contain a toggle-lever mechanism for opening the female die before the wafer receiving station and for closing the female die before the batter pouring station. In each baking tong, the one lower baking mold part is permanently built into the lower tong part, while the other lower baking mold part is connected to the toggle lever mechanism, which moves this lower baking mold part back and forth in the lower tong part crosswise to the travel direction of the baking tong chain. Each toggle lever mechanism includes an actuating lever, which derives the motions for opening and closing the female die from the circulating motion of the baking tong chain via stationary devices of the oven.

The thin-walled molded articles are produced in the respective oven during the circulation of the baking tong chain. In each case, the liquid wafer batter is placed in the hot, opened baking mold in the baking tong as it passes the batter pouring station in the opened state. Next, the baking mold is closed with the aid of the baking tong, and the closed baking tong is locked with the aid of the respective locking device. The closed, locked baking tong then passes through the baking chamber of the oven. In the baking chamber, the closed baking molds are heated, and the wafer batter is baked in the baking molds to form the thin-walled wafer molded articles. Before reaching the wafer removal station, the locking device of each baking tong is first unlocked, and then the baking mold is opened with the aid of the baking tong. In the wafer removing station, the baked molded articles are removed from the completely opened baking molds of the opened baking tongs.

In baking tongs with hollow-wafer baking molds for producing wafer cones, the female dies are closed by the toggle lever mechanisms before the batter pouring station and kept closed during the passage through the baking chamber. Before reaching the wafer removal station, the locking device of each baking tong is unlocked, and the baking mold is opened with the aid of the baking tong. The female die remains closed. When the baking tong is opened, the baked wafer cones remain in the closed female die, and only the mold cores of the male die are swiveled or lifted out of the baked wafer cones, together with the upper tong part. In the wafer removal station, an ejector device is moved along with the baking tong chain; it has ejector cores that correspond (being conical) to the mold cores of the male die. These ejector cores are driven into the open wafer cones that remain in the closed female die and they reinforce the separation of the baked wafer cones from the two lower baking mold parts of the female die as the female die is opened by the toggle lever mechanism of the baking tong. As the female die is opened, the two lower baking mold parts are driven so far apart by the toggle lever mechanism that the baked wafer cones can fall downward out of the baking mold between the two lower baking mold parts and onto a chute disposed below the baking tong path, from which chute they are removed from the oven.

In the ovens described above, one complete baking mold is received in each baking tong of the endless circulating baking tong chain, and the locking device, which keeps the baking mold closed during the baking process, is mounted on the baking tong.

In the automatic baker for producing wafer cones known from German Published, Examined Patent Application DE-AS 1 215 071, a baking mold wheel is provided that is rotatable about a horizontal pivot axis and that between its two radial side disks carries hinged baking tongs disposed in starlike fashion relative to its pivot axis; these baking tongs are secured to the baking mold wheel and circulate with it. The baking tongs contain only the female dies of the hollow-wafer baking molds. The conical hollow baking tongs of the hollow-wafer baking molds, like the baking tongs, are arranged in starlike fashion relative to the pivot axis of the baking mold wheel and widen from the inside out, radially to the pivot axis of the baking mold wheel, inside the respective baking tong. In each hollow-wafer baking mold, the main mold parting plane extends on the outer edge of the respective baking tong parallel to the pivot axis of the baking mold wheel, and the second mold parting plane perpendicular to the main mold parting plane corresponds to the mold parting plane of each baking tong and extends radially to the pivot axis of the baking mold wheel. The devices for opening and closing the hinged baking tongs are each mounted on the two side disks of the baking mold wheel. For the male dies of the hollow-wafer baking molds, baking hoods are provided, parallel to the pivot axis of the baking mold wheel, and circulate along with the respectively associated baking tong. Each baking hood has axle journals protruding laterally parallel to the pivot axis of the baking mold wheel and guided in opposed radial slits of the two side disks of the baking mold wheel. To keep the closed hollow-wafer baking molds closed, in each baking tong there are two hook closures associated with that baking tong mounted on the outsides of the two side disks of the baking mold wheel; each hook closure engages the axle journals of the respective baking hood that protrude outward past the side disks. The relative motions between the male and female dies of each hollow-wafer baking mold are derived from the rotary motion of the baking mold wheel via sliding block and slot arrangements disposed stationary in the oven frame and cooperating with the lateral journals of the baking hoods. The wafer cones are produced in the hollow-wafer baking molds during the rotation of the baking mold wheel. Liquid wafer batter is placed in the closed baking tongs before the baking tongs, in the rotating baking mold wheel, have reached the upper apex of the baking mold wheel. During the further rotation of the baking mold wheel, the baking hoods are introduced with the mold cores of the male dies into the closed baking tongs the outer hook closures closed. After passing the lower apex of the baking mold wheel, the outer hook closures are opened. While the baking tongs, by the further rotation of the baking mold wheel pass from the lower apex of the baking mold wheel to the front apex of the baking mold wheel, the baked wafer cones are removed from the hollow-wafer baking molds and are deposited on an obliquely upward-extending transport path located below the front apex of the baking mold wheel.

As the baked wafer cones are removed from a hollow-wafer baking mold, the baking tong is first opened on its hinge in an angular position on the baking mold wheel, on which the mold cores point upward with their tips. Next, the baking hood, with the upward- pointing mold cores of the male die, is driven radially outward from the opened baking tongs, together with the baked wafer cones seated on the mold cores, and swiveled upward about its horizontal journals. In the process, the baking hood is rotated counter to the direction of rotation of the baking mold wheel, until the baked wafer cones, on the mold cores that during the rotation point upward, arrive with their upward-pointing closed ends just above the transport path at the front apex of the baking mold wheel, where they are stripped off the mold cores by a stripper that can be moved back and forth.

In the prior art baking tongs, each of which contains one complete baking mold, the dimensions of the baked thin-walled molded articles, which are perpendicular to the respective main mold parting plane, are determined by the locked state of the respective locking device of the baking tongs, which prevents opening of the baking mold at its main mold parting plane by opening of the baking tong during the circulation of the closed baking tong. The locked locking device prevents the baking mold from being forced open by the gases produced in it during the braking process. It also prevents the opening of the baking tong by the gravity acting on its parts when the baking tong, on passing the rear turning point of the baking tong chain, is stood on its head and is then conveyed with the upper tong part at the bottom through the lower transport plane of the oven. The locking device locked from outside when the baking tong is closed keeps the baking tong and hence indirectly the baking mold as well closed both in the normal position of the baking tong and in the position in which the baking tong stands on its head. In baking tongs for producing flat wafers, the upper tong part, after the wafer batter has been placed in the baking mold and after the closure of the baking tong, rests on the adjustable spacer bolt of the lower tong part. Because the wafer batter is outgassing in the baking mold during the baking process, a gas pressure arises inside the baking mold that lifts the upper tong part from the spacer bolts of the lower tong part. The locked locking device of the baking tong now has the effect that the upper tong part can be pressed away from the lower tong part only as far as is necessary to attain the desired wall thickness of the baked flat molded article. The play existing in the locking device of the baking tong serves to assure an adequate play of motion for the movable locking means of the locking device for actuating the locking device with the baking tong closed. The adjustable spacer bolts of the lower tong part are adjusted to a reduced wall thickness or core wall thickness of the baked molded article, that is, a thickness that is reduced by the amount of this play of motion of the locking device.

If the upper tong part on closure of the baking tong is pressed against the spacer bolts of the lower tong part, then the movable locking means of the locking device can be moved largely without friction into its locking position. Upon release of the upper tong part, the upper tong part is lifted away from the spacer bolts of the lower tong part by the pressure in the wafer batter, until the locking means located in its locking position meets a stop of the locking device and is pressed against it by the pressure in the wafer batter.

The play of motion that is absolutely necessary for the motion of the locking means is maintained, after the closure of the baking tong, by pressure rollers disposed stationary in the oven, which press the upper tong part down onto the spacer bolts of the lower tong part as the upper tong part passes the actuating device provided for locking the locking device. After leaving the pressure rollers, the movable locking means, located in its locking position, is pressed by the pressure prevailing in the wafer batter against a stop of the locking device with a high contact pressure. This contact pressure drops only partly as the baking process continues, so that the contact pressure still prevailing at the end of the baking time must be overcome by the movable locking means, upon unlocking of the locking device, or by the actuating device for unlocking the locking devices. The result is high frictional forces between the movable locking means and the stop cooperating with it during the course of unlocking of the locking device of the baking tong.

The contact pressure still prevailing in the locked locking device of the baking tong at the end of the baking time can be only reduced, but not entirely eliminated, if the baked molded article located in the closed baking mold, and contacting both mold halves over large surface areas, is not to be destroyed. The contact force acting upon the movable locking means can be reduced only to the extent by which the respective baked molded article can be elastically compressed without being damaged.

Over the course of time, this leads to unavoidable wear of the parts of the locking devices of the baking tongs that have to be moved toward one another as these locking devices are unlocked.

In baking tongs for hollow-wafer baking molds with female dies in two pieces, the lower baking mold parts of the female dies are kept closed only in the overextended state of the toggle lever mechanisms, and therefore the toggle lever mechanisms must be moved out ward past their completely extended position once per opening operation and once per closing operation. This leads to progressive wear on the sealing faces, facing one another, of the lower baking mold parts and on the bearing points and joints of the toggle lever mechanisms.

The unavoidable wear of the locking devices of the baking tongs gradually, after long operation of the baking tongs, has the result that the baking molds received in the baking tongs, despite fully closed baking tongs and fully locked locking devices of the baking tongs, are no longer closed adequately. As a result, in the region of the sealing faces of the baking molds, so-called fin formation occurs on the baked thin-walled molded articles. These fins are created by the liquid wafer batter, which gets into the gaps between the baking mold parts because of the wear that has occurred in the locking devices. This is true also for baking tongs with hollow-wafer baking molds that have female dies in two pieces, in which the unavoidable wear of the toggle lever mechanisms leads to the formation of fins on the baked thin-walled molded articles in the region of the second mold parting planes. When fins formation occurs, the baking tongs or their baking molds in the baking tongs must be readjusted, or else all the worn parts of the baking tongs must be replaced. This requires taking the wafer baking oven out of operation for a long time.

SUMMARY OF THE INVENTION

The object of the invention is to increase the performance of the baking devices used for producing thin-walled molded articles from baking or pouring compositions that expand during the baking process.

Another object of the invention is to disclose a baking oven that has a very compact arrangement of the open- and closable baking molds.

Another object is to make it simpler to remove the baked molded articles from the open- and closable baking molds of the open- and closable baking tongs in an endless baking tong chain of a baking oven. The invention proposes a baking tong, in which the baking mold received in the baking tong, with its upper mold half embodied preferably as a male die and with its lower mold half separated from the upper mold half by a main mold parting plane and preferably embodied as a female die, defines at least one hollow chamber for molding and baking the thin-walled molded articles, and the baking tong has a lower tong part that receives the lower mold half and an upper tong part that is movable back and forth relative to the lower tong part in order to open and close the baking mold and receives the upper mold half, wherein the mold halves and/or the tong parts have stops and/or sealing faces which are in mutual contact when the baking mold is closed. This baking tong is characterized according to the invention in that to press the baking mold parts of the closed baking mold, at least one clamping device is provided, which upon clamping firmly presses together at least the two mold halves of the closed baking mold with a predetermined prestressing force and eliminates at least its own play of motion. The clamping device according to the invention has at least one clamping element that is movable when the baking mold is closed, which clamping element is clampable firmly and immovably to both mold halves or to both tong parts, or is pivotally secured to one mold half or one tong part while it is firmly clampable immovably to the other mold half or the other tong part. The movable clamping element for each mold half or each tong part has one clamping portion that can be brought into force-locking and self-inhibiting frictional engagement with an outer clamping face of the clamping device that is mounted on this mold half or this tong part. The movable clamping element can be brought by its respective clamping portion into a force-locking and self-inhibiting frictional engagement with the respective outer clamping face of the clamping device and can be displaced, in this frictional engagement, along this clamping face until first the play of motion is eliminated and then a predetermined prestressing force is applied by elastic expansion of the clamping element.

This embodiment according to the invention of the baking tong or the baking mold contained in it makes possible very extensive motions for the movable clamping elements of the clamping devices as the respective clamping device is tightened while the baking mold is already closed. The travel distances realizable between the respective clamping portion of the movable clamping element and the outer clamping face, associated with it, of the clamping device are largely independent of the wall thickness of the thin-walled molded article to be baked in the particular baking mold and are not limited, as in the known baking tong locking devices, to a fraction of this wall thickness. With the clamping devices according to the invention, a range of motion for tightening the movable clamping elements is attained that is very wide in proportion to the play of motion of the locking elements in the known baking tong locking devices.

Unlike the known baking tong locking devices, in which the two tong parts of the respective baking tong are not locked together until the end of the play of motion of the locking element, in the baking tong according to the invention the tong parts or baking mold parts of the respective baking tong are already locked together at the beginning of the range of motion of the clamping devices, and remain so until the end of this range of motion. The mutual locking of the tong or baking mold parts of the respective baking tong accomplished by the clamping devices according to the invention begins as soon as the clamping portion of the movable clamping element enters into a force-locking and self-inhibiting frictional engagement with the outer clamping face, associated with it, of the clamping device. The locking action begins even before the subsequent elimination of the play of motion that takes into account the different thermal expansions of the tong parts or baking mold parts. With the tightening of the respective clamping device, the play of motion inside the clamping device itself as well as the play of motion between the tong parts or baking mold parts of the respective baking tong that takes into account the thermal expansions are eliminated, and the tong parts or baking mold parts are moved toward one another and are then pressed against one another within this play of motion. The tightening of the respective clamping device ends with the application of a predetermined prestressing force by elastic expansion of the clamping element.

The wear that occurs on the clamping element or on the outer clamping faces in the course of time does cause an increase in the play of motion in the clamping device. However, the increased play of motion is automatically eliminated again when the clamping device is firmly clamped, when the clamping element is moved along the respective outer clamping face until the application of the prestressing force that is to be brought to bear by elastic expansion of the clamping element. The increase in the play of motion or in the wear occurring in the clamping device merely causes a change in the final position of the clamping element, in its firmly clamped state corresponding to the prestressing force to be brought to bear, on the respective outer clamping face. This is also true for wear that occurs at the stops or sealing faces with which the tong parts or baking mold parts of the respective baking tong rest on one another when the baking tong is closed. The clamping devices according to the invention are therefore self-adjusting and automatically compensate for the wear that occurs.

The baking tong according to the invention makes it possible, even with increasing wear of the clamping portions and clamping faces of the clamping devices, to keep the baking mold closed in a constant, metered way with a constant pressure on the stop or sealing faces of the baking mold or baking tong. This is also true for the case where a baked molded article remains in the baking mold of a baking tong at the discharge station of the oven and a quantity of baking or pouring composition that is precisely metered for the empty baking mold is introduced for a second time into the baking mold that is already filled with the baked molded article. This double quantity of baking or pouring composition is partly positively displaced and partly compressed as the clamping devices are tightened, with the baking mold closed. When the clamping devices are tightened, the affected parts of the baking mold or baking tong are pressed together with a predetermined prestressing force and with their stop or sealing faces toward one another. Even if a narrow gap should then remain between the stop or sealing faces of the baking mold or baking tong, the affected parts of the baking mold or baking tong are force-lockingly joined together and are held together with a predetermined prestressing force. The predetermined prestressing force with which a clamping device is tightened determines the maximum level of the forces exerted on the baking mold or baking tong as this clamping device is tightened and thus prevents overstressing of the baking mold or baking tong and the clamping device.

The baking tongs according to the invention may be equipped with either substantially two-piece baking molds divided only by a main mold parting plane, or substantially three-piece baking molds, which are divided by a main mold parting plane and by a second mold parting plane perpendicular to it. The clamping devices that directly engage the respective baking mold or baking tong are each associated with at least one of these mold parting planes.

The baking tongs according to the invention may each have a plurality of clamping devices associated with the respective mold parting plane, which are spaced apart from one another in the travel direction of the baking tong chain or crosswise to it, and which limit the elastic and thermal deformation of the baking mold parts or tong parts that occur between two adjacent clamping devices. This allows a lighter construction of the baking molds or baking tongs.

In most cases, in the baking tongs according to the invention, the clamping devices according to the invention replace the conventional baking tong locking devices. In baking tongs according to the invention, whose baking molds are equipped with clamping devices that directly engage the respective baking mold, it is also possible to provide conventional baking tong locking devices in addition to these clamping devices.

In a further feature of the invention, a baking tong for producing thin-walled molded articles from baking or pouring compositions that expand during the baking process is proposed. The baking mold received in the baking tong, with its upper mold half embodied as a male die and with its lower mold half separated from the upper mold half by a main mold parting plane and embodied as a female die, defines at least one hollow chamber for molding and baking the thin-walled molded articles. This baking tong has a lower tong part that receives the lower mold half and an upper tong part that is movable back and forth relative to the lower tong part in order to open and close the baking mold and receives the upper mold half. The lower mold half is divided by a second mold parting plane, perpendicular to the main mold parting plane, into two lower baking mold parts, which have sealing faces oriented toward the second mold parting plane and in mutual contact when the female die is closed. The two mold halves and/or the two tong parts have stops and/or sealing faces that are in mutual contact when the baking mold is closed. This baking tong has at least one clamping device, mounted on the upper mold half or on the upper tong part and externally actuatable, for pressing together the mold halves and the lower baking mold parts of the closed baking mold. The respective clamping device can be firmly clamped immovably to the two lower baking mold parts in order to eliminate the play of motion and to exert a predetermined prestressing force that presses together the two mold halves and the two lower baking mold parts. To that end, the respective clamping device includes at least two movable clamping elements, which are embodied as clamping levers that are pivotally supported on the upper mold half or on the upper tong part and that each have one clamping portion oriented toward its pivot axis. The clamping levers, by pivoting about their respective pivot axis, can be brought with each of their clamping portions into a force-locking and self-inhibiting frictional engagement with one outer clamping face of the clamping device, each face being located on one of the lower baking mold parts. The clamping levers can be pivoted with their clamping portions in the force-locking and self-inhibiting frictional engagement with the respective outer clamping face until the play of motion of the clamping device and the baking molde or baking tong is eliminated, and beyond that until the application of the desired prestressing force by the elastic expansion of the respective clamping lever.

In a further feature of the invention, a baking tong is proposed, in which the baking mold received in the baking tong, with its upper mold half embodied preferably as a male die and with its lower mold half separated from the upper mold half by a main mold parting plane and preferably embodied as a female die, defines at least one hollow chamber for molding and baking the thin-walled molded articles, and the baking tong has a lower tong part that receives the lower mold half and an upper tong part that is movable back and forth relative to the lower tong part in order to open and close the baking mold and receives the upper mold half, wherein the mold halves and/or the tong parts have stops and/or sealing faces which are in mutual contact when the baking mold is closed. This baking tong is characterized according to the invention in that for pressing together the mold halves and/or the tong parts of the closed baking mold, at least one clamping device is provided, which on being firmly clamped presses together at least the two mold halves of the closed baking mold with a predetermined prestressing force and at least eliminates its own play of motion; that this clamping device has a clamping element which is movable at least when the baking mold is closed and which is firmly clampable immovably to both mold halves or to both tong parts; that the movable clamping element is movably supported on the one mold half or the one tong part and when the baking mold is closed can be brought into engagement with an elastically expandable clamping element of this clamping device that is rigidly connected to the other mold half or the other tong part; that the movable clamping element has a clamping portion that can be brought into a form- and force-locking and self-inhibiting frictional engagement with at least one clamping face attached to the elastically expandable clamping element; and that the movable clamping element with its clamping portion in the force-locking and self-inhibiting frictional engagement with the elastically expandable clamping element is displaceable relative to the latter clamping element until the elimination of the play of motion and beyond that until the application of a prestressing force to be brought to bear by elastic expansion of the elastically expandable clamping element. This embodiment according to the invention of the baking tong allows quite extensive motions for the movable clamping element of the clamping device as the clamping device is tightened and loosened with the baking mold closed. The travel distances that can be realized between the clamping portion of the movable clamping element and the clamping faces, associated with it, of the clamping device are largely independent of the wall thickness of the thin-walled molded article to be baked in the particular baking mold.

With the embodiment according to the invention with the clamping devices of the baking tong, in comparison with the known baking tong locking devices in which the play of motion of the respective locking element is limited to a fraction of the wall thickness of the thin-walled molded article to be baked in the particular baking mold, a very wide range of motion is attained for the movable clamping elements as the clamping devices are tightened and loosened.

Unlike the known baking tong locking devices, in which the two tong parts are not locked together until the end of the motion of the respective locking element and the end of the play of motion of the locking element, the two tong parts or mold halves in the baking tong according to the invention are already form-lockingly locked together at the beginning of the range of motion of the clamping device, when the clamping portion of the movable clamping element by its motion comes into engagement with the elastically expandable clamping element. After the mutual locking of the two tong parts or mold halves, the play of motion required for proper function of the clamping device is eliminated by the motion of the movable clamping element, and the clamping device is tightened. Once the clamping device is tightened, the play of motion inside the clamping device itself and also the play of motion between the tong parts, which takes into account the different thermal expansions of the individual tong parts or baking mold parts, are eliminated. As the clamping device is tightened, the tong parts or baking mold parts are moved toward one another in this play of motion and then pressed together. The tightening of the clamping device effected by the motion of the movable clamping element does not end until the application of a predetermined prestressing force to the two tong parts or baking mold parts of the closed baking mold or baking tong. This predetermined prestressing force is brought to bear by the elastic expansion of the electrically expandable clamping element of the clamping device that is caused by the motion of the movable clamping element upon tightening of the clamping device. This prestressing force is effective only within the baking tong, and it is controlled in its magnitude via the actuating devices provided in the respective oven for actuating the externally actuated clamping devices of the baking tongs. The wear that occurs during the use of the baking tongs over the course of time, inside the clamping devices or at the stops or sealing faces with which the tong parts or mold halves rest on one another with the baking tong closed, cause a gradual increase in the play of motion of the clamping devices. The clamping devices of the baking tongs that are equipped with one movable clamping element and one elastically expandable clamping element are tightened by the motion of the respective movable clamping element, until the predetermined prestressing force is brought to bear on the two tong parts or mold halves by the elastic expansion of the elastically expandable clamping element. In this tightening operation, the movable clamping element is moved along the respective clamping face of the clamping device until such time or far enough that the desired prestressing force is brought to bear by the elastic expansion of the elastically expandable clamping element. The distance traveled in the process by the movable clamping element on the respective clamping face is equivalent to the respective current magnitude of the play of motion. Increasing the play of motion is compensated for by increasing the distance traveled by the movable clamping element of the respective clamping device as the latter is tightened. Any change in the play of motion of the clamping device leads merely to a change in the final position of its movable clamping element, in its firmly clamped position on the respective clamping face that corresponds to the prestressing force to be brought to bear. The clamping devices of the baking tongs according to the invention are therefore self-adjusting and automatically compensate for the wear that occurs. Because of the self-inhibiting embodiment of the clamping faces, unintended opening of the clamping devices caused by jarring and the like is also precluded.

The embodiment of the baking tong according to the invention allows the baking mold to be kept constantly closed in a metered way with the baking tong closed, with constant pressure on the stop or sealing faces of the baking mold or baking tong. Because of the self-adjusting clamping devices that automatically compensate for the incident wear, the fact that the baking mold is kept constantly closed in a metered way with the baking tong is preserved, even where there is increasing wear to the clamping portions and clamping faces of the clamping devices. This is true even in the event that a baked molded article remains in the baking mold of a baking tong at the discharge station of the oven and a quantity of baking or pouring composition that is precisely metered for the empty baking mold is poured into the baking mold a second time in this baking tong, even though the baking mold is still filled with the already baked molded article remaining in it. This second quantity of baking or pouring composition, precisely metered for the empty baking mold, is partly positive displaced and partly compressed in the closed baking mold as the clamping devices are tightened. When the clamping devices are tightened, the affected parts of the baking mold or baking tong are pressed together with a predetermined prestressing force and with their stop or sealing faces toward one another. Even if a narrow gap should then remain between the stop or sealing faces of the baking mold or baking tong, the affected parts of the baking mold or baking tong are force-lockingly joined together and are held together with a predetermined prestressing force. The predetermined prestressing force with which a clamping device is tightened determines the maximum level of the forces exerted on the baking mold or baking tong as this clamping device is tightened and thus prevents overstressing of the baking mold or baking tong and the clamping device.

It may also be provided according to the invention that a clamping device is mounted onto two end portions, whose front sides face one another when the baking tong is closed, of the mold halves or tong parts, wherein the elastically expandable clamping element protrudes from the front side of the one, first end portion and has a head part that when the baking tong is closed protrudes beyond the back side of the other, second end portion, while the movable clamping element is movably supported on the back side of the second end portion and has a clamping portion that can be clamped in place between the head part of the elastically expandable clamping element and the back side of the second end portion; that clamping faces are provided that are mutually associated with one another and can be brought into a force-locking and self-inhibiting frictional engagement with one another on the head part of the elastically expandable clamping element as well as on the backside of the second end portion and on the clamping portion of the movable clamping element; and that the movable clamping element, with its clamping portion in the form- and force-locking and self-inhibiting frictional engagement with these clamping faces, is movable along the back side of the second end portion until the elimination of the play of motion and beyond it until the application of a prestressing force to be brought to bear by elastic expansion of the elastically expandable clamping element.

It may also be provided according to the invention that a passageway conduit is provided in the head part of the elastically expandable clamping element, which conduit is provided, on its channel wall toward the front side of the first end portion, with a clamping face for engagement with the clamping portion of the movable clamping element.

It may also be provided according to the invention that the movable clamping element is embodied as a hook-shaped lever that is pivotable about an axis perpendicular to the main mold parting plane, which lever carries at least one actuating element for tightening and/or loosening the clamping device, and which is embodied on its hooklike portion as a clamping portion having the clamping faces intended for the force-locking and self-inhibiting frictional engagement.

It may also be provided according to the invention that the movable clamping element is embodied as a locking bolt that is displaceable parallel to the main mold parting plane and that has an actuating portion, with at least one actuating element for tightening and/or loosening the clamping device, and a clamping portion having the clamping faces intended for the force-locking and self-inhibiting frictional engagement.

The invention also proposes a baking oven for producing thin-walled molded articles from baking or pouring compositions that expand during the baking process. This oven includes a pouring station for the baking or pouring compositions, a baking chamber for baking the molded articles, a discharge station for the baked molded articles, and an endless chain of individual open- and closable baking tongs which circulates in the oven in one direction via at least two turning points and passes through the pouring station, baking chamber and discharge station. The open- and closable baking tongs include open- and closable baking molds that are each separated by a main mold parting plane into an upper and a lower mold half, that each define at least one hollow chamber for molding and baking the molded articles, and are kept closed during the baking process by externally actuatable device. Of each baking mold, the lower mold half, embodied as a female die and divided into two lower baking mold parts by a second mold parting plane perpendicular to the main mold parting plane, is received in the lower part of the respective baking tong, while the upper mold half embodied as a male die is received in the upper part thereof which is movable back and forth perpendicular to the main mold parting plane relative to the lower part for opening and closing the baking mold. The two mold halves and/or the tong parts have stops and/or sealing faces that are in mutual contact when the baking mold is closed. The baking molds in the baking tongs of the baking tong chain are disposed with each of the second mold parting planes, dividing the two lower baking mold parts of their female die, being crosswise to the travel direction. In each baking tong, at least one of the two lower baking mold parts is disposed movably back and forth in the lower tong part relative to the second mold parting plane of the baking mold. For opening and closing the female dies disposed in the lower tong parts of the baking tongs, movement mechanisms for the movable lower baking mold parts of the female dies are provided, each disposed between the baking tongs and circulating with the baking tong chain. Each of these movement mechanisms is activatable before the turning point preceding the discharge station. Upon passing through the turning point preceding the discharge station, these movement mechanisms convert the changes of spacing that occur, parallel to the travel direction, in the region of the movement mechanisms between successive baking tongs, into motions of the movable lower baking mold parts relative to the second mold parting plane of the respective baking mold. The movement mechanisms are deactivated again after this turning point.

By this embodiment of the oven, the oven can be equipped with a markedly greater production capacity, for its structural length, than the known ovens.

The production capacity of an oven with a circulating baking tong chain is essentially limited by the baking time required to bake the respective thin-walled molded article, and depends only on the shape of the molded article. In order to realize this baking time in all the baking tongs of the baking tong chain, a certain constant circulation speed of the baking tong chain is required, which depends on the structural length of the baking tongs parallel to the travel direction, on the number of baking tongs in the baking tong chain, on the length of the baking tong chain, and on the length of the oven. In the oven, all the movements are adapted or oriented to the baking tongs of the circulating baking tong chain and its circulation speed. This is equally true both for the motions to be executed at the baking tongs or baking molds of the circulating baking tong chain by the stationary devices of the oven and for the motions to be synchronized by the stationary devices of the oven with the baking tongs or baking molds of the circulating baking tong chain, or for the motions to be executed inside the baking tongs or baking molds of the circulating baking tong chain. Beyond a certain extent, it is not possible to shorten the time required for each of these movements. This puts limits on increasing the circulation speed of the baking tong chain in order to increase the production capacity of the oven. If the maximum circulation speed of the baking tong chain, which is dependent on the courses of motion in the oven, has been reached, then in the known ovens no further increase in the oven production capacity is possible. At a predetermined baking time and a predetermined structural length of the baking tongs parallel to the travel direction, the maximum number of baking tongs in the baking tong chain in an oven is thus limited.

In the oven according to the invention, the baking molds in the baking tongs in the baking tong chain are each disposed with the second mold parting planes, which divide the two lower baking mold parts of their female die, located crosswise to the travel direction. This makes it possible to increase the production capacity of an oven according to the invention to from two to two and a half times the production capacity of an oven of the same length and the same circulation speed of the baking tong chain but in whose baking tongs the baking molds are disposed with their second mold parting planes each parallel to the travel direction. The embodiment according to the invention makes it possible to increase the number of baking tongs in the baking tong chain without increasing the length of the chain. In the oven of the invention, the movement mechanisms for opening and closing the female dies disposed in the lower tong parts of the baking tongs are disposed between the baking tongs of the baking tong chain. These movement mechanisms do not take up any structural length of the baking tongs parallel to the travel direction in the lower tong parts of the baking tongs and therefore make it possible to further shorten the structural length of the baking tongs parallel to the travel direction. The movement mechanisms are operative within the baking tong chain only whenever the chain passes the turning point preceding the discharge station. The movement mechanisms convert the changes in spacing parallel to the travel direction that occur between the successive baking tongs into motions of the movable lower baking mold parts of the female dies. Because of the movement mechanisms, the mass that must be moved with the baking tong chain in addition to the baking molds is reduced, compared with the toggle lever mechanisms built into the baking tongs. The actuating devices otherwise required in the oven for actuating the toggle lever mechanisms can be omitted.

In comparison with a known oven of the same production capacity, the oven of the invention is substantially more compact in design and contains a baking tong chain with fewer moving parts in the region to be acted upon directly by the respective gas burner, so that the gas consumption is markedly less. The invention also proposes a method for removing conelike or cuplike molded articles, baked from baking or pouring compositions that expand during the baking process, from the open- and closable baking molds of the open- and closable baking tongs of an endless baking tong chain of a baking oven. The baking molds are received with their upper mold halves, each embodied as male dies provided with molding cores in the upper tong parts of the baking tongs and with their lower mold halves, each embodied as female dies provided with mold recesses, which are separated from the respective upper mold half by a main mold parting plane and are divided into two lower baking mold parts by a second mold parting plane perpendicular to the main mold parting plane, are received in the lower tong parts of the baking tongs. The baking tongs, connected to one another to make an endless baking tong chain, circulate in one direction through a pouring station for the baking or pouring compositions, through a baking chamber for baking the molded articles, and through a discharge station for the baked molded articles, and are transported in this process from an upper transport plane via a rear turning point of the baking tong chain disposed in the baking chamber, into a lower transport plane and back into the upper transport plane again via a front turning point of the baking tong chain preceding the discharge station, wherein the baking tongs on passing through the turning points are each stood on their head. Before the baked molded articles are removed the baking tongs and the baking molds in passing through the front turning point are opened at the main mold parting plane and the b baked molded articles on reaching the discharge station are discharged from the above. According to the invention, with the baking tongs standing on their head, the mold cores of the male dies are each moved, by the upper tong part moving in a straight line along the second mold parting plane of the baking mold, out of the baked molded articles that remain in the mold recesses of the female die by a fraction of the height of the molded articles. Then the lower baking mold parts are moved apart, the female dies are opened, and the baked molded articles are caught on the mold cores of the male dies protruding into them. The baked molded articles, together with the mold cores of the male dies protruding into them, are each moved all the way out of the mold recesses of the female die by the respective upper tong part moving in a straight line along the second mold parting plane of the respective baking mold. The baked molded articles on passing through the upper half of the front turning point of the baking tong chain are separated by gravity from the mold cores of the male dies that protrude into them and remain in the second mold parting plane of the respective baking mold, and are caught by their ends toward the female dies on a guide face disposed outside the baking molds between the path of the upper tong parts and the path of the lower tong parts. The baked molded articles supported on the guide face are transported along the guide face and outward past it by means of the mold cores of the male dies that protrude into them and remain in the second mold parting plane of the respective baking molds, and are transferred in the discharge station onto a transport device that leads laterally out of the baking tong chain between the path of the upper tong parts and the path of the lower tong parts.

By means of the method of the invention, the discharge of the baked, cone- or cup-shaped molded articles from the respective oven is made easier. As the mold cores and the baked, cone- or cup-shaped molded articles moved in an out, the mold cores of the male dies each remain in the second mold parting plane of the baking mold. This eliminates the complicated swiveling of the upper mold halves to push the mold cores out of the baked molded articles. Driving individual injectors into the baked molded articles is omitted. Opening the female dies wide in order to allow the baked molded articles, with their ends remote from the male dies leading, to fall out of the female dies between the two lower baking mold parts is omitted. All of these steps eliminated in the method of the invention require time for performing them in the respective oven and also require the presence of suitable embodied devices in the oven, and in the baking tong chain each require a certain travel distance, located outside the baking chamber, for performing the particular step.

The production capacity of an oven with a circulating baking tong chain is essentially limited by the baking time required to bake the respective thin-walled molded article, and depends only on the shape of the molded article. In order to realize this baking time in all the baking tongs of the baking tong chain, a certain constant circulation speed of the baking tong chain is required, which depends on the structural length of the baking tongs parallel to the travel direction, on the number of baking tongs in the baking tong chain, on the length of the baking tong chain, and on the length of the oven.

In the oven, all the movements are adapted or oriented to the baking tongs of the circulating baking tong chain and its circulation speed. This is equally true both for the motions to be executed at the baking tongs or baking molds of the circulating baking tong chain by the stationary devices of the oven, for example when the upper mold halves are pivoted to push the mold cores out of the baked molded articles, and for the motions to be synchronized by the stationary devices of the oven with the baking tongs or baking molds of the circulating baking tong chain, such as when the ejectors mvoe into and out of the baked molded articles, or for the motions to be executed inside the baking tongs or baking molds of the circulating baking tong chain, such as when the female dies are opened wide, in order to allow the baked molded articles to fall out of the female dies, with their ends remote from the male dies leading, through the gap between the two lower baking form parts. Beyond a certain extent, it is not possible to shorten the time required for each of these movements. Moreover, to perform these motions a certain travel distance of the baking tong chain, which distance is located outside the baking chamber, is required.

The elimination of movement to be adapted to the circulating baking tong chain, together with the travel distances of the baking tong chain required for this, that becomes possible by the method according to the invention for removing the baked molded articles makes it possible to increase the number of baking tongs to suit the length of the eliminated travel distance, with an unchanged length of the baking tong chain and oven, so that a higher production capacity of the oven results with an unchanged circulation speed of the baking tong chain.

The invention also proposes a baking tong for producing thin-walled molded articles of baking or pouring compositions that expand during the baking process, for an endless baking tong chain which circulates in one direction in a baking oven. The baking mold received in the baking tong, with its upper mold half embodied preferably as a male die and with its lower mold half separated from the upper mold half by a main mold parting plane and preferably embodied as a female die, defines at least one hollow chamber for molding and baking the thin-walled molded articles. The baking tong has a lower tong part that receives the lower mold half and an upper tong part that is movable back and forth relative to the lower tong part in order to open and close the baking mold and receives the upper mold half. The baking tong has at least one externally actuatable device for keeping the closed baking mold closed during the baking process. The mold halves and/or the tong parts have stops and/or sealing faces which are in mutual contact when the baking mold is closed. For guiding the upper tong part upon opening and closing of the baking mold, a single guide sword extending perpendicular to the main mold parting plane of the baking mold is provided, which is disposed inside the baking tong crosswise to the travel direction laterally beside the baking mold and has an inner guide path adjacent to the baking mold, and an outer guide path spaced apart from it crosswise to the travel direction. The upper tong part has an upper guide head protruding laterally past the upper mold half crosswise to the travel direction, with which upper guide head the guide sword is rigidly connected. The lower tong part has a lower guide head protruding laterally past the lower mold half crosswise to the travel direction, in which guide head the guide sword is guided displaceably with its inner and outer guide paths perpendicular to the main mold parting plane.

The embodiment of the invention of the baking tong with a guide sword disposed laterally next to the baking mold makes it possible to receive baking molds of great length crosswise to the travel direction in baking tongs that are open on one side and have a short structural length in the travel direction. This baking tong can be used in ovens with a stationary pouring device that protrudes into the interstice that is present between the upper tong part and the lower tong part when the baking tong is open. Because of the one-sided support of the upper tong part in the lower tong part, the oven can be simplified, since the pouring device for the baking or pouring composition and the device for removing the baked molded articles no longer need to move individually into the opened baking tong and out again for each individual baking tong of the baking tong chain and can therefore be embodied more simply. The baking tong is simple, robust and durable in construction and can be accommodated in minimal space. The short structural length of the baking tong in the travel direction allows a very close succession of baking tongs or baking molds in the travel direction within the baking tong chain. The small space demanded by the baking tong makes it possible to increase the production capacity of an oven equipped with it. With an unchanged length of the baking tong chain of an oven, its production capacity can be increased, both by increasing the number of hollow baking chambers disposed in the baking tongs crosswise to the travel direction and by increasing the number of baking tongs in the baking tong chain. The length of the baking molds parallel to the second mold parting plane is no longer part of the structural length of the baking tongs parallel to the travel direction and thus no longer affects the circulation speed of the baking tong chain. The length of the baking mold parallel to the second mold parting plane can be increased compared with the known oven, and thus the number of mold cores and mold recesses per baking mold can be increased without having to change the circulation speed of the baking tong chain of the oven.

Other characteristics and features of the invention are defined in the claims.

BRIEF DESCRIPTION OF THE DRAWINGS

The invention will be described in further detail below in terms of a plurality of exemplary embodiments, shown in drawings, of devices for producing thin-walled molded articles from baking or pouring compositions that expand during the baking process.

FIG. 1 shows a side view of a baking oven for producing cone- or cup-shaped, thin-walled molded articles with a front head, a baking chamber, and an endless baking tong chain circulating in the interior of the oven.

FIG. 2 shows a plan view on the oven of FIG. 1.

FIG. 5 shows the back side of the part of the baking tong of FIG. 4 that contains the lateral guide sword in an elevation view.

FIG. 6 shows a cross section through the baking tong of FIG. 4 taken along the line B—B of FIG. 5 without a baking mold.

FIG. 18 shows a cross section corresponding essentially to FIG. 9, through a baking tong that is located in the closing station intended for the lower clamping devices, showing the region of two clamping devices disposed one above the other, of which the lower clamping device is tightened against the closed female die of the baking mold.

FIG. 19 schematically shows the engagement relationships of the clamping devices in terms of an upper clamping device and its rear clamping lever.

FIG. 20 shows a plan view on the discharge device of the oven of FIG. 1.

FIG. 21 shows a side view of a baking oven for producing flat, thin-walled molded articles with a front head, a baking chamber, and an endless baking tong chain circulating in the interior of the oven.

FIG. 22 shows a plan view on the oven of FIG. 21.

FIG. 33 shows a section, parallel to the travel direction, along the line F—F of FIG. 31 or 32 through the clamping device, tightened against the end portions, of the closed baking tong of FIG. 31 or FIG. 32.

FIG. 34, in a view of FIG. 33 from below taken along the line G—G of FIG. 33, shows the lower end portion of the baking tong with the clamping device tightened in a condition of medium wear.

FIG. 38 shows an end view of an embodiment of an actuating device for the clamping devices that is disposed downstream of a pouring station.

FIG. 39 shows the actuating device of FIG. 38 from the side.

DESCRIPTION OF EXEMPLARY EMBODIMENTS

1. Cone-Baking Ovens

Figure 3:
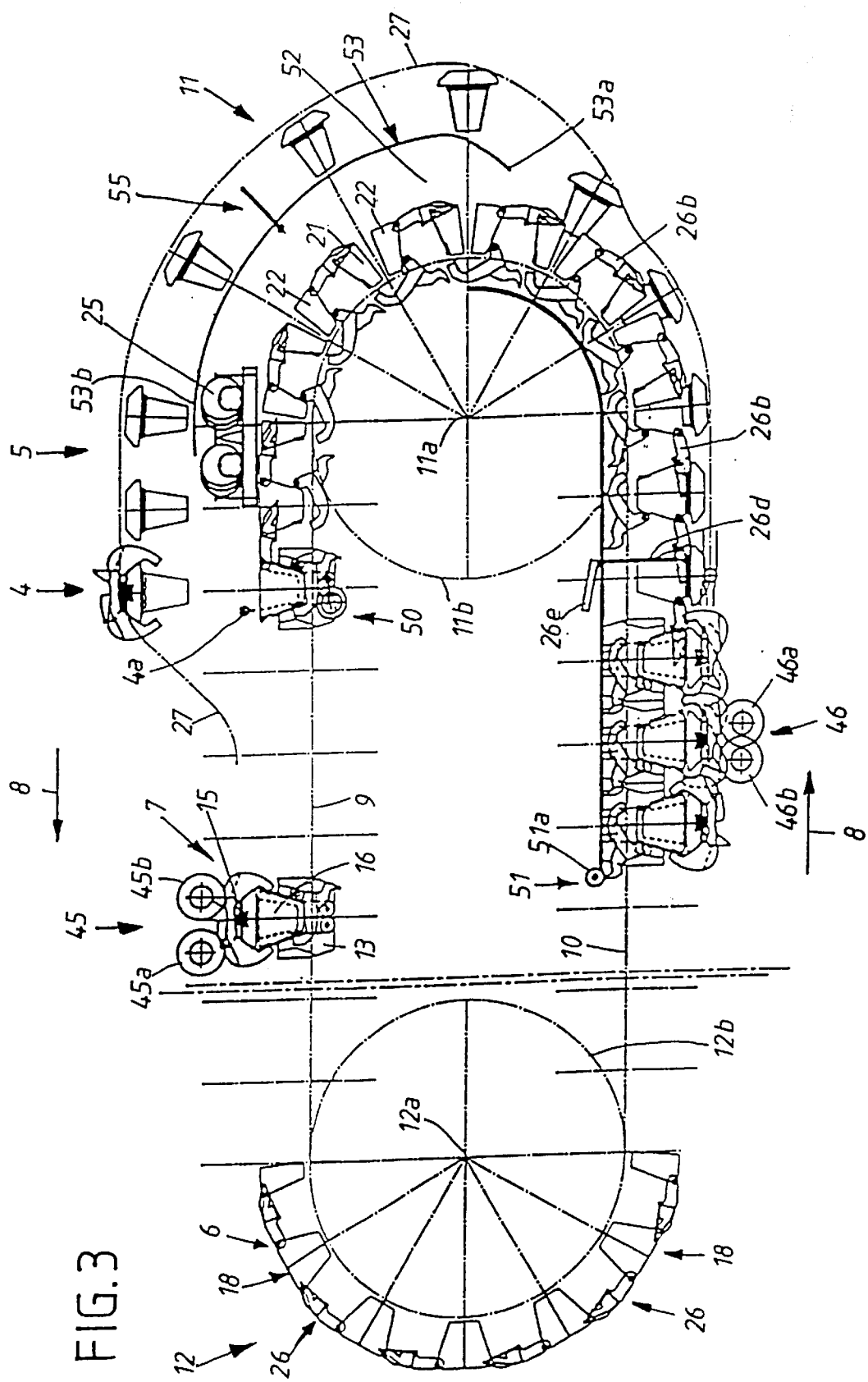
FIG. 3 schematically shows part of the interior of the oven of FIG. 1 in the region of the front head and the rear turning point of the baking tong chain, showing only the parts of the oven, baking tong chain, baking tongs and baking molds that cooperate with one another.

FIGS. 1–20 show various parts of an exemplary embodiment of an elongated baking oven with a circulating baking tong chain for producing thin-walled, cone- or cup-shaped molded articles, from baking or pouring compositions that expand during the baking process, are placed in the single-row baking molds of the baking tong chain, and are baked in them to form thin-walled, cone- or cup-shaped molded articles. The oven 1 has an elongated baking chamber 2 and a front head 3 preceding it, in which a pouring station 4 for the baking or pouring compositions and a discharge station 5 for the baked, thin-walled, cone- or cup-shaped molded articles. Disposed in the interior of the oven 1 is an endless baking tong chain 6, which comprises linkless, structurally identical, open- and closable baking tongs 7 and which circulates during the operation of an oven 1 in a closed path in the direction of the arrow 8. The path of the baking tong chain 6 includes a substantially horizontal upper transport plane 9, which extends in the oven 1 from the discharge station 5 disposed in the front head 3 through the pouring station 4 downstream in the travel direction 8 as far as the interior of the baking chamber 2, as well as a substantially horizontal, lower transport plane 10, which extends in the oven 1 in the travel direction 8 from the baking chamber 2 into the front head 3, and a front turning point 11, located in the front head 3 and linking together the two transport planes 9, 10 located one above the other, and a rear turning point 12 that is located in the baking chamber 2 and links together the two transport planes 9, 10.

1.1. Baking Tong and Baking Mold

The elongated, open- and closable baking tongs 7 of the baking tong chain 6, which are open on one end, are disposed on the oven 1 with their longitudinal extent crosswise to the travel direction 8 of the baking tong chain 6. Each baking tong 7 has an elongated lower tong part 13 and an elongated upper tong part 15, parallel to it, as well as an elongated, lateral guide sword 14, which is fixedly connected to the upper tong part 15 and is guided displaceably in the lower tong part 13 perpendicular to the travel direction 8.

In each baking tong 7, a single-row, open and closable baking mold 16 that has six cone- or cup-shaped hollow mold chambers is received laterally beside the guide sword 14; this baking mold comprises an upper mold half 17, embodied as a male die, and a lower mold half 18, embodied as an open- and closable female die. In the baking tong 7, the baking mold 16 is disposed with the six conical mold cores 19 of its male die, located side by side, and the six conical mold recesses 20 of its female die, associated with the mold cores and also disposed side by side, all crosswise to the travel direction 8. The upper mold half 17 of the baking mold 16 is integrated with the main portion 15a of the upper tong part 15, which protrudes laterally past the upper mold half 17 of the baking mold 16 with its inner end region 15c adjacent to the guide sword 14 and with its opposed free end 15d. The lower mold half 18 of the baking mold 16 is received in the main portion 13a of the lower tong part 13 of the baking tong 7.

1.2. Baking Mold

The baking mold 16 contained in the baking tong is divided by a main mold parting plane parallel to the travel direction 8 of the baking tong 7 into the upper mold half 17, which is integrated with the main portion 15a of the upper tong part 15, and the lower mold half 18, which is received in the main portion 13a of the lower tong part 13. The conical mold cores 19 of the upper mold half 17 and the conical mold recesses 20 of the lower mold half 18 are each arranged with their longitudinal axes perpendicular to the main mold parting plane, and on their respective upper ends 19b and 20a they have sealing faces 17a and 18a, respectively associated with the main mold parting plane and pointing toward the other mold half 18 and 17, respectively. When the baking mold 16 is closed, these sealing faces 17a, 18a cooperate, and they close off the hollow baking chamber at the main mold parting plane, which chamber is defined respectively by a mold core 19 protruding downward past the main mold parting plane and a mold recess 20 that is open at the top relative to the main mold parting plane. To allow the gases produced during baking in the baking or pouring composition enclosed in the respective hollow baking chamber to escape from the closed hollow baking chamber, vapor channels that bypass the sealing faces 17a, 18a may be provided on the upper end 19b of the mold cores 19.

The lower mold half 18 of the baking mold 16 is divided in turn by a second mold parting plane, perpendicular to the main mold parting plane and to the travel direction 8, into one front and one rear movable lower baking mold part 21, 22. These two lower baking mold parts 21, 22 each form one half of the female die and each contain one-half of the six mold recesses 20 of the lower mold half 18 of the baking mold 16. On their end faces toward one another or toward the second mold parting plane, the two movable lower baking mold parts 21, 22 are provided with sealing faces 21a, 22a, facing one another for the sake of laterally sealing off the mold recesses 20 in the second mold parting plane. As the baking tong 7 circulates, the front lower baking mold part 21 leads ahead in the travel direction 8 of the second mold parting plane of the baking mold 16 circulating along with the baking tong 7, while the rear lower baking mold part 22 trails in the travel direction 8 after the second mold parting plane of the baking mold 16 circulating with the baking tong 7.

1.3. Circulating Baking Tong Chain

The open- and closable baking tongs 7 are secured on their lateral face ends of their lower tong parts 13 to the chain straps 23a, 24a of two endless transport chains 23, 24, which together with the baking tongs 7 form the endless baking tong chain 6 of the oven 1. The two transport chains 23, 24 each run through the upper and lower transport planes 9, 10 and the front and rear turning points 11, 12 via front and rear chain wheels 11b and 12b, respectively, that are each rotatable about the respective center axis 11a and 12a of the front and rear turning point 11 and 12. The endless baking tong chain 6 is set to circulating in the travel direction 8 by means of a drive motor, not shown in the drawings, in the oven 1; the individual baking tongs 7 with their baking molds 16 pass from the front head 3 through the baking chamber 2 and back again to reach the front head.

During one circuit of the baking tong chain 6, at each of the open baking tongs 7 moving past the pouring station 4, a quantity of a baking or pouring composition that is precisely adapted to the baking mold 16 is poured by the stationary pouring device 4a into the closed female die of the opened baking mold 16. Next, the baking mold 16 is closed by closure of the baking tong 7 and is transported, closed, through the baking chamber 2 back into the front head 3. On closure of the baking mold 16, the baking or pouring composition is shaped between the male and female dies of the baking mold 16 into the thin-walled, cone- or cup-shaped molded articles. On passing through the baking chamber 2, the baking or pouring composition is baked in the closed baking mold 16 between the male and female dies to produce the thin-walled cone- and cupshaped molded articles 25. In the front head 3, the baking tong 7 and the baking mold 16 contained in it are opened all the way, and the baked, cone- or cup-shaped molded articles 25 are pushed out of the opened female die of the baking mold 16 with the aid of the mold cores 19 of the male die and guided between the lower and upper mold halves 17, 18 to the discharge station 5, where the baked molded articles 25 are transported laterally out of the oven 1. After passing through the discharge station 5, the female die, with the baking mold 16 and the baking tong 7 both opened, is closed, and the baking tong 16 is transported back to the pouring station 4, where a certain quantity of baking or pouring composition is again placed in the closed female die of the opened baking mold 16 while the baking tong 7 is open.

With the baking mold 16 closed, the two mold halves 17, 18, with their six mold cores 19 and their six mold recesses 20, form six identically-sized, cone- or cup-shaped hollow chambers. A quantity of a baking or pouring composition adapted to the volume of the hollow chambers is poured into each of these hollow chambers and shaped in each of the six hollow chambers into a thin-walled, cone- or cup-shaped molded article. In each of the six hollow chambers, the baking or pouring composition, shaped into a cone- or cup-shaped molded article, is baked during the baking process into the baked, cone- or cup-shaped molded articles 25. The quantity of heat required for the baking process is supplied to the baking or pouring composition enclosed in the closed baking mold 16 between the male and female dies via the externally heated baking mold 16. To that end, elongated, stationary heating devices, such as gas burners, not shown in the drawings, are provided in the baking chamber 2 of the oven 1, extending in the longitudinal direction of the oven 1; the endless baking tong chain 6, with the baking molds 16 contained in its baking tongs 7 moves past these stationary heaters in the longitudinal direction.

On passing the front head 3, the open- and closable baking molds 16 are opened and closed at their main mold parting planes by the baking tongs 7 contained in them, perpendicular to the main mold parting plane. To that end, in each baking tong 7, the upper tong part 15 is moved up and down with its guide sword 14 in the lower tong part 13 perpendicular to the main mold parting plane.

At its second mold parting planes, conversely, the openable and closable baking molds 16 are opened and closed by activatable and deactivatable movement mechanisms 26. These movement mechanisms 26 are located inside the baking tong chain 6 between the individual baking tongs 7 in the region of the main mold parting planes of the baking tongs 7, and they each have two elongated control straps 26a, 26b that are parallel to the travel direction 8. The two control straps 26a, 26b of one movement mechanism 26 are associated with the two baking molds 16 of two adjacent baking tongs 7 and are each located in the region of the edges of the baking molds 16 that are parallel to the travel direction 8. Each movement mechanism 26 includes one inner control strap 26a, adjacent to the guide swords 14 of these two baking tongs 7, and one outer control strap 26b, adjacent to the free ends 15d of the upper tong parts 15 of these two baking tongs 7. In the activated state of the movement mechanism 26, its two control straps 26a, 26b link together the mutually adjacent, movable lower baking mold parts 21, 22 of the two baking tongs 7 associated with it. As a result, in both baking tongs 7, the lower baking mold part 21, 22 located in the lower tong part 13 of the respective baking tong 7 is moved by the movement mechanism 26 toward the second mold parting plane of the respective baking mold 16 and back away from it again when the movement mechanism 26, together with the two baking tongs 7 associated with it inside the baking tong chain 6, passes the front turning point 11 of the baking tong chain 6.

During the circulation of the baking tong chain 6, the lower tong parts 13 of the baking tongs, linked to one another by the transport chains 23, 24, on the one hand and the upper tong parts 15 of the baking tongs 7, connected to the lower tong parts 13 via the guide swords 14 of the baking tongs 7, on the other hand, and also the movement mechanisms 26 of the baking tong chain 6 in the oven 1 disposed approximately in the main mold parting planes of the baking molds 16 of the baking tongs 7 all take different, intrinsically closed paths.

The lower tong parts 13 of the baking tongs 7 pass in the oven 1 through an inner path that is specified by the two lateral transport chains 23, 24 of the baking tong chain 6. The inner path of the lower tong parts 13 is defined by the path of the two transport chains 23, 24, which is shown in dot-dashed lines in FIG. 1 and extends through both transport planes 9, 10 and via both turning points 11, 12. Toward the outside, the inner path of the lower tong parts 13 is defined by the path, parallel to the path of the two transport chains 23, 24, that is taken by the main mold parting planes of the baking molds 16; this path extends in the oven 1 outside the path of the two transport chains 23, 24, at a predetermined distance from it and parallel to it.

The movement mechanisms 26 of the baking tong chain 6 traverse a middle path, located just below the path of the main mold parting planes of the baking molds 16 and extending parallel to it, in the oven 1.

The upper tong parts 15 in the oven 1 traverse an outer path, which is predetermined inside the baking chamber 2 by the closed baking tongs 7 and inside the front head 3 by the stationary guide rails 27, shown in dot-dashed lines, along which the control rollers 28 of the particular upper tong part 15, provided on both face ends of the upper tong parts 15, travel. The outer path of the upper tong parts 15 is defined toward the inside by the path of the free ends 19a of the mold cores 19 of the upper mold halves 17 of the baking molds 16 and on the outside by the path of the control rollers 28 of the upper tong parts 15. Inside the baking chamber 2, the baking tongs 7 are closed. In each baking tong 7, the mold cores 19 of the upper mold half 17, which protrude downward past the main mold parting plane from the upper tong part 15, protrude into the mold recesses 20, open toward the main mold parting planes, of the lower mold half 18 of the baking mold 16 contained in the lower tong part 13. The path of the free ends 19a of the mold cores 19 which defines the outer path of the upper tong parts 15 on the inside extends in the baking chamber between the path of the transport chains 23, 24 and the middle path of the movement mechanisms 26. The path of the main mold parting planes of the baking molds 16, which limits the inner path of the lower tong parts 13 toward the outside, extends in the baking chamber between the middle path of the movement mechanisms 26 and the path of the control rollers 28 of the upper tong parts 15.

When the baking tong chain 6 passes the front head, then in each individual baking tong first the mold cores 19 mounted on the upper tong part 15 are pushed out by the upper tong part 15 of the mold recesses 20 of the lower mold half 18 contained in the lower tong part 13. Next, the mold cores 19 mounted on the upper tong part 15 are transported by the upper tong part 15 at a distance from the mold recesses 20 of the lower mold halves 18 and are then reintroduced into the mold recesses 20 of the lower mold halves 18 by the upper tong part 15. The path, corresponding to these motions of the upper tong part 15, of their control rollers 28 extends in the front head initially with the spacing, corresponding to the closed baking tongs 7, parallel to the middle path of the movement mechanisms 26. This spacing then gradually increases up to the front turning point 11. In the lower half of the front turning point 11, this spacing increases over a large arc to somewhat more than twice the height of the mold cores 19, and then remains the same over the upper half of the front turning point 11 as far as the pouring station 4, and then after the pouring station 4 decreases again down to the magnitude corresponding to the closed baking tongs.

Independently of the spatial position of the baking tongs 7 within the oven 1, each of the baking molds 16 contained in them point with the free ends 19a of their mold cores 19, or the tapered ends 20a of their mold recesses 20, away from the outer path of the upper tong parts 15 toward the inner path of the two transport chains 23, 24. On passing through the oven 1, the spatial positions of the baking tongs 7 change, and the free ends 19a of the mold cores 19 point downward in the upper transport plane 9 and upward in the lower transport plane 10, and at the two turning points 11, 12 they each point radially to the respective center axis 11a, 12a of the respective turning point 11, 12.

1.4. Baking Tongs

Figure 4:
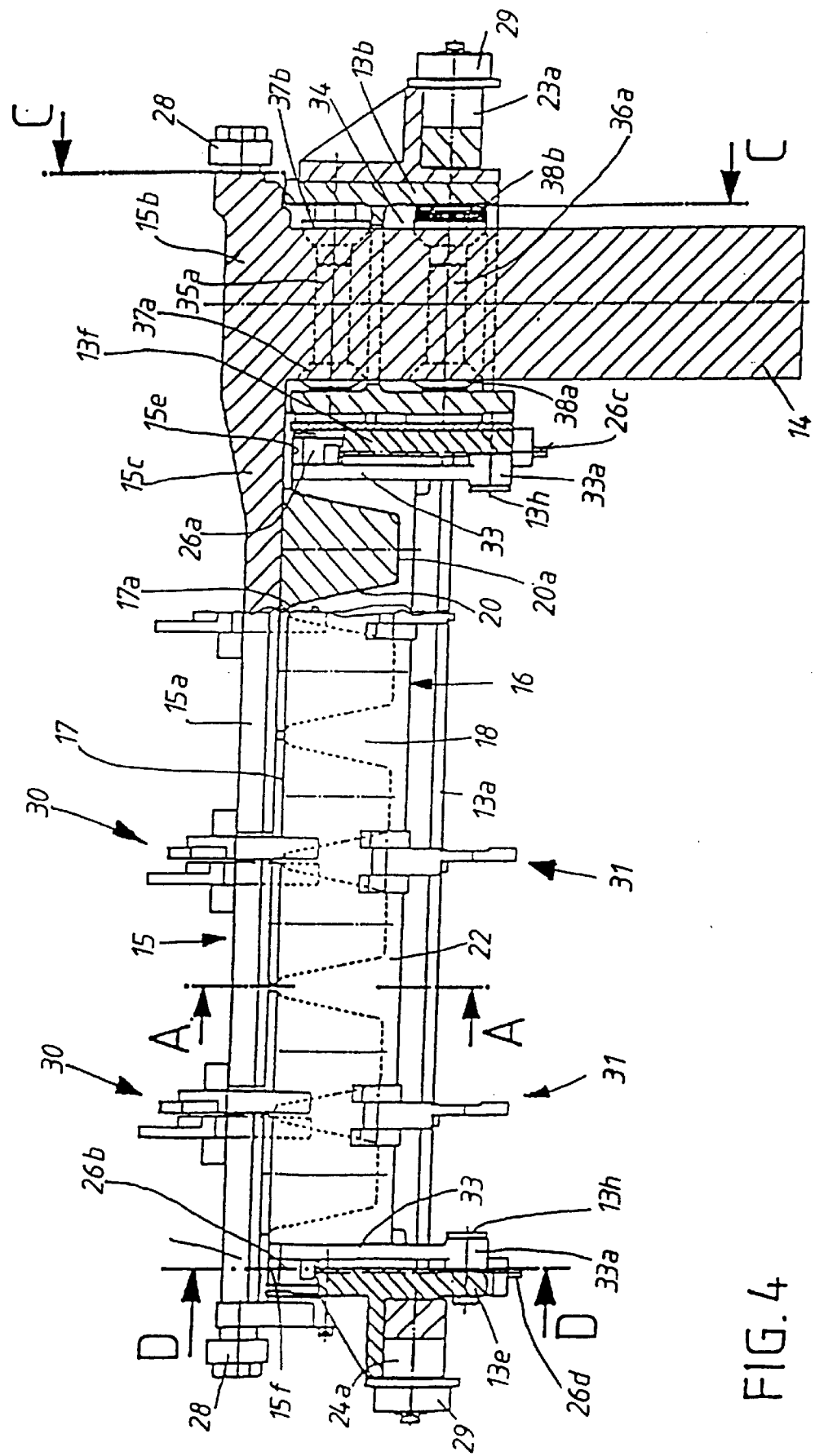
FIG. 4 shows the back side of a baking tong of the oven of FIG. 1 in the upper transport plane of the oven after passing the closing station intended for the upper clamping device; the baking tong and its baking mold are shown closed, the upper and lower clamping devices are shown tightened to the closed baking mold, and the portion of the baking tong containing the lateral guide sword is shown partly in section.
Figure 7:
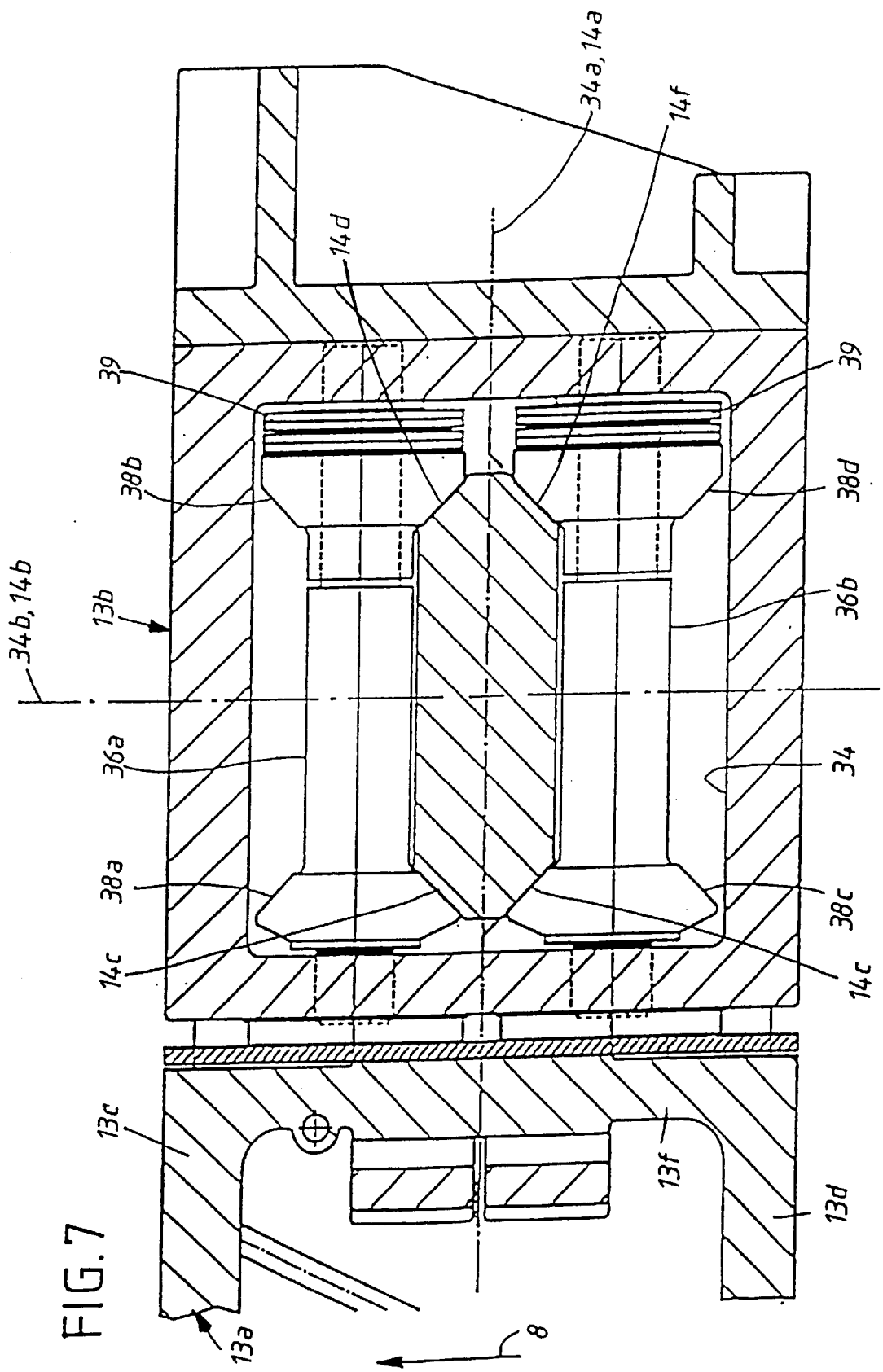
FIG. 7 shows a horizontal cross section, parallel to the travel direction, of the part of the baking tong of FIG. 4 containing the lateral guide sword, taken along the line E—E of FIG. 5.
Figure 8:
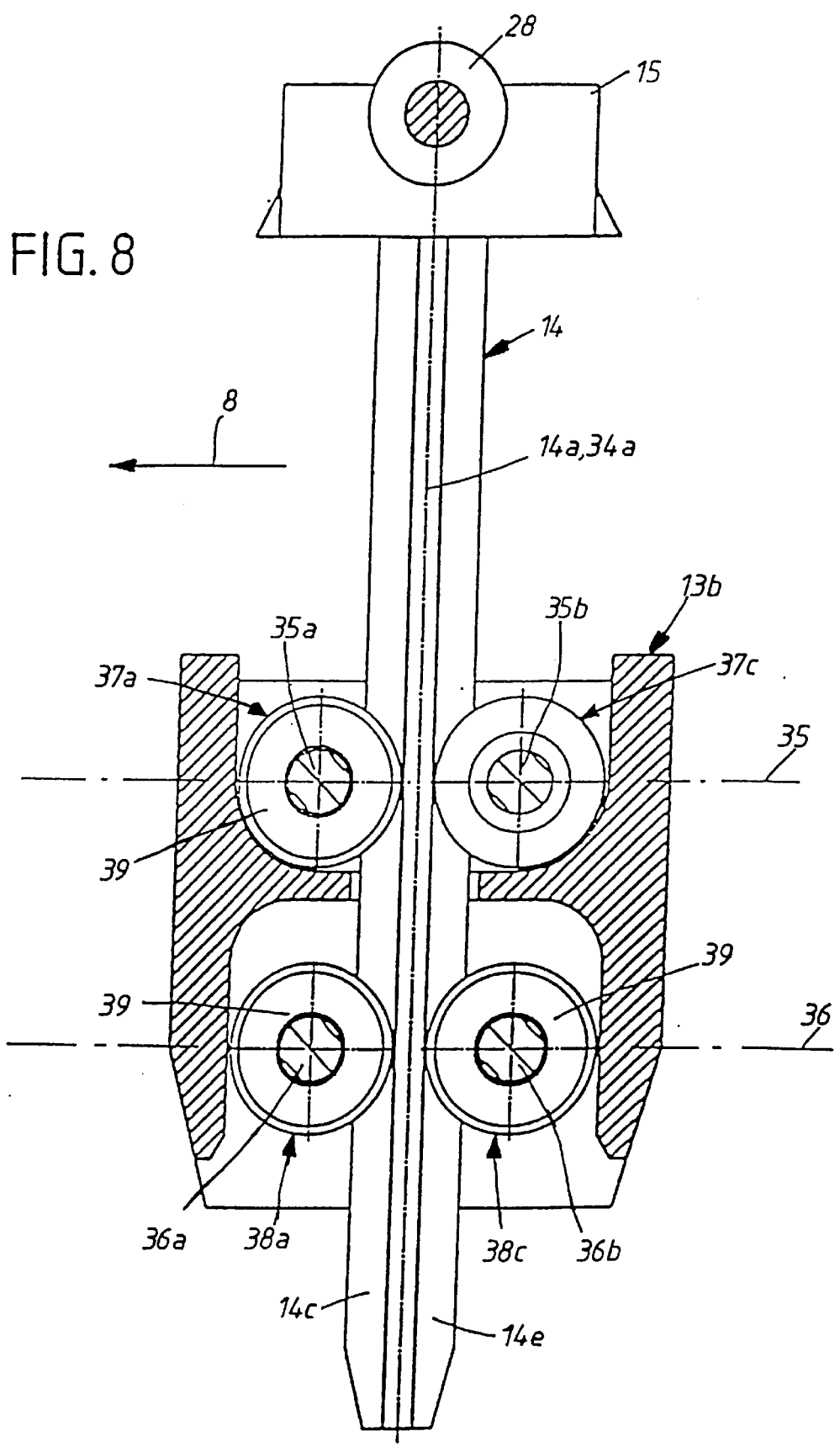
FIG. 8 shows a cross section through a partly open baking tong of FIG. 4 along the line C—C of FIG. 4.
Figure 9:
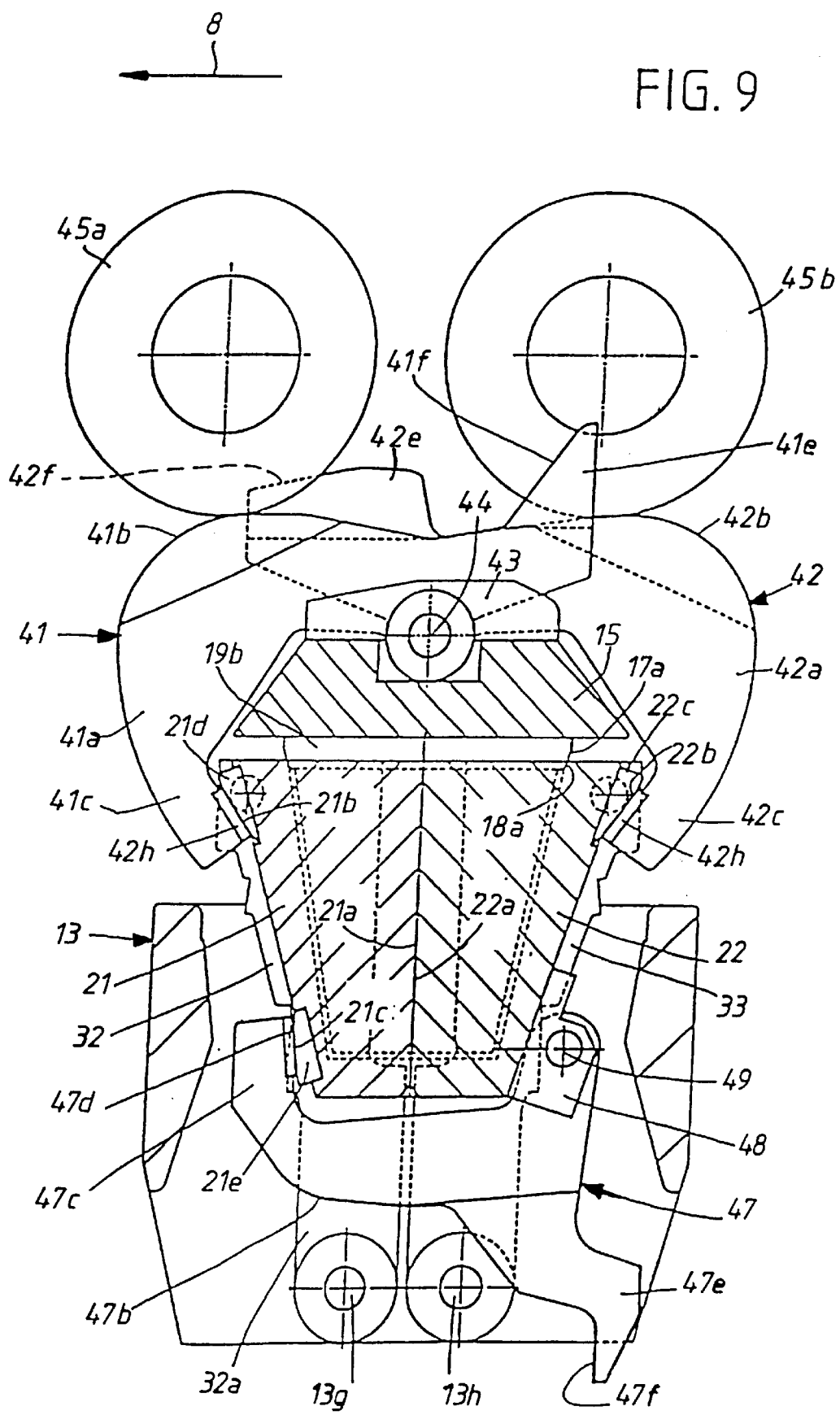
FIG. 9 shows a cross section of the baking tong of FIG. 4 along the line A—A of FIG. 4.
Figure 10:
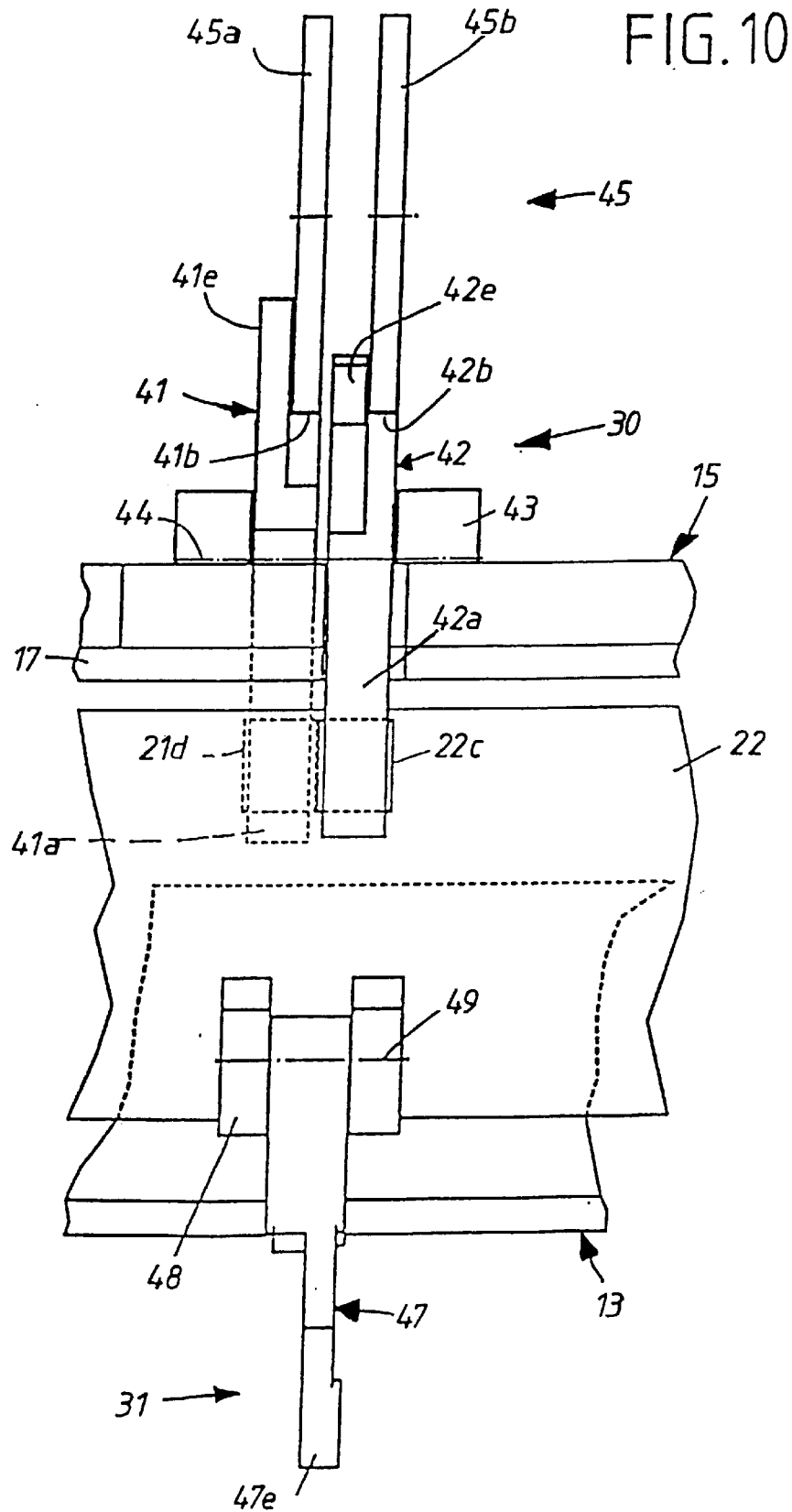
FIG. 10 shows the back side of the baking tong of FIG. 9 in the region of two clamping devices disposed one above the other and tightened against the closed baking mold.
Figure 11:
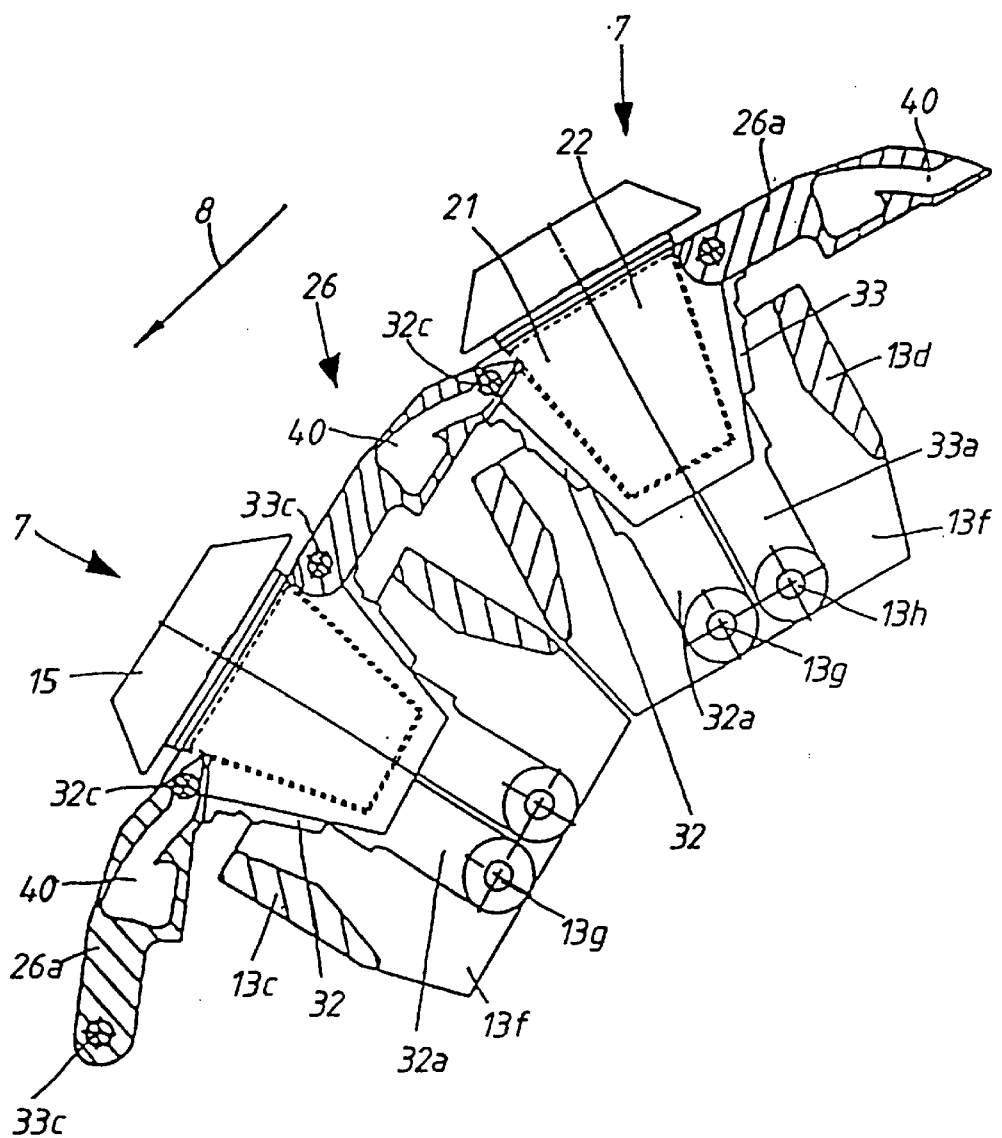
FIG. 11 shows a portion of the baking tong chain in the region of the rear turning point of the baking tong chain, showing two successive closed baking tongs in a vertical section, parallel to the travel direction, along the line D—D of FIG. 4.
Figure 12:
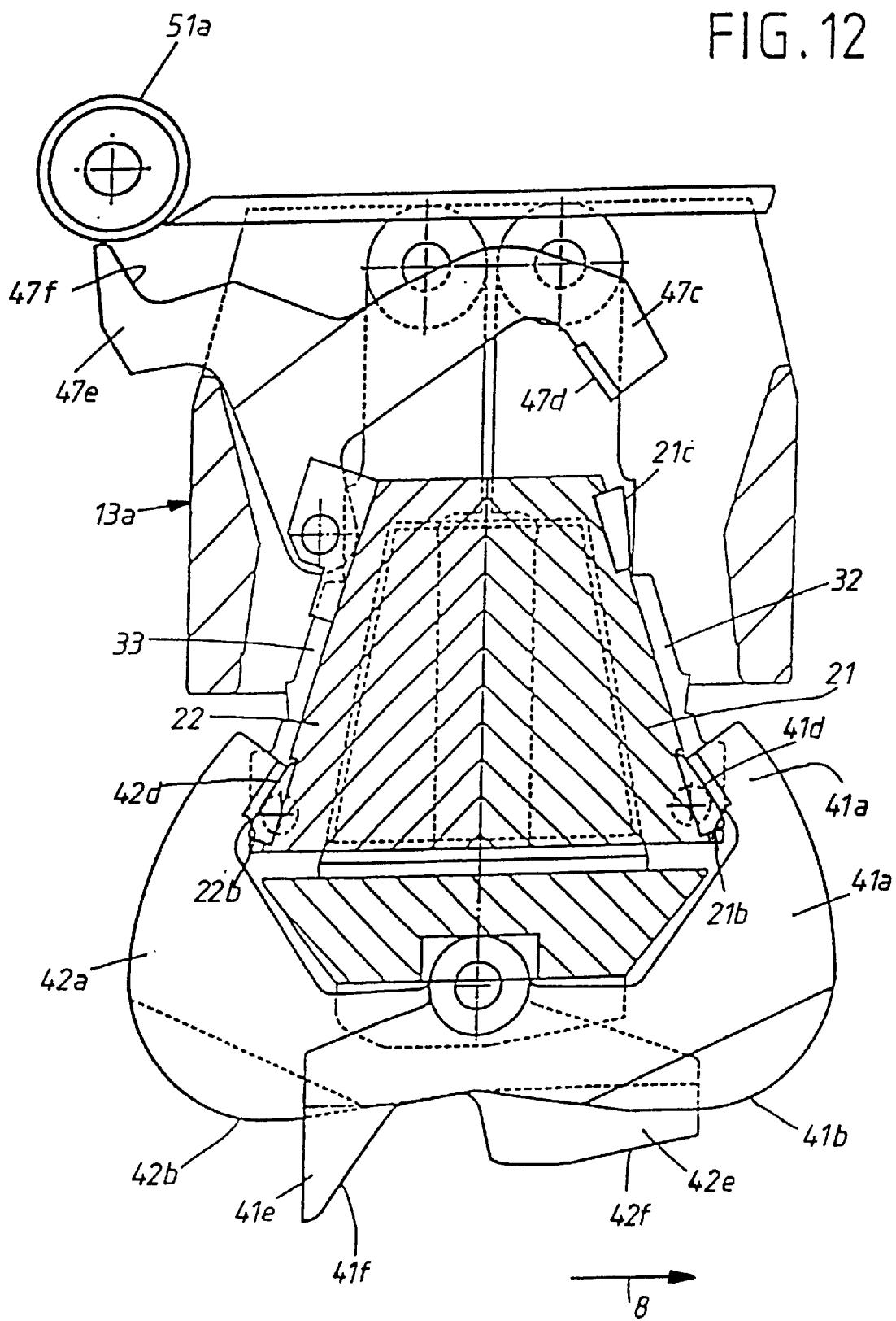
FIG. 12 shows a cross section, essentially corresponding to FIG. 9, through a baking tong which is disposed in the opening station intended for the lower clamping devices; the region of two clamping devices disposed one above the other is shown, of which the upper one is tightened against the closed baking mold and the lower one is loosened from the closed baking mold.
Figure 13:
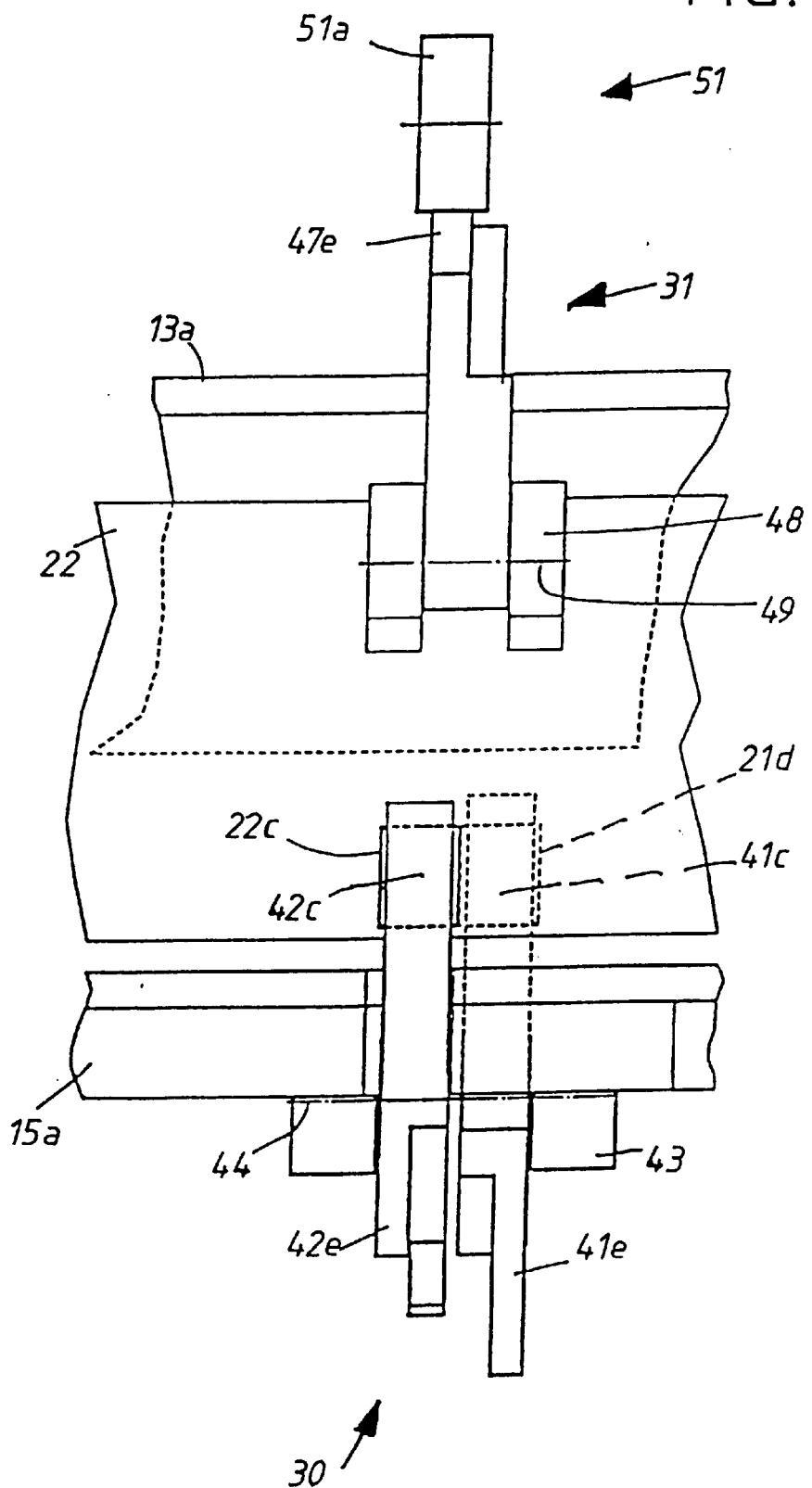
FIG. 13 shows the back side of the baking tong of FIG. 12 in the region of the two clamping devices disposed one above the other.

FIG. 4 shows a closed baking tong, located in the baking chamber 2 of the oven 1 in the upper transport plane 9 crosswise to the travel direction 8, which is kept closed by a plurality of self-adjusting upper and lower clamping devices 30, 31 that directly engage the baking molds 16 contained in the baking tong. Three upper clamping devices 30 are provided on the baking mold 16 along its top side, and three lower clamping devices 31 are disposed along its underside, in each case crosswise to the travel direction 8 and spaced apart from one another. One upper clamping device 30 and one lower clamping device 31 each are precisely one above the other and are each located between two adjacent mold cores 19 and mold recesses 20, respectively. These clamping devices 30, 31 each engage the baking mold 16 itself and are tightened against or loosened from the closed baking mold 16 if the baking mold has been closed by the motion of the upper tong part 15 and by the motions of the movement mechanisms 26 that engage its lower baking mold parts 21, 22.

When the clamping devices 30, 31 are tightened against the baking mold 16, first the plays of motion that are present inside the clamping devices 30, 31, between the two mold halves 17, 18, and between the two lower baking mold parts 21, 22 and which are required to compensate for different thermal expansions as the baking or pouring composition is poured into the hot baking mold 16 and during heating of the baking mold 16 during the circulation of the baking tong, are each eliminated. As a result of the tightening of the clamping devices 30, 31, the individual parts 17, 21, 22 of the baking mold 16 are pressed against one another without play, by their mutually associated sealing faces 17a, 18a and 21a, 22a, respectively. Next, the clamping devices 30, 31 on the closed baking mold 16 are tightened further, until the baking molds 17, 21, 22 are pressed against one another by the clamping devices 30, 31 with a respective predetermined prestressing force at the mutually associated sealing faces 17a, 18a and 21a, 22a of the baking mold parts 17, 21, 22.

On passing through the baking chamber 2, the baking mold 16 and with it the baking tong 7 are held closed by the clamping devices 30, 31 of the baking mold 16 with these prestressing forces, applied to the closed baking mold 16 of the baking tong 7, counter to the pressure of the gases produced in the closed baking mold 16 during the baking process.

When the clamping devices 30, 31 are loosened, the prestressing forces that keep the baking mold 16 closed are first reduced at their mutually associated sealing faces 17a, 18a and 21a, 22a; then the respective play of motion in the clamping devices 30. 31 between the two mold halves 17, 18 and between the two lower baking mold parts 21, 22 is re-established, and finally the individual baking mold parts 17, 21, 22 are released for a motion through the tong parts 13, 15 or for a motion through the movement mechanisms 26.

1.4.1. Upper Tong Part

The upper tong part 15 of the baking tong 7 includes a main portion 15a, with which the upper mold half 17 of the baking mold 16 with its conical mold cores 19 is integrated, and an upper guide head 15b, laterally adjoining the main portion 15a, in which one end of the guide sword 14 of the baking tong 7 is immovably restrained.

On the underside of the main portion 15a, toward the main mold parting plane, there is one control face 15e, 15f each for the control straps 26a, 26b of the movement mechanism 26 leading ahead of the baking tong 7 in the travel direction 8, one face being disposed on the inner end region 15c adjoining the upper guide head 15b and the other on the free end 15d opposite it. The inner control face 15e provided on the inner end region 15c is associated with the inner control strap 26a of this movement mechanism 26, and the outer control face 15f provided on the free end 15d is associated with the outer control strap 26b of this movement mechanism 26.

On its lateral face ends, the upper tong part 15 has the two control rollers 28, which in engagement with the stationary guide rails 27 of the front head 3 derive the relative motions, perpendicular to the main mold parting plane of the baking mold 16, of the upper tong part 15 with respect to the lower tong part 13 required for opening and closing the baking tong 7 from the circulating motion of the baking tong 7.

1.4.2. Guide Sword

The elongated guide sword 14 protrudes downward toward the lower tong part 13 out of the upper guide head 15b of the upper tong part 15, perpendicular to the main mold parting plane of the baking mold 16. The guide sword 14 has a longitudinal center plane 14a, perpendicular to the travel direction 8, which is advantageously located in the second mold parting plane of the baking mold 16, and a transverse central plane 14b that is parallel to the travel direction 8. The width of the guide sword 14 measured perpendicular to the travel direction 8 is approximately three times the thickness of the guide sword 14 measured in the travel direction 8. The guide sword 14 has an inner narrow side, adjacent to the baking mold 16 and oriented toward the baking mold 16, and an outer narrow side, remote from the baking mold 16, as well as a front and a rear broad side. In the baking tong 7 circulating in the travel direction 8, the front broad side of the guide sword 14 leads ahead of the second mold parting plane of the baking mold 16, while the rear broadside trails. One guide face 14c, 14d, 14e, 14f of the guide sword 14 is formed on each of the four longitudinal edges, each common to one narrow side and one broad side, of the guide sword 14.

The front, inner guide face 14c disposed on the longitudinal edge of the guide sword 14 common to the inner narrow side and the front broad side, and the rear, inner guide face 14e disposed on the longitudinal edge of the guide sword 14 common to the inner narrow side and the rear broad side are disposed symmetrically relative to the longitudinal center plane 14a and together form an inner guide path of the guide sword 14. The front, outer guide face 14d disposed on the longitudinal edge of the guide sword 14 common to the outer narrow side and the front broad side, and the rear, outer guide face 14f disposed on the longitudinal edge of the guide sword 14 common to the outer narrow side and the rear broad side are likewise disposed symmetrically to the longitudinal center plane 14a and together form an outer guide path of the guide sword 14. The spacing between the inner and outer guide paths of the guide sword 14 is approximately 3.5 to 4 times the spacing between the front and rear guide faces 14c, 14e and 14d, 14f, respectively.

1.4.3. Lower Tong Part

☐The lower tong part 13 of the baking tong 7, located between the main mold parting plane of the baking molds 16, likewise includes a main portion 13a, in which the lower mold half 18 is received with its two movable lower baking mold parts 21, 22, and a lower guide head 13b, laterally adjoining the main portion 13a, in which the guide sword 14 of the baking tong 7, which is perpendicular to the main mold parting plane, is guided displaceably perpendicular to the main mold parting plane. The lower tong part 13 is secured to the chain straps 23a, 24a of the two transport chains 23, 24, which in turn are provided with lateral running wheels 29, with which the baking tong chain 6 is supported in the upper and lower transport plane 9 and 10, respectively of the oven 1 on laterally mounted rails, not shown in the drawing.

1.4.3.1. Main Portion of the Lower Tong Part

The boxlike main portion 13a of the lower tong part 13, which is open at the bottom, has two transverse walls 13c, 13d, disposed spaced apart from one another in the travel direction 8 and extending crosswise to the travel direction 8, and two side walls 13e, 13f disposed spaced apart from one another crosswise to the travel direction 8 and extending in the travel direction 8. In the main portion 13a of the lower tong part 13, the two elongated lower baking mold parts 21, 22 are disposed between the two transverse walls 13c, 13d crosswise to the travel direction 8 and are each pivotally supported on the two side walls 13e, 13f about a pivot axis that is parallel to both mold parting planes. In each side wall 13e, 13f in the main portion 13a of the lower tong part 13, one thrust rod 26c, 26d, which is displaceable perpendicular to the main mold parting plane, of the movement mechanism 26 that leads ahead of the baking tong 7 in the travel direction is guided in a vertical guide bore.

Each lower baking mold part 21 and 22 is firmly connected by its two ends adjacent to the respective side walls 13e, 13f to a baking mold carrier 32 and 33, respectively, which has a bearing arm 32a and 33a, protruding downward beyond the lower end, closer to the transport chains 23, 24, of the respective lower baking mold part 21 and 22; this bearing arm is pivotally supported on an axle bolt 13g, 13h protruding inward from the adjacent side wall 13e, 13f below the path of the transport chains 23, 24. The axle bolts 13g and 13h of the two baking mold carriers 32 and 33 of a respective lower baking mold part 21 and 22 face one another and each form one pivot axis, parallel to both mold parting planes of the baking mold 16, for the respective lower baking mold part 21 and 22. Each baking mold carrier 32 and 33 has an end face, toward the second mold parting plane. with a stop face 32b and 33b parallel to the second mold parting plane; each of these stop faces cooperates with a respective stop face 13i and 13k, remote from the second mold parting plane, of a stop block 13m protruding inward from the adjacent side wall 13e, 13f.

The two baking mold carriers 32 firmly associated with the front lower baking mold part 21 has a lateral face end, remote from the front lower baking mold part 21 and oriented toward the respectively adjacent side wall 13e, 13f of the main portion 13a of the lower tong part 13, on which a front cylindrical control bolt 32c, parallel to the second mold parting plane, is mounted, which bolt is associated with the movement mechanism 26 leading ahead of the respective baking tong 7 in the travel direction. The two baking mold carriers 32 firmly associated with the rear lower baking mold part 22 has a lateral face end, remote from the rear lower baking mold part 22 and oriented toward the respectively adjacent side wall 13e, 13f of the main portion 13a of the lower tong part 13, on which a rear cylindrical bearing bolt 32c, parallel to the second mold parting plane, is mounted, which bolt is associated with the movement mechanism 26 trailing the respective baking tong 7 in the travel direction.

1.4.3.2. Guide Head of the Lower Tong Part

The lower guide head 13b includes an opening 34, embodied perpendicular to the main mold parting plane of the baking mold 16 and symmetrically to the second mold parting plane, in which opening the guide sword 14 of the baking tong 7 is guided displaceably perpendicular to the main mold parting plane and parallel to the second mold parting plane. The opening 34, analogously to the guide sword 14, has a longitudinal center plane 34a, located in the second mold parting plane and perpendicular to the travel direction 8, and a transverse center plane 34b parallel to the travel direction 8. In each of two planes 35, 36, disposed at different distances from the main mold parting plane and parallel to it, there is one front roller body 35a, 36a and one rear roller body 35b, 36b, each parallel to the longitudinal center plane 34a. With the baking tong 7 circulating in the travel direction 8, the two front roller bodies 35a, 36a lead ahead of the second mold parting plane, and the two rear rollers bodies 35b, 36b trail after it. The two roller bodies 35a, 35b and 36a, 36b, each pair disposed in one plane 35 and 36, respectively, each carry four guide rollers 37, disposed in pairs symmetrically to the two center planes 34a, 34b of the opening 34; the running faces oblique to the travel direction 8 of these guide rollers are in engagement with the corresponding guide faces 14c, 14d, 14e, 14f of the guide sword 14, which are also oblique to the travel direction 8.

The front inner guide roller 37a located in the upper plane 35 and the front inner guide roller 38a located in the lower plane 36 are each in engagement with the front inner guide face 14c of the guide sword 14. The front outer guide roller 37b located in the upper plane 35 and the front outer guide roller 38b located in the lower plane 36 are each in engagement with the front outer guide face 14d of the guide sword 14. The rear inner guide roller 37c located in the upper plane 35 and the rear inner guide roller 38c located in the lower plane 36 are each in engagement with the rear inner guide face 14e of the guide sword 14. The rear outer guide roller 37d located in the upper plane 35 and the rear outer guide roller 38d located in the lower plane 36 are each in engagement with the rear outer guide face 14f of the guide sword 14.

The front and rear roller bodies 35a, 36a and 35b, 36b each carry one inner and one outer guide roller 37a, 37c and 37d, 38a and 38d, and 38c and 38d, respectively; the inner guide rollers 37a, 37c, 38a, 38c are embodied integrally with the respective roller body 35a, 36a and 35b, 36b, while the outer guide rollers 37b, 37d, 38b, 38d are disposed axially displaceably and adjustably crosswise to the travel direction 8 on the respective roller body 35a, 36a and 35b, 36b. Of the four roller bodies 35a, 26a, 35b, 36b, only the upper rear roller body 35b is supported axially nondisplaceably in the lower guide head 13b, while the three remaining roller bodies 35a, 36a, 36b are supported axially resiliently on one of their ends via cup springs 39 in the lower guide head 13b. The roller bodies 35a, 36a, 35b, 36b themselves are rotatably supported directly in the lower guide head 13b.

1.5. Movement Mechanisms

The movement mechanisms 26 disposed inside the baking tong chain 6 between the individual baking tongs are each disposed before and after one baking tong 7, so that the rear movement mechanism 26 of a first baking tong 7 is at the same time the front movement mechanism 26 of a second baking tong 7 trailing after the first baking tong 7 in the travel direction 8, while the rear movement mechanism 26 of the second baking tong 7 is at the same time the front movement mechanism 26 of a third baking tong 7 trailing after the second baking tong 7.

If the front movement mechanism 26 of the second baking tong 7 is activated, then on the one hand it moves the rear lower baking mold part 22 of the first baking tong 7 in the lower tong part 13 of the first baking tong 7 back and forth 10 relative to the second mold parting plane of the first baking tong 7, and on the other it also moves the front lower baking mold part 21 of the second baking tong 7 in the lower tong part 13 of the second baking tong 7 back and forth relative to the second mold parting plane of the second baking tong 7.

If the rear movement mechanism 26 of the second baking tong 7 is activated, then on the one hand it moves the rear lower baking mold part 22 of the second baking tong 7 in the lower tong part 13 of the second baking tong 7 back and forth relative to the second mold parting plane of the second baking tong 7, and on the other it also moves the front lower baking mold part 21 of the third baking tong 7 in the lower tong part 13 of the third baking tong 7 back and forth relative to the second mold parting plane of the third baking tong 7.

With the baking tong chain 6 circulating in the travel direction 8, the first baking tong 7 leads ahead of the front movement mechanism 26 of the second baking tong 7. That movement mechanism in turn leads ahead of the second baking tong 7 and trails the first baking tong 7. The second baking tong 7 in turn trails behind its front movement mechanism 26 and is ahead of its rear movement mechanism 26. This latter movement mechanism in turn trails after the second baking tong 7 and leads ahead of the first baking tong 7.

Each movement mechanism 26 spans the interstice, present inside the baking tong chain 6 in the region of the middle path of the movement mechanisms 26, between the baking tong 7 ahead of it and the baking tong 7 trailing behind it. The two control straps 26a, 26b of the movement mechanism 26 are pivotally connected at their front ends to the rear bearing bolts 33c mounted on the baking mold carriers 33 of the rear lower baking mold part 22 of the leading baking tong 7. The two control straps 26a, 26b span the interstice between the two baking tongs 7 as far as the front control bolts 32c mounted on the baking mold carriers 32 of the front lower baking mold part 21 of the trailing baking tong 7. The two control straps 26a, 26b have their rear ends extending counter to the travel direction 8 past these control bolts 32c.

Each control strap 26a, 26b has an inside, which is toward the rear lower baking mold part 22 of the leading baking tong 7 and the front lower baking mold part 21 of the trailing baking tong 7, and a top side, facing away from the inner path of the transport chains 23, 24, and an underside toward the inner path of the transport chains 23, 24. An elongated guide channel 40 open toward the inside is let into the inside of the control strap 26a, 26b, and a front control bolt 32c is guided on it, the control bolt being mounted on a baking tong carrier 32 of the front lower baking mold part 21 of the trailing baking tong 7.

The guide channel 40 has a front end, closed in the travel direction 8 and located closer to the front end of the control strap 26a, 26b, and a rear end, open counter to the travel direction 8 and located on the rear end of the control strap 26a, 26b. The guide channel 40 has an upper side wall 40b, adjacent to the top side of the control strap 26a, 26b, which side wall defines an outer path of motion of the control bolt 32c toward the outside. The guide channel 40 also has a lower side wall 40c, adjacent to the underside of the control strap 26a, 26b, which side wall defines an inner path of motion of the control bolt 32C and a portion of the outer path of motion thereof, toward the inside. The two paths of motion of the guide channel 40 are of different lengths and end with their front ends at the front end of the guide channel 40. Embodied on this end is a front stop face 40a, pointing rearward counter to the travel direction 8, for the control bolt 32c. The outer path of motion extends along the upper side wall 40b of the guide channel 40 as far as the rear end thereof and defined the inner path of motion toward the outside. In the lower side wall 40c of the guide channel 40, a step is formed between its front and rear ends, which forms a rear stop face 40d, pointing forward in the travel direction 8 for the control bolt 32c, on which stop face the inner path of motion ends with its rear end. The outer path of motion is defined on the inside, between its front end and the step, by the inner path of motion. The outer path of motion extends along the lower side wall 40c of the guide channel 40, past the step counter to the travel direction 8, as far as the rear end of the guide channel 40.

The outer path of motion of the guide channel 40, intended for the control bolt 32c, is associated with the release position of the control strap 26a, 26b of the deactivated movement mechanism 26. The inner path of motion of the guide channel 40 intended for the control bolt 32c is associated with the working position of the control strap 26a, 26b of the activated movement mechanism 26. The control strap 26a, 26b is pivoted back and forth between its release position and its working position primarily by the gravity acting upon it. It is pivoted back and forth between its release position and its work position with its front end about the rear bearing bolt 33c mounted on a baking mold carrier 33 of the rear lower baking mold part 22 of the leading baking tong 7.

When the baking tong chain 6 in the front head 3 passes the transition from the lower transport plane 10 to the front turning point 11, the mutual spacing between the bearing bolt 33c of a control strap 26a, 26b, which bolt is mounted on a baking mold carrier 33 of the rear lower baking mold part 22 of the leading baking tong 7, and the control bolt guided in it and mounted on a baking mold carrier 32 of the front lower baking mold part 21 of the trailing baking tong 7 increases. When the baking tong chain 6 then passes the transition from the front turning point 11 to the upper transport plane 9, the mutual spacing between the bearing bolt 33c, mounted on the leading baking tong 7, of the control strap 26a, 26b and the control bolt 32c guided in it and mounted on the trailing baking tong 7 decreases.

On passing the transition from the upper transport plane 9 to the rear turning point 12 in the baking chamber 2, the mutual spacing between the bearing bolt 33c of the control strap 26a, 26b, mounted on the leading baking tong 7, and the control bolt 32c guided in it and mounted on the trailing baking tong 7 increases. In the ensuing passage through the transition from the rear turning point 12 to the lower transport plane 10, the mutual spacing between the bearing bolt 33c of the control strap 26a, 26b mounted on the leading baking tong 7 and the control bolt 32c guided in it and mounted on the trailing baking tong 7 decreases.

On passing the front turning point 11 in the front head 3, the movement mechanisms 26 are activated, and their control straps 26a, 26b are pivoted into their working position. In this working position, the two control bolts 32c mounted on the baking tong 7 that trails the movement mechanism 26 each slide in the inner path of motion of the respective guide channel 40 along the lower side wall 40c thereof, in each case from the rearward- pointing front stop face 40a to the frontward-pointing rear stop face 40d and back again.

During the time that the spacing between the bearing bolts 33c and the control bolts 32c is increasing, the two control bolts 32c are moved in the inner paths of motion of the guide channels 40 first until they meet the rear stop faces 40d of the guide channels 40 of the two control straps 26a, 26b; then the further increase in the spacing between the bearing bolts 33c and the control bolts 32c is converted in each case into a pivoting motion of the lower baking mold part 21, 22 connected to the two bearing bolts 33c or to the two control bolts 32c, and as a result the female dies contained in the lower tong parts 13 of the baking tongs 7 adjacent to the respective movement mechanism 26 are opened.

During the time that the spacing between the bearing bolts 33c and the control bolts 32c is decreasing, the two control bolts 32c are moved in the inner paths of motion of the guide channels 40 first until they meet the front stop faces 40a of the guide channels 40 of the two control straps 26a, 26b; then the further decrease in the spacing between the bearing bolts 33c and the control bolts 32c is converted in each case into a pivoting motion of the lower baking mold part 21, 22 connected to the two bearing bolts 33c or to the two control bolts 32c, and as a result the female dies contained in the lower tong parts 13 of the baking tongs 7 adjacent to the respective movement mechanism 26 are closed.

On passing the rear turning point 12 in the baking chamber 2, the movement mechanisms 26 are deactivated, and their control straps 26a, 26b are pivoted into their release position. In this release position, the two control bolts 32c mounted on the baking tong 7 trailing the movement mechanism 26 slide in the outer paths of motion of the guide channels 40 along the upper side wall 40b, without coming into contact with the frontward-pointing rear stop face 40d at the step formed in the lower side wall 40c. As a result, the control straps 26a, 26b of the movement mechanisms 26 absorb in themselves the increases and decreases of the spacing between the bearing bolts 33c and the control bolts 32c in the outer paths of motion of the guide channels 40 without any change of any kind of the motion.

The activation of the control straps 26a, 26b of the movement mechanisms 26 takes place in the lower transport plane 10 before the front turning point 11 is reached, whereupon the upper tong parts 15 are moved slightly out of the still-closed female dies of the lower tong parts 13 with the upper clamping devices 30 loosened. As a result, the control faces 15e, 16f of the upper tong part 15 of the baking tong 7 that are associated with the control straps 26a, 26b of one movement mechanism 26 are moved so far away from the control straps 26a, 26b that the rear ends of the control straps 26a, 26b, by the gravity acting upon them, can pivot out of the release position into the work position, and the guide channels 40 come to rear with their lower side walls 40c on the two control bolts 32c.

In the oven 1, stationary control rails 26e, associated with the thrust rods 26c, 26d, located in the lower tong parts 13, of the movement mechanisms 26, precede the front turning point 11. These control rails 26e extend parallel to the travel direction 8 and are inclined relative to it. In a control strap 26a, 26b has not yet been activated, then the thrust rod 26c, 26d associated with it has its upper end on the underside of the control strap 26a, 26b and extends with its lower end upward beyond the upward- pointing underside of the baking tong 7. On passing the control rails 26a, the thrust rod 26c, 26d comes to rest with its lower end on the control rail 26e associated with it, and the thrust rod 26c, 26e is forced through the lower tong part 13 against the control strap 26a, 26b, which is thereby pivoted into its work position.

The deactivation of the control strap 26a, 26b of the movement mechanisms 26 takes place on passing through the front turning point 11, when the rear ends of the control straps 26a, 26b, by the gravity acting on them, can pivot out of the work position back into the release position, and the guide channels 40 come to rest with their upper side walls 40b on the two control bolts 32c. On closure of the baking tong 7, the control faces 15e, 15f of the upper tong part 15 that are associated with the control straps 26a, 26b approach the control straps 26a, 26b and any control straps 26a, 26b not yet located in the release position are pivoted by compulsion. The control faces 15e, 15f of the upper tong part 15 define the position of the two control straps 26a, 26b, with the baking tong 7 closed, in such a way that the lower side walls 50c of the guide channels 40 cannot come into engagement with the control bolts 32c.

1.6. Upper Clamping Devices

The structurally identical, self-adjusting upper clamping devices 30, each spaced apart from one another on the baking mold 16 crosswise to the travel direction 8, are each mounted on the upper tong part 15.

An upper clamping device 30 includes two two-armed clamping levers 41, 42, each disposed parallel to the travel direction 8, which are supported in a bearing 43, secured to the top side of the upper tong part 15, and can be pivoted side by side on a common pivot axis 44 located cross wise to the travel direction 8.

The front clamping lever 41, located farther away from the guide sword 14 of the baking tong 7, has a substantially C-shaped front clamping arm 41a, pointing forward from the pivot axis 44 in the travel direction 8, which fits over the leading front side, in the travel direction 8, of the upper tong part 15 and which on its rear side, remote from the upper tong part 15, has an outer, curved engagement face 41b for the engagement with a first, front closing roller 45a of a closing station 45, in which all the upper clamping devices 30 disposed side by side in one baking mold 16 are tightened simultaneously. The front clamping arm 41a of the front clamping lever 41 also has, on its free end remote from the pivot axis 44 and angled relative to this pivot axis, has a front clamping portion 41c, with a flat clamping face 41d oriented toward the pivot axis 44 on its front side toward the upper tong part 15. The front clamping lever 41 also has a rear actuating arm 41e, pointing rearward counter to the travel direction 8 from the pivot axis 44, which arm on its back side remote from the upper tong part 15 has an outer engagement face 41f for the engagement with a first, front opening roller 46a of an opening station 46.

The rear clamping lever 42, located closer to the guide sword 14 of the baking tong 7, has a substantially C-shaped rear clamping arm 42a, pointing rearward from the pivot axis 44 counter to the travel direction 8, which arm fits over the trailing back side, in the travel direction 8, of the upper tong part 15 and on its back side remote from the upper tong part 15 has an outer, curved engagement face 42b for the engagement with a second, rear closing roller 45b of the closing station 45. The rear clamping arm 42a of the rear clamping lever 42 also, on its free end remote from the pivot axis 44 and angled relative to this axis, has a rear clamping portion 42c, with a flat clamping face 42d toward the pivot axis 43 on its front side toward the upper tong part 15. The rear clamping lever 42 also has a front actuating arm 42e, pointing forward in the travel direction 8 from the pivot axis 44, which arm, on its back side remote from the upper tong part, has an outer, curved engagement face 42f for the engagement with a second, rear opening roller 45b of an opening station 46. An upper clamping device 30 also includes two outer, curved clamping faces 21b, 22b, each associated with one of its two two-armed clamping levers 41, 42, each face being mounted on the outside of one of the two pivotable lower baking mold parts 21, 22 of the lower mold half 18 of the baking mold 16, in each case near the main mold parting plane of the baking mold 16. These outer, curved clamping faces 21b, 22b are each disposed on the side face, extending crosswise to the travel direction 8, of an insert 21d, 22c, preferably of hard metal, let into the back side of the respective lower baking mold part 21, 22. The front, curved clamping face 21b mounted on the outside of the front lower baking mold part 21 near the main mold parting plane of the baking mold 16 is embodied as part of its own circular cylindrical face with a cylinder axis parallel to the pivot axis 44 and is associated with the front clamping portion 41c of the front clamping lever 41. By pivoting the front clamping lever 41 with the baking mold 16 closed, the flat clamping face 41d, disposed on the front clamping portion 41c of the front clamping lever 41 and oriented toward the pivot axis 44, can be brought into a force-locking and self-inhibiting frictional engagement with the front, curved clamping face 21b of the front lower baking mold part 21 and in this engagement can be displaced along the front, curved clamping face 21b.

The rear, curved clamping face 22b mounted on the outside of the rear lower baking mold part 22 near the main mold parting plane of the baking mold 16 is embodied as part of its own circular cylindrical face with a cylinder axis parallel to the pivot axis 44 and is associated with the rear clamping portion 42c of the rear clamping lever 42. By pivoting the rear clamping lever 42 with the baking mold 16 closed, the flat clamping face 42d, disposed on the rear clamping portion 42c of the rear clamping lever 42 and oriented toward the pivot axis 44, can be brought into a force-locking and self-inhibiting frictional engagement with the rear, curved clamping face 22b of the rear lower baking mold part 22 and in this engagement can be displaced along the rear, curved clamping face 22b.

The two clamping levers 41, 42 of the upper clamping device 30, which are pivotally supported on the top side of the upper tong part 15, are pivoted with their clamping portions 41c, 42c toward one another when the upper clamping device 30 is tightened to the closed baking mold 16, in order to bring the clamping portions 41c, 42 into engagement with the two curved clamping faces 21b, 22b that are mounted on the outsides of the two lower baking mold parts 21, 22, in each case near the baking mold part of the baking mold 16. When the upper clamping device 30 is loosened from the closed baking molds 16, the two clamping levers 41, 42 are pivoted apart by their clamping portions 41c, 42c, in order to release the clamping portions 41c, 42c from these two curved clamping faces 21b, 22b of the two lower baking mold parts 21, 22.

1.7. Lower Clamping Devices

The structurally identical, self-adjusting lower clamping devices 31 each disposed spaced apart from one another on the baking mold 16 crosswise to the travel direction 8, are each mounted directly to the lower end of the two lower baking mold parts 21, 22 below an upper clamping device 30, and they additionally make it possible, in the region of the lower end of the baking mold 16, to apply an additional prestressing force to the lower baking mold parts 21, 22 in order to keep the closed female die closed.

Each lower clamping device 31 includes a lower two-armed clamping lever 47, which is pivotally supported about a pivot axis 49 located crosswise to the travel direction 12 in a bearing 48 secured to the outside of the rear lower baking mold part 21 of the baking mold 16, near the lower end thereof. The lower clamping lever 47 has a substantially C-shaped lower clamping arm 47a, protruding frontward from the pivot axis 49 in the travel direction 8, which arm on the lower end of the two lower baking mold parts 21, 22 extends over the second mold parting plane of the baking mold 16 and, on its backside remote from the two lower baking mold parts 21, 22, has an outer, curved engagement face 47b for the engagement with a lower closing roller 50a of a further closing station 50, in which all the side-by-side lower clamping devices 31 of one baking mold 16 are tightened simultaneously. The lower clamping arm 47a of the lower clamping lever 47 also, on its free end remote from and angled relative to the pivot axis 49, has a lower clamping portion 47c, with a flat clamping face 47d toward the pivot axis 49, on its front side toward the two lower baking mold parts 21, 22. The lower clamping lever 47 also has a rear actuating arm 47e, pointing rearward from the pivot axis 49 counter to the travel direction 8, which on its back side remote from the two lower baking mold parts 21, 22 has an outer engagement 47f for the engagement with a lower opening roller 51a of a further opening station 51.

Each lower clamping device 31 also includes an outer, lower, curved clamping face 21c, which is associated with the flat clamping face 47d of the lower clamping lever 47 and is mounted on the outside of the front lower baking mold part 21, near the lower end thereof. This lower, curved clamping face 21c is embodied as part of its own circular-cylindrical face with a cylinder axis parallel to the pivot axis 49. By pivoting the lower clamping lever, its flat clamping faces 47d toward the pivot axis 49 can be brought into a force-locking and self- inhibiting frictional engagement with the lower, curved clamping face 21c of the front lower baking mold part 21 and in this engagement can be displaced along the lower, curved clamping face 21c.

1.8. Actuation of the Upper and Lower Clamping Devices

When an open baking tong 7 in the front head 3 in the upper transport plane 9 passes the further closing station 50 associated with the lower clamping devices 31, the lower clamping devices 31 of its baking mold 16 are simultaneously tightened against the closed lower mold half 18 of the baking mold 16. Next, the still-open baking tong 7 of the baking tong chain 6 is transported to the pouring station 4, where baking or pouring composition is poured into the closed lower mold half 18.

After the pouring station 4, the baking tong 7 and baking mold 16 are closed by lowering of the upper tong part 15, and the upper clamping devices 30, on passing the closing station 45 in the upper transport plane 9, associated with the upper clamping devices 30 are simultaneously tightened against the closed baking mold 16. The baking tong 7 and baking mold 16 are now closed, and the mold cores 19 of the upper mold half 17 are driven all the way into the mold recesses 20 of the closed, lower mold half 18. The upper tong part 15 is inseparably joined to a unit with the lower tong part 13 by the three upper clamping devices 30, which force-lockingly press the three baking mold parts 17, 21, 22 of the closed baking mold 16 against one another with a predetermined prestressing force. In this state, the baking tong 7 leaves the front head 3 in the upper transport plane 9, passes through the baking chamber 2, where it is stood on its head at the rear turning point 12, and re-enters the front head 3 in the lower transport plane 10.

In the front head 3, on the closed baking tong 7 standing on its head, the lower clamping devices 31, disposed on the now upward- pointing underside of the closed baking mold 16, are released on passing through the further opening station 51 associated with the lower clamping devices 31 in the lower transport plane 10. The upper clamping devices 30, disposed on the now downward- pointing topside of the closed baking mold 16, are released on passing through the opening station 46 associated with the upper clamping devices 30 in the lower transport plane 10.

In the exemplary embodiment of an oven 1 shown in FIGS. 1–20, the opening station 46 for the upper clamping devices 30 follows the opening station 51 for the lower clamping devices 31 in the travel direction 8.

On passing through the two openings stations 46, 51, the inseparable unit formed by the clamping devices 30, 31 of the baking mold 16 is released from the upper tong part 15 and lower tong part 13 by the loosening of the upper and lower clamping devices 30, 31, so that following the opening station 46, the individual parts 17, 21, 22 of the baking mold 16 can be moved independently of one another. In the portion of the front head 3 following the opening station 46 in the travel direction, the baking mold 16 is opened at the main mold parting plane as the upper tong part 15 and lower tong part 13 are moved apart, and the lower mold half 18 of the baking mold 16 is opened on passing through the front turning point 11 at the second mold parting plane by the movement mechanisms 26 located on both sides of the baking tong 7 in the baking tong chain 6.

1.8.1. Closure of the Lower Clamping Devices

The lower clamping devices 31 of the baking tong 7, in the further closing station 50 of the front head 3 associated with the lower clamping devices 31, are simultaneously tightened on the closed lower mold half 18 of the baking mold 16 while the baking tong 7 is open. The two clamping levers 41, 42 of the upper clamping devices 30 of the baking tong 7 are pivoted with their clamping portions 41c, 42c toward one another by the gravity acting upon them.

The further closing station 50 has three closing rollers 50a, located side by side crosswise to the travel direction 8 and each associated with one of the three lower clamping devices 31 of the baking mold 16; each of these closing rollers is disposed below the respective path of the baking tong chain 6 in the upper transport plane 9 of the oven 1 and is resiliently supported on the frame of the oven 1.

When an open baking tong 7 passes the further closing station 50, each closing roller 50a comes into engagement with the outer engagement face 47b on the back side of the lower clamping arm 47a, extending forward in the travel direction 8, of the lower clamping lever 47 of the respectively associated lower clamping device 31 and pivots this lower clamping lever toward the front lower baking mold part 21, until it, with its flat clamping face 47d, is tightened on the lower, outer, curved clamping face 21c, associated with it, of the front lower baking mold part 21 in a force-locking and self-inhibiting frictional engagement.

In the first portion of this pivoting motion, the lower clamping lever 47 is pivoted toward the front lower baking mold part 21 until, with its flat clamping faces 47d, it enters into a force- locking and self-inhibiting frictional engagement with the curved clamping face 21c associated with it of the front lower baking mold part 21. In the second portion of this pivoting motion, the lower clamping lever 47 is displaced with its flat clamping face 47d in this engagement along this curved clamping face 21c of the front lower baking mold part 21, until the play of motion existing between the two lower baking mold parts 21, 22 of the baking mold 16, or the play of motion existing in the lower clamping device 31, is eliminated, and the two lower baking mold parts 21, 22 rest with their mutually associated sealing faces 21a, 22a on one another. In the third portion of this pivoting motion, the lower clamping lever 47, with its flat clamping face 47d in the force-locking and self-inhibiting frictional engagement, is displaced farther on the curved clamping face 21c, associated with it, of the front lower baking mold part 21 until the two lower baking mold parts 21, 22 of the baking mold 16, at their mutually associated sealing faces 21a, 22a, are pressed against one another with a prestressing force that is applied by the elastic expansion of the lower clamping arm 47a and can be preadjusted via the contact pressure of the closing roller 50a.

1.8.2. Closure of the Upper Clamping Devices

After passing through the pouring station 4, the upper tong part 15 of the baking tong 7 is lowered toward the lower tong part 13 by the cooperation of its control rollers 28 with the guide rails 27 of the front head 3, and the baking tong 7 and its baking mold 16 are closed at the main mold parting plane.

The two clamping levers 41, 42 of the upper clamping devices 30 of the baking tongs 7 are pivoted toward one another with their clamping portions 41c, 42c by gravity. Upon the lowering of the upper tong part 15, the clamping levers 41, 42 each come into engagement by the free ends of their clamping portions 41c, 42c, with the upper face end of the particular insert 21d, 22c that carries the outer curved clamping face 21b, 22b, associated with the respective clamping portion 41c, 42c, of the respective lower baking mold part 21, 22. As a result of this engagement, the clamping levers 41, 42 as the upper tong part 15 is lowered are pivoted apart counter to gravity, until with their clamping portions 41c, 42c they slide outward past the outer edges of the insert 21d, 22c. Next, the clamping portions 41c, 42c of the clamping levers 41, 42 are pivoted toward one another by gravity, and their flat clamping faces 41d, 42d are brought into engagement with the respectively associated outer curved clamping faces 21b, 22b of the two lower baking mold parts 21, 22. The respective baking tong 7, with its upper clamping devices 30 that are already partly tightened by the action of gravity, comes to the closing station 45 of the front head 3 associated with the upper clamping devices 30, and in that station the upper clamping devices 30 are tightened against the closed baking mold 16. The closing station 45 has three pairs of closing rollers, disposed side by side crosswise to the travel direction 8 and each associated with one upper clamping device 30 of the baking mold 16; each pair comprises a first, front closing roller 45a and a second, rear closing roller 45b. The two closing rollers 45a, 45b of each pair are disposed in the oven 1 above the path of the baking tong chain 6 and are resiliently supported on the frame of the oven 1 above the path of the baking tong chain 6.

When a closed baking tong 7 passes through the closing station 4, in each pair of closing rollers and the upper clamping device 30 associated with it the front closing roller 45 comes into engagement with the outer engagement face 41b on the back side of the front clamping arm 41a of the front clamping lever 41, while the rear closing roller 45b comes into engagement with the outer engagement face 42b on the back side of the rear clamping arm 42a of the rear clamping lever 42. As a result of this engagement with the two closing rollers 45a, 45b, the two clamping arms 41a, 42a of the two clamping levers 41, 42 are pivoted farther toward one another by compulsion. In the process, the flat clamping faces 41d, 42d of the clamping arms 41a, 42a, which are in the force-locking and self-inhibiting frictional engagement with the respective associated outer curved clamping face 21b, 22b, are displaced by compulsion along this curved clamping face 21b, 22b on the insert 21d, 22c of the respective lower baking mold part 21, 22, until the play of motion between the upper and lower mold halves 17, 18, or the play of motion within the respective upper clamping device 30, is eliminated, and the flat clamping faces 41d, 42d of the clamping arms 41a, 42a are tightened with a predetermined prestressing force against these outer curved clamping faces 21b, 22b of the lower baking mold parts 21, 22 by elastic expansion of the clamping arms 41a, 42a.

1.8.3. Opening of the Lower Clamping Devices

The lower clamping devices 31 of the baking tong are loosened from the closed baking mold 16 in the further opening station 51 of the oven 1. The further opening station 51 has three opening rollers 51a, disposed side by side crosswise to the travel direction 8 and each associated with one lower clamping device 31 of the baking mold 16, and these opening rollers are each disposed in the lower transport plane 10 of the oven above the path of the baking tong chain 6 and are resiliently supported on the frame of the oven 1. When a closed baking tong 7 passes through the further opening station 51, one opening roller 51a at the lower clamping device 31 associated with it comes into engagement at a time with the outer engagement face 47f on the back side of the rear actuating arm 47e, extending rearward counter to the travel direction 8, of the lower clamping lever 47. As a result of this engagement, the lower clamping lever 47 of the respective lower clamping device 31 is pivoted by its lower clamping arm 47a, extending frontward in the travel direction 8, away from the front lower baking mold part 21. In the process, the flat clamping face 47d of the clamping arm 47a is first displaced along the curved clamping face 21c, associated with it, of the front lower baking mold part 21 and is finally released from this part. In that process, first the prestressing force which is exerted by the elastic expansion of the clamping arm 47a and presses the two lower baking mold parts 21, 22 together by their respective mutually associated sealing faces 21a, 22a oriented toward the second mold parting plane, is undone. Next, the flat clamping face 47d of the clamping arm 47a is slid along the curved clamping face 21c of the front lower baking mold part 21, in force-locking and self-inhibiting frictional engagement with it, until the play of motion intended in the lower clamping device 31 is re-established and the two lower baking mold parts 21, 22 are released.

1.8.4. Opening of the Upper Clamping Devices

The upper clamping devices 30 of the baking tong 7 are released from the closed baking mold 16 in the opening station 46 of the oven 1 associated with the upper clamping devices 30. The opening station 46 has three pairs of opening rollers, disposed side by side crosswise to the travel direction 8 and each pair associated with one upper clamping device 30 of the baking mold 16; each pair comprises one first, front opening roller 46a and one second, rear opening roller 46b. The two opening rollers 46a, 46b of each pair are disposed in the lower transport plane 10 of the oven 1 below the path of the baking tong chain 6 and are resiliently supported on the frame of the oven 1 below the path of the baking tong chain 6.

When a closed baking tong 7 passes through the opening station 46, its upper clamping device 30 comes into contact with one of the pairs of opening rollers at a time. In each upper clamping device 30, the front opening roller 46 of a pair comes into engagement with the outer engagement face 41f on the back side of the rear actuating arm 41e of the front clamping lever 41, and the rear opening roller 46b of that pair comes into engagement with the outer engagement face 42f on the back side of the front actuating arm 42e of the rear clamping lever 42. As a result of this engagement of the two opening rollers 46a, 46b with the two clamping levers 41, 42, the clamping arms 41a, 42a thereof are pivoted apart. In the process, the flat clamping faces 41d, 42d of the clamping arms 41a, 42a are first displaced along the curved clamping faces 21b, 22b, associated respectively with them, of the two lower baking mold parts 21, 22 and are finally released from them. In that process, in the case of both clamping levers 41, 42, first the prestressing forces exerted by the elastic expansion of their clamping arms 41a, 42b, which presses the two mold halves 17, 17 or the two lower baking mold parts 21, 22 against one another with their respective mutually associated sealing faces 17a, 18a and 21a, 22a oriented toward the main mold parting plane and the second mold parting plane, respectively, is undone. Next, the flat clamping faces 41d, 42d of the clamping arms 41a, 42a are displaced along the curved clamping faces 21b, 22b respectively associated with them of the two lower baking mold parts 21, 22, in each case in force-locking and self-inhibiting frictional engagement with them, until the play of motion intended in the upper clamping device 30 is re- established and the baking mold parts 17, 18 and 21, 22, respectively, are released.

1.8.5. Engagement of the Clamping Devices

When the upper and lower clamping devices 30, 31 are tightened, the respective clamping lever 41, 42, 47 pivoted in the tightening direction about its pivot axis 44, 49 traverses a circular path of motion with its flat clamping face 41d, 42d, 47d, which path of motion meets the outer, curved clamping face 21b, 21c, 22b on the respective lower baking mold part 21, 22 of the closed baking mold, which face is associated with the respective clamping lever 41, 42, 47. The flat clamping face 41d, 42d, 47d on the clamping portion 41c, 42c, 47c of each clamping lever 41, 42, 47 is disposed parallel to the pivot axis 44, 49 of this clamping lever 41, 42, 47. The flat clamping face 41d, 42d, 47d is defined by a front edge parallel to the pivot axis 44, 49 of its clamping lever 41, 42, 47 and by a rear edge parallel to the pivot axis 44, 49 of its clamping lever 41, 42, 47. As the clamping lever 41, 42, 47 is tightened, the front edge of the flat clamping face 41d, 42d, 47d leads ahead of its rear edge in the tightening direction, and the pivoting radius of the front edge is slightly greater than the pivoting radius of the rear edge. The pivoting radius of the clamping portion 41c, 42c, 47c of the clamping lever 41, 42, 47 is associated with the center line, parallel to the pivot axis 44, 49 and located between the front and rear edges, of the flat clamping faces 41d, 42d, 47d. The flat clamping face 41d, 42d, 47d rises from the inside outward in the tightening direction relative to the tangential plane perpendicular to the pivoting radius of the clamping portion 41c, 42c, 47c.

The outer, curved clamping faces 21b, 21c, 22b, disposed on the lower baking mold parts 21, 22 and associated with the respective flat clamping faces 41d, 42d, 47d of the clamping levers 41, 42, 47, of the upper and lower clamping devices 30, 31 are each embodied as part of a circular-cylindrical face. In each outer, curved clamping face 21b, 21c, 22b, the radius of curvature of the circular-cylindrical face is equivalent to the pivoting radius of the clamping portion 41c, 42c, 47c of the associated clamping lever 41, 42, 47, and the cylinder axis of the circular- cylindrical face extends parallel to the pivot axis 44, 49 of the associated clamping lever 41, 42, 47. The outer, curved clamping face 21b, 21c, 22b is defined by a front edge parallel to the cylinder axis and a rear edge parallel to the cylinder axis. The center line, parallel to the cylinder axis and located between the front and rear edges, of the curved clamping face 21b, 21c, 22b is associated with the contact zone that the flat clamping face 41d, 42d, 47d of the associated clamping lever 41, 42, 47 contacts with its region surrounding its center line when the associated clamping lever 41, 42, 47 is pivoted and tightened. As the clamping lever 41, 42, 47 is pivoted, its flat clamping face 41d, 42d, 47d, with its front edge, passes the front edge of the curved clamping face 21b, 21c, 22b before it contacts the curved clamping face 21b, 21c, 22b.

The cylinder axis of the circular-cylindrical face of the curve clamping face 21b, 21c, 22b is offset forward in the tightening direction relative to the pivot axis 44, 49 of the associated clamping lever 41, 42, 47, so that when the flat clamping face 41d, 42d, 47d of the clamping lever 41, 42, 47 meets the outer, curved clamping face 21b, 21c, 22b, associated with it, of the lower baking mold part 21, 22, the outer, curved clamping face 21b, 21c, 22b gradually rises away from the contact zone, relative to the flat clamping face 41d, 42d, 47d resting on it of the clamping lever 41, 42, 47 associated with it.

In the contact zone, the outer, curved clamping face 21b, 21c, 22b together with the flat clamping face 41d, 42d, 47d resting on it forms a gap that tapers in crescent-like fashion in the tightening direction of the clamping lever 41, 42, 47. The height and the wedgelike course of this crescent-like gap depends on the particular selected pairing of materials used for the two clamping faces 41d, 42d, 47d and 21b, 21c, 22d chosen for a force-locking and self-inhibiting frictional engagement between the outer, curved clamping face 21b, 21c, 22b of the lower baking mold part 21, 22 and the flat clamping face 41d, 42d, 47d of the associated clamping lever 41, 42, 47 for the two clamping faces.

For tightening a clamping lever 41, 42, 47 on the outer, curved clamping face 21b, 21c, 22b associated with it of the respective lower baking mold part 21, 22, the respective closing roller 45a, 45b, 50a resiliently prestressed in the tightening direction presses against the outer engagement face 41b, 42b, 47b on the back side of the clamping arm 41a, 42a, 47a of the clamping lever 41, 42, 47 and presses the clamping portion 41c, 42c, 47c thereof toward the lower baking mold part 21, 22 with a predetermined prestressing force. As a result, the clamping arm 41a, 42a, 47a of the clamping lever 41, 42, 47, with its flat clamping face 41d, 42d, 47d, straddles the contact zone of the outer, curved clamping face 21b, 21c, 22b of the lower baking mold part 21, 22. This produces a force-locking and self-inhibiting frictional engagement between the flat clamping face 41d, 42d, 47d and the outer, curved clamping face 21b, 21c, 22b associated with it, and subsequently results in an elastic expansion of the clamping arm 41a, 42a, 47a of the clamping lever 41, 42, 47, which expansion is fixed and quasi-frozen in place by the force-locking and self- inhibiting frictional engagement of the two clamping faces 41d, 42d, 47d and 21b, 21c, 22b.

To release a clamping lever 41, 42, 47 from the outer, curved clamping face 21b, 21c, 22b associated with it of the respective lower baking mold part 21, 22, the respective opening roller 46a, 46b, 51a, resiliently prestressed in the release direction, presses against the engagement face 41f, 42f, 47f on the backside of the actuating arm 41e, 42e, 47e of the clamping lever 41, 42, 47. As a result, the clamping portion 41c, 42c, 47c of the clamping lever 41, 42, 47 is pressed away from the lower baking mold part 21, 22 by a predetermined prestressing force. The strong external forces exerted by the opening roller 46a, 46b, 51a overcome the force-locking and self-inhibiting frictional engagement between the flat clamping face 41d, 42d, 47d of the clamping arm 41a, 42a, 47a and the associated outer, curved clamping face 21b, 21c, 22b of the lower baking mold part 21, 22 and reverse the elastic expansion, fixed or frozen in by this frictional engagement, of the clamping arm 41a, 42a, 47a of the clamping lever 41, 42, 47 again.

In FIG. 19, an exemplary embodiment is shown for the mutual engagement between the flat clamping face of a clamping lever and the associated outer, curved clamping face of an lower baking mold part, taking the example of an upper clamping device 30.

FIG. 19 shows the rear clamping lever 42, pivoted about its pivot axis 44 in the tightening direction 42g, in its position in which its flat clamping face 42d is firmly tightened against the rear, curved clamping face 22b, associated with it, of the rear lower baking mold part 22. The wear phenomena that occur during operation of the oven 1 in the baking mold 16 and the upper clamping device 30 over the course of time are not taken into account in the drawing, so that two clamping faces 42d and 22b rest with their center lines on one another in the engagement position. As the wear increases, the contact zone shifts on the curved clamping face 22b toward its rear edge.

FIG. 19 additionally shows the clamping portion 42c of the clamping arm 42a of the clamping lever 42 in a pivoted position released from the curve clamping face 22b, in which the clamping portion 42c is pivoted with its flat clamping face 42d away from the curved clamping face 22b associated with it, counter to the tightening direction 42g.

In the tightened state, the rear clamping lever 42 rests with the flat clamping face 42d of its clamping portion 42c with its region surrounding its center line on the contact zone of the curved clamping face 22b of the rear lower baking mold part 22. In FIG. 19, the center lines of the two clamping faces 42d and 22b, which coincide, are shown through the engagement point E. The flat clamping face 42d is positioned outward by an angle (alpha) relative to the tangential plane that extends through its center line and is perpendicular to the pivoting radius 42i of the clamping portion 42c. The flat clamping face 42d rests on the curved clamping face 22b in the tangential plane that extends through the center line of the curved clamping face 22b and is perpendicular to the radius of curvature 22r of the curved clamping face 22b. In FIG. 19, the plane T parallel to this tangential plane is shown, in which the back side, parallel to the flat clamping face 42d of the hard metal insert 42 rests, on the front side of which insert the flat clamping face 32d is embodied. The axis of curvature 22d of the curved clamping face 22b is located parallel to pivot axis 44 of the rear clamping lever 42 and is offset forward relative to this axis in the tightening direction 42g. The pivoting radius 42i of the clamping portion 42c and the radius of curvature 22r of the curved clamping face 22b are equal in length. The curved clamping face 22b rises toward the front in the tightening direction 42g from the inside outward relative to the circular pivoting path associated with the center line of the flat clamping face 42d. The flat clamping face 42d, together with the curved clamping face 22b, forms a gap that tapers in crescentlike fashion in the tightening direction 42g and that ends at the engagement point E with the angle (alpha). This angle (alpha) is smaller than the static friction angle of the pairing of materials chosen for the two clamping faces 42d, 22b, and in a preferred exemplary embodiment where the paired materials are hard metal and hard metal, it is 6.

1.9. Discharge Station

In the front head 3, the path of the control rollers 28 of the upper tong parts 15 moves away in the region of the front turning point 11 from the middle path of the movement mechanisms 26 to somewhat more than twice the height of the mold cores 19, and then until the pouring station 4 extends parallel to the path of the lower tong parts 13 or of the transport chains 23, 24. Between the path of the main mold parting planes of the baking molds 16, which defines the path of the lower tong parts 13 toward the outside, and the path of the free ends 19a of the mold cores 19, which defines the path of the upper tong parts 15 toward the inside, there is an interstice 52, which begins in the region of the lower half of the front turning point 11 and extends in the travel direction 8 along the front turning point 11 past the discharge station 5 as far as the pouring station 4. Disposed in this interstice 52, at a predetermined distance from the path of the free ends 19a of the mold cores 19, is a guide baffle 53 curved in an arc.

The guide baffle 53 extends crosswise to the travel direction 8 over the entire length, measured crosswise to the travel direction 8, of the baking molds 16. In the travel direction 8, the guide baffle extends from its beginning 53a, located below the center of the front turning point 11, as as far as an end portion 53b extending into the discharge station 5. The end portion 53b of the guide baffle 53 is divided crosswise to the travel direction, corresponding to the path of the vertical center planes of the baking molds 16 parallel to the travel direction 8, into an inner portion 53c and an outer portion 53d. The inner portion 53c adjacent to the path of the guide swords 14 protrudes in the travel direction 8 past the outer portion 53d. The ends of the two portions 53c, 53d are stepped in the travel direction and end above a conveyor belt 54, which is disposed in the interstice 52 on the discharge station 5 and leads out of the front head 3, crosswise to the travel direction 8.

The guide baffle 53 forms a support face, curved in an arc, for the closed ends, pointing toward the center axis 11*a* of the front turning point 11, of the baked molded articles 25, which are transported in the travel direction 8 via the guide baffle 53 by the mold cores 19, protruding into these molded articles, of the baking molds 16 of the circulating baking tongs 7. The guide baffle 53 prevents the baked molded articles 25, seated with their closed ends on the guide baffle 53, from sliding off the mold cores 19, protruding into them, of the baking mold 16 during their further transport.

In the region of the upper half of the front turning point 11, a blowing station 55 is disposed in the interstice 52. In the blowing station 55, blow pipes 55*a* protruding outward past the guide baffle 53 are disposed, spaced apart from one another, in a row extending crosswise to the travel direction 8. If an upper tong part 15 with its mold cores 19 is located in the region of the blowing station 55 or the blow pipes 55*a*, one blow pipe 55*a* protrudes between each two adjacent mold cores 19 of the baking molds 16 as far as the upper ends 19*b* of these mold cores 19. On the outer ends of the blow pipes 55, there are two blow nozzles 55*b*, each aimed crosswise to the travel direction 8 at the upper ends 19*b* of the mold cores 19.

The baked molded articles 25 are transported in the region of the front turning point 11 of the baking tong chain 6 from the lower transport plane 10 via the front turning point 11 as far as the upper transport plane 9 to the discharge station 5 by the mold cores 19 protruding into them. As they pass through the lower half of the front turning point 11, the baked molded articles 25 sit loosely, by gravity, on the mold cores 19, protruding into them and pointing upward or toward the center axis 11*a*, of the upper mold halves 17 of the upper tong parts 15 and are carried by the mold cores 19. On passing through the upper half of the front turning point 11, the baked molded articles 25 sit with their closed ends, by gravity, loosely on the guide baffle 53 and are carried by the guide baffle 53.

On passing through the upper half of the front turning point 11, the baked molded articles 25 come loose by gravity from the mold cores 19 protruding into them and are supported by their closed ends on the guide baffle 53. On passing through the blowing station 55, air is blown at the upper ends 19*b* of the mold cores 19 from the blower nozzles 55*b* of the blow pipes 55*a* disposed between the baked molded articles 25 and the mold cores 19 protruding into them. If a baked molded article 25 has become stuck on the mold core 19 protruding into it, this air penetrates along the upper end 19*b* of this mold core 19 and through the open edge of this molded article 25 into which stuck, baked molded article 25 and loosens it from the mold core 19 protruding into it. The air blown above the open edge of the stuck baked molded article 25 against the upper end 19*b* of the mold core 19 protruding into it compensates for any negative pressure that may have occurred in the interstice between the baked molded article 25 and the mold core 19 protruding into it and prevents a baked molded article 25, which shrinks slightly as it cools, from becoming stuck on the mold core 19 protruding into it. The streams of air aimed at the upper ends 19*b* of the mold cores 19 assure that all the baked molded articles 25 will slide off their mold core 19 and will strike the guide baffle 53 with their closed ends and be supported by their closed ends by the guide baffle 53.

In the upper transport plane 9 of the oven 1, the baked molded articles 25, supported by their closed ends on the guide baffle 53, are transported by the mold cores 19 protruding into them and pointing downward with their free ends 19*a* along the guide baffle 53 as far as its end portion 53*b* disposed in the discharge station 5. From this end portion 53*b*, the baked molded articles 25 fall by gravity over the stepped ends of the inner and outer portions 53*c*, 53*d* of the guide baffle in two separate rows onto the conveyor belt 54.

1.10. Opening and Closing of the Female Dies

When the baking tong chain 6 circulates in the travel direction 8 in the oven 1, the female dies contained in the lower tong parts 13 are opened and closed on the front turning point 11, preceding the discharge station 5, by the movement mechanisms 26 that are disposed between the baking tongs 7 and are already activated.

Within the baking tong chain 6, one first movement mechanism 26 is disposed between a leading first baking tong 7 in the travel direction and the second baking tong 7 trailing it, and a second movement mechanism 26 is disposed between the second baking tong and the third baking tong 7 that trails it.

If a portion of the baking tong chain 6 comprising three baking tongs 7 and two movement mechanisms 26 located between them passes the transition from the lower transport plane 10 to the front turning point 11 in the travel direction 8, then what happens is as follows:

When the first baking tong 7 has already passed the transition, and by the action of the front turning point 11 on the baking tong chain 6, has already been pivoted forward in the travel direction 8 relative to the second baking tong 7, then in the second baking tong 7 which itself has not yet been pivoted the front lower baking mold part 21 is pivoted forward in the travel direction 8 by the first movement mechanism 26. In that process, the stops 32*b*, associated with the second mold parting plane of the second baking tong 7, of the baking mold carriers 32 of the front lower baking mold part 21 of the second baking tong 7 are lifted from the stops 13*i*, oriented toward the second mold parting plane of the second baking tong 7, at the main portion 13*a* of the lower tong part 13 of the second baking tong 7.

When the second baking tong 7 passes the transition, it is pivoted forward in the travel direction relative to the third baking tong 7 by the action of the front turning point 11 on the baking tong chain 6. In this process, the rear lower baking mold part 22 of the second baking tong 7 is pivoted rearward counter to the travel direction 8 by the second movement mechanism 26, and the front lower baking mold part 21 of the third baking tong 7 is pivoted forward in the travel direction 8. At the rear lower baking mold part 22 of the second baking tong 7, the stops 33*b*, associated with the second mold parting plane of the second baking tong 7, of the baking mold carriers 33 of the rear lower baking mold part 22 of the second baking tong 7 are lifted from the stops 13*k*, oriented toward the second mold parting plane of the second baking tong 7, at the main portion 13*a* of the lower tong part 13 of the second baking tong 7. At the front lower baking mold part 21 of the third baking tong 7, the stops 32*b*, associated with the second mold parting plane of the third baking tong 7, of the baking mold carriers 32 of the front lower baking mold part 21 of the third baking tong 7 are lifted from the stops 13*i*, oriented toward the second mold parting plane of the third baking tong 7, at the main portion 13*a* of the lower tong part 13 of the third baking tong 7.

As the second baking tong 7 is pivoted by the action of the front turning point 11 on the baking tong chain 6, a form-locking connection under tension is created, via the two control straps 26*a*, 26*b* of the second movement mechanism 26, between the rear lower baking mold part 22 of the second baking tong 7 and the front lower baking mold part 21 of the third baking tong 7 for opening the female dies of the second and third baking tongs 7. In both control straps 26a, 26b of the second movement mechanism 26, which are pivotally connected to the bearing bolts 33c of the baking mold carriers 33 of the rear lower baking mold part 22 of the second baking tong 7, the control bolts 32c, guided in their guide channels 40, of the baking mold carriers 32 of the front lower baking mold part 21 of the third baking tong 7 rest on the rear stop faces 40d, pointing in the travel direction 8, of the control straps 26a, 26b of the second movement mechanism 26.

In the same way, as the first baking tong 7 is pivoted by the action of the front turning point 11 on the baking tong chain 6, a form-locking connection under tension is created, via the two control straps 26a, 26b of the first movement mechanism 26, between the rear lower baking mold part 22 of the first baking tong 7 and the front lower baking mold part 21 of the second baking tong 7 for opening the female dies of the first and second baking tongs 7. In both control straps 26a, 26b of the first movement mechanism 26, which are pivotally connected to the bearing bolts 33c of the baking mold carriers 33 of the rear lower baking mold part 22 of the first baking tong 7, the control bolts 32c, guided in their guide channels 40, of the baking mold carriers 32 of the front lower baking mold part 21 of the second baking tong 7 rest on the rear stop faces 40d, pointing in the travel direction 8, of the control straps 26a, 26b of the first movement mechanism 26.

The baking tongs 7 pivoted away from each other in the travel direction 8 are connected form-lockingly to one another at their hinged-apart lower baking mold parts 21, 22 via the movement mechanisms 26 disposed between the baking tongs 7, and they are transported from the baking tong chain 6 via the front turning point 11 to the upper transport plane 9. During this transport, the two transport chains 23, 24 pass over the two front chain wheels 11b that rotate about the center axis 11a, and the control rollers 28 of the upper tong parts 15 run along the guide rails 27 of the front head 3.

In each baking tong 7, the free ends 19a of the mold cores 19 of the upper tong part 15 point radially toward the center axis 11a of the front turning point 11, and the two lower baking mold parts 21, 22 of the lower tong part 13 are hinged apart symmetrically to the second mold parting plane of the baking mold 16. The upper tong part 15 is drawn outward with the mold cores 19 of its upper mold halves 17, along the second mold parting plane of the baking mold 16 or radially to the center axis 11a, out of the hinged-apart lower baking mold parts 21, 22 of the lower mold half 18 of the lower tong part 13 in a straight line. The molded articles 25 baked in the baking mold 16, on passing through the lower half of the front turning point 11, rest by gravity on the mold cores 19, protruding into them, of the upper mold halves 17 and are transported by them as far as the guide baffle 53 and along it into the discharge station 5.

If a portion of the baking tong chain 6 comprising three baking tongs 7 and two movement mechanisms 26 located between them passes the transition from the front turning point 11 to the upper transport plane 9 in the travel direction 8, then what happens is as follows:

When the first baking tong 7 has already passed the transition, and by the action of the upper transport plane 9 on the baking tong chain 6, has already been pivoted rearward counter to the travel direction 8 relative to the second baking tong 7, then in the second baking tong 7 which itself has not yet been pivoted the front lower baking mold part 21 is pivoted rearward counter to the travel direction 8 by the first movement mechanism 26. In that process, the stops 32b, associated with the second mold parting plane of the second baking tong 7, of the baking mold carriers 32 of the front lower baking mold part 21 of the second baking tong 7 are made to approach the stops 13i, oriented toward the second mold parting plane of the second baking tong 7, at the main portion 13a of the lower tong part 13 of the second baking tong 7.

When the second baking tong 7 passes the transition, it is pivoted rearward counter to the travel direction relative to the third baking tong 7 by the action of the upper transport plane 9 on the baking tong chain 6. In this process, the rear lower baking mold part 22 of the second baking tong 7 is pivoted forward in the travel direction 8 by the second movement mechanism 26, and the front lower baking mold part 21 of the third baking tong 7 is pivoted rearward counter to the travel direction 8. At the rear lower baking mold part 22 of the second baking tong 7, the stops 33b, associated with the second mold parting plane of the second baking tong 7, of the baking mold carriers 33 of the rear lower baking mold part 22 of the second baking tong 7 are made to approach the stops 13k, oriented toward the second mold parting plane of the second baking tong 7, at the main portion 13a of the lower tong part 13 of the second baking tong 7. At the front lower baking mold part 21 of the third baking tong 7, the stops 32b, associated with the second mold parting plane of the third baking tong 7, of the baking mold carriers 32 of the front lower baking mold part 21 of the third baking tong 7 are made to approach the stops 13i, oriented toward the second mold parting plane of the third baking tong 7, at the main portion 13a of the lower tong part 13 of the third baking tong 7.

On pivoting of the second baking tong 7, via the two control straps 26a, 26b of the second movement mechanism 26, the form-locking connection under tension, provided for opening the female dies, between the rear lower baking mold part 22 of the second baking tong 7 and the front lower baking mold part 21 of the third baking tong 7 is first undone, and subsequently a new form-locking connection, under compression, provided for closing the female dies is established between the rear lower baking mold part 22 of the second baking tong 7 and the front lower baking mold part 21 of the third baking tong 7. In the guide channels 40 of the two control straps 26a, 26b of the second movement mechanism, the control bolts 32c of the baking mold carrier 32 of the front lower baking mold part 21 of the third baking tong 7 are each lifted from the rear stop face 40d, pointing in the travel direction 8, of the control strap 26a, 26b and made to contact the front stop face 40a of the control strap 26a, 26b.

In the same way, on pivoting of the first baking tong 7, via the two control straps 26a, 26b of the first movement mechanism 26, the form-locking connection under tension, provided for opening the female dies, between the rear lower baking mold part 22 of the first baking tong 7 and the front lower baking mold part 21 of the second baking tong 7 is first undone, and subsequently a new form-locking connection, under compression, provided for closing the female dies is established between the rear lower baking mold part 22 of the first baking tong 7 and the front lower baking mold part 21 of the second baking tong 7. In the guide channels 40 of the two control straps 26a, 26b of the first movement mechanism 26, the control bolts 32c of the baking mold carrier 32 of the front lower baking mold part 21 of the second baking tong 7 are each lifted from the rear stop face 40*d*, pointing in the travel direction 8, of the control strap 26*a*, 26*b* and made to contact the front stop face 40*a* of the control strap 26*a*, 26*b*.

The pivoting distance covered by each of the pivotable lower baking mold parts 21, 22 on opening and closing of the female dies is determined in the guide channels 40 of the control straps 26*a*, 26*b* of the movement mechanisms 26 by the spacing between the rear stop face 40*d* and the front stop face 40*a* of the control strap 26*a*, 26*b*. In this spacing, the play between the guide channel 40 and the control bolt 32, which is required to compensate for the different thermal expansions of the pivotable lower baking mold parts 21, 22 and control straps 26*a*, 26*b* that occur above all when the oven 1 is heated up and allowed to cool, must be taken into account.

Figure 14:
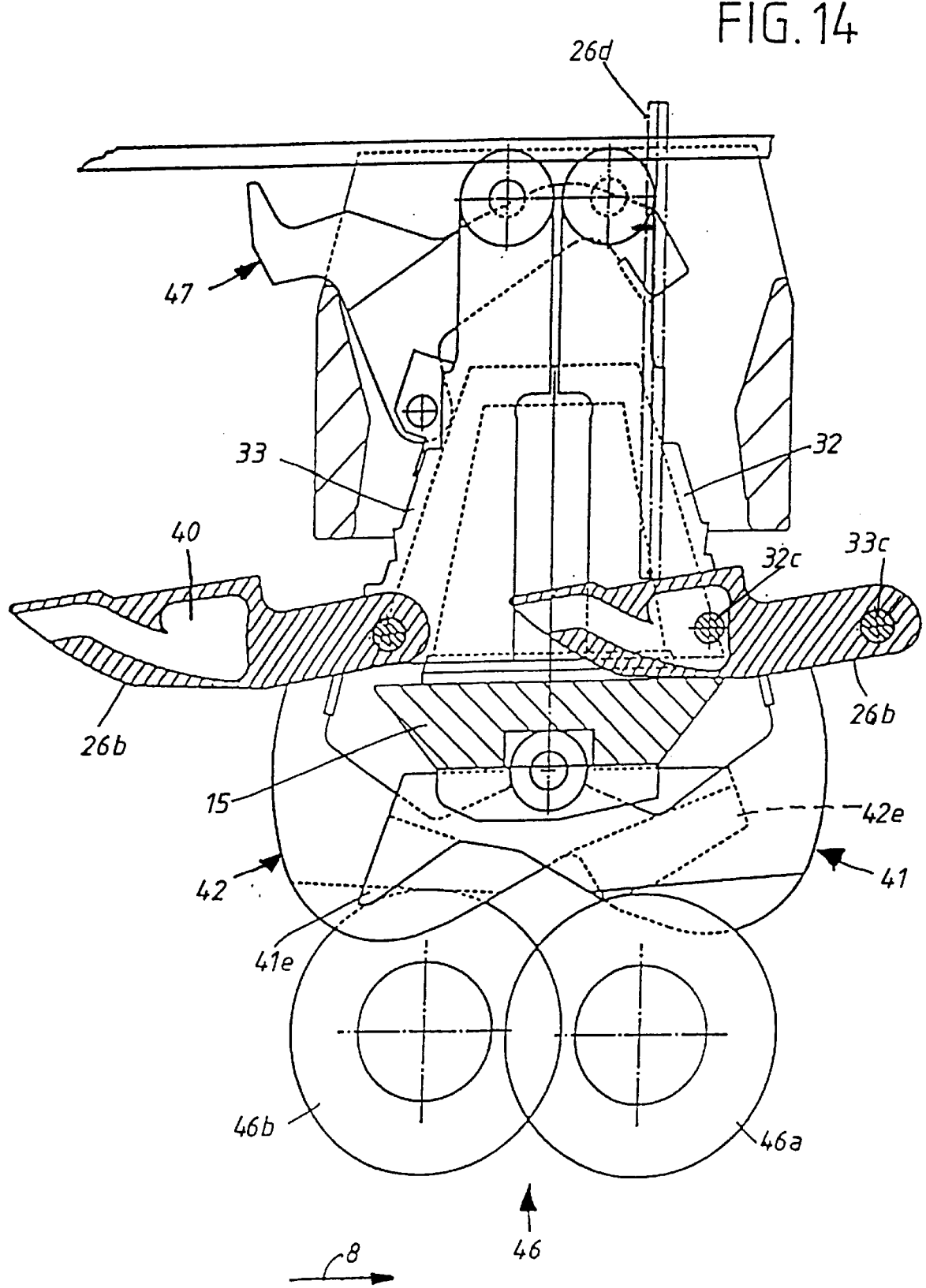
FIG. 14 shows a cross section, corresponding essentially to FIG. 9, through a baking tong that is disposed in the opening station intended for the upper clamping devices and showing the region of two clamping devices disposed one above the other, both of which are loosened from the closed baking mold.
Figure 15:
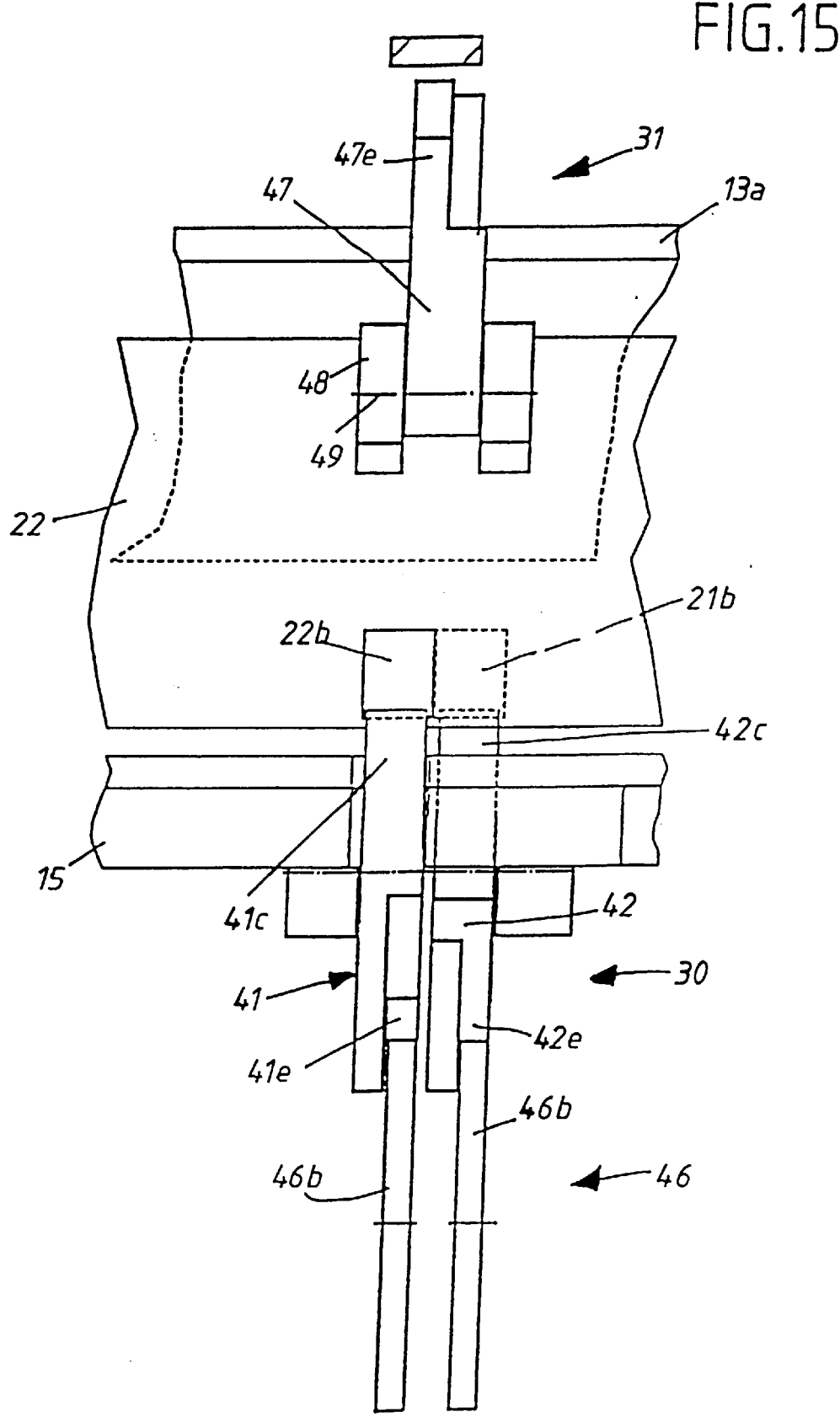
FIG. 15 shows the back side of the baking tong of FIG. 13 in the region of the two clamping devices disposed one above the other.
Figure 16:
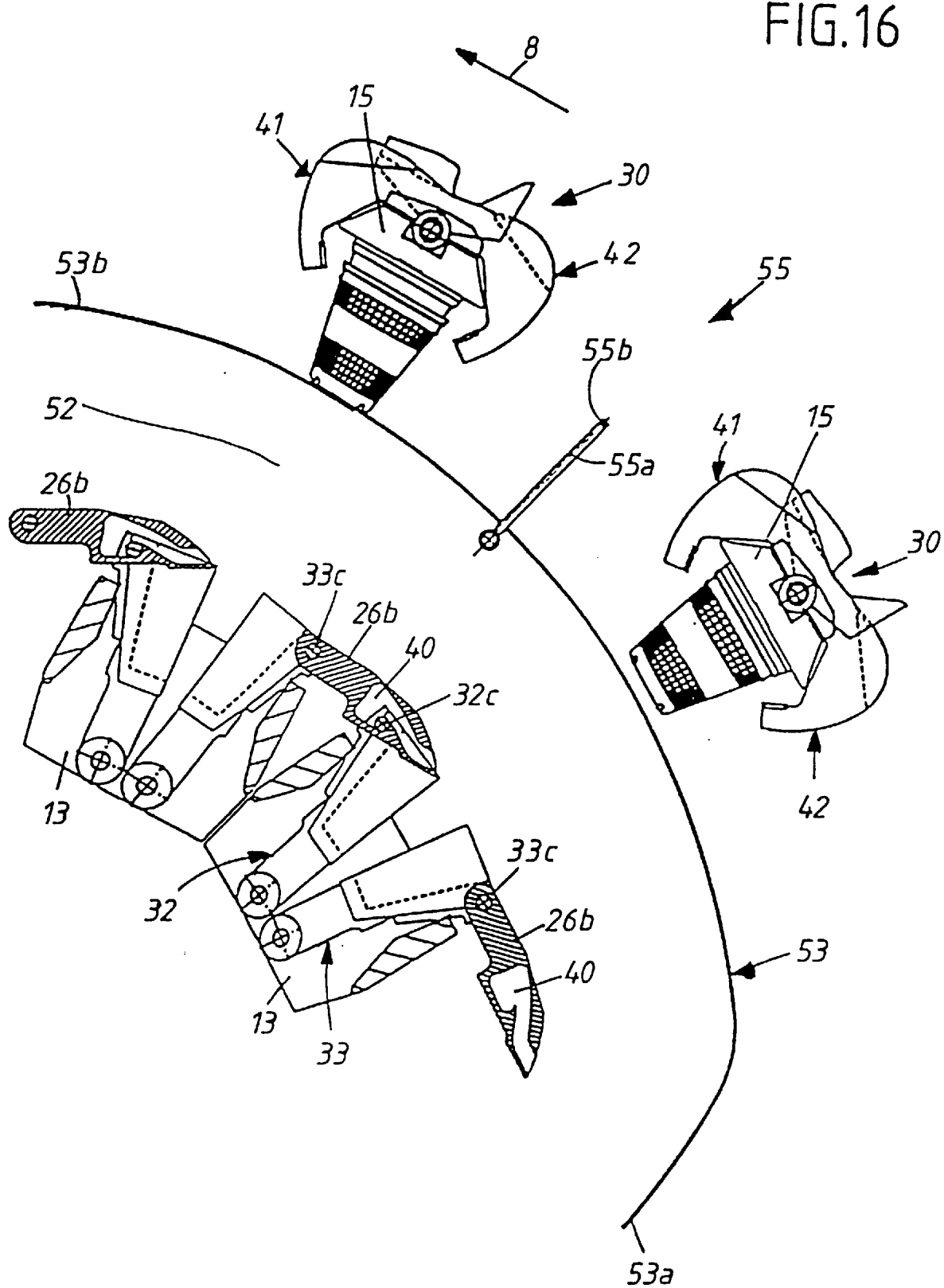
FIG. 16 shows a portion of the baking tong chain in the region of the front turning point of the baking tong chain, showing two successive fully opened baking tongs in a vertical section, parallel to the travel direction, along the line D—D of FIG. 4.
Figure 17:
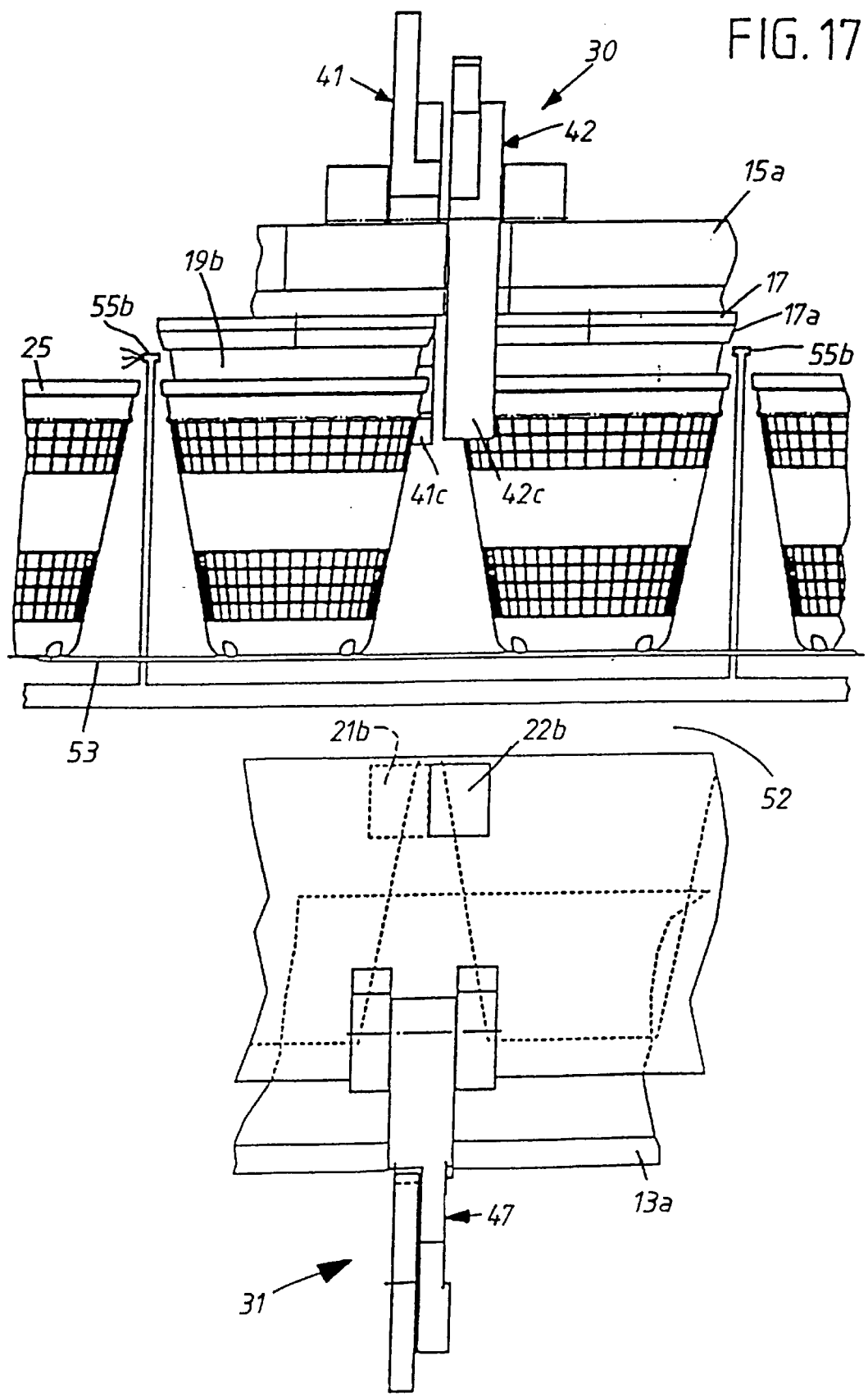
FIG. 17 shows the back side of a fully opened baking tong of FIG. 16 as it passes the blowing station disposed in the region of the front turning point.

At the operating temperature of the oven 1, the length of this pivoting travel is equivalent to the distance between the rear and front stop faces 40*d* and 40*a* of the control strap 26*a*, 26*b*, minus the diameter of the respective control bolt 32*c*. In FIG. 14, the control bolt 32*c* associated with the rear stop face 40*d* in the control strap 26*b* is shown in the fully cooled-down state of the oven 1, with a spacing from the rear stop face 40*d* that corresponds to the play required to compensate for different thermal expansions.

2. Flat-Wafer Oven

FIG. 21 shows a side view and FIG. 22 a plan view of an oven 56 for producing flat, rectangular, thin-walled molded articles from baking and pouring compositions that expand during the baking process. This oven 56 includes an elongated baking chamber 57, a front head 58 preceding it, and an endless baking tong chain 59 located in the interior of the oven 56 and extending through the baking chamber 57 and front head 58.

The baking tong chain 59 comprises structurally identical, open- and closable baking tongs 60, which during the operation of the oven 56 circulates in a closed path in the direction of the arrow 61. The path of the baking tong chain 59 includes a substantially horizontal upper transport plane 62, which extends in the oven 56 from the discharge station 53 for the baked, flat, rectangular, thin-walled molded articles, located at the face end of the front head 58, through the pouring station 64 for the baking or pouring compositions, which follows the discharge station 63 in the travel direction 61, as far as the interior of the baking chamber 57. The path of the baking tong chain 59 also includes a substantially horizontal lower transport plane 65, which extends in the oven 56 in the travel direction 61 in the baking chamber 57 into the front head 58, as well as a front turning point 66, located in the front head 58, that joins together the two transport planes 62, 65 located one above the other, and a rear turning point 67, located in the baking chamber 57, which joins together the two transport planes 62, 65.

2.1. Baking Tongs

The elongated, open- and closable baking tongs 60 of the baking tong chain 69, which are open on one end, are disposed in the oven 56 with their longitudinal extent crosswise to the travel direction 61 of the baking tong chain 59. Each baking tong includes one upper tong part 68 and one lower tong part 70 pivotally connected to it via a joint 69. The joint 69 is disposed on a long side of the baking tong 60 parallel to the travel direction 61 and has a pivot axis parallel to the travel direction 61. An open- and closable baking mold 71 is contained in the baking tong 60; it is divided into an upper mold half 72 and a lower mold half 73 by a main mold parting plane that is parallel to the pivot axis of the joint 69. The upper mold half 72 is integrated with the upper tong part 68, and the lower mold half is integrated with the lower tong part 69.

The upper tong part 68 includes not only the upper mold half 72 of the baking mold 71 but also the upper hinge portion 68*a* of the joint 69 and an upper end portion 68*b*, located on the long side of the baking tong 60 opposite the joint 69. On the front side of the upper end portion 68*a*, oriented toward the main mold parting plane, two upper spacer bolts 68*c*, 68*d* are spaced apart from one another in the travel direction 61 and are embodied as adjustable or fixable perpendicular to the main mold parting plane. On the back side of the upper end portion 68*a*, remote from the main mold parting plane, a control roller 74 is mounted for opening and closing the baking tong 60.

The lower tong part 70 includes not only the lower mold half 72 of the baking mold 71 but also the lower hinge portion 70*a* of the joint 69 and an lower end portion 70*b*, located on the long side of the baking tong 60 opposite the joint 69. On the front side of the lower end portion 70*a*, oriented toward the main mold parting plane, two lower spacer bolts 70*c*, 70*d* are spaced apart from one another in the travel direction 61 and are embodied as adjustable or fixable perpendicular to the main mold parting plane.

The two mold halves 72, 73 of the baking mold 71 include two equal-sized, substantially flat and substantially rectangular baking slabs 72*a*, 73*a*. The longitudinal extent, parallel to the travel direction 61, of the two baking slabs 72*a*, 73*a* is markedly less in each case than their crosswise extent perpendicular to the travel direction 61.

On the front side of the upper baking slab 72*a*, oriented toward the main mold parting plane of the baking mold 71, a substantially flat upper baking surface is formed. The upper baking surface is defined on the front and rear transverse side of the upper baking slab 72*a* by a respective front and rear upper closure strip 72*b* and 72*c* located crosswise to the travel direction 61. Two upper closure strips 72*b*, 72*c* protrude past the upper baking surface toward the main mold parting plane. Upper reinforcement ribs 73*d* extending crosswise to the travel direction 61 are provided on the back side of the upper baking slab 72*a*, remote from the main mold parting plane.

On the front side of the lower baking slab 73*a*, oriented toward the main mold parting plane of the baking mold 71, a substantially flat lower baking surface is formed. The lower baking surface is defined on the inner longitudinal side nearer the joint 69 and on the outer longitudinal side farther from the joint 69 of the lower baking slab 73*a* by a respective inner and outer lower closure strip 73*b* and 73*c* located parallel to the travel direction 61. Two lower closure strips 73*b*, 73*c* protrude past the lower baking surface toward the main mold parting plane. Lower reinforcement ribs 73*d* extending crosswise to the travel direction 61 are provided on the back side of the lower baking slab 73*a*, remote from the main mold parting plane.

2.2. Baking Cavity of the Baking Mold

The two mold halves 72, 73 of the baking mold 71, when the baking tong 60 is closed, define a baking cavity, in which the thin-walled, flat molded articles are shaped from a relatively thin baking or pouring composition, for instance, and baked. This baking cavity is defined above the main mold parting plane by the substantially flat upper baking surface and below the main mold parting plane by the substantially flat lower baking surface. On the two long sides parallel to the travel direction 61, the baking cavity is defined by the two lower closure strips 73*b*, 73*c*. On the two transverse sides extending crosswise to the travel direction 61, the baking cavity is defined by the two upper closure strips 72*b*, 72*c*.

The height of the baking cavity when the baking tong 60 is closed determines the wall thickness of the flat, thin-walled molded articles baked in the baking mold 71. This height of the baking cavity is determined on its inner long side, toward the joint 69, by the joint 69 of the baking tong 60. On the outer long side of the baking cavity, remote from the joint 69, its height is determined by the upper and lower spacer bolts 68*c*, 68*d* and 70*c*, 70*d*, contacting one another, of the closed baking tong 60. With the baking tong 60 closed, the upper front spacer bolt 68*c* rests on the lower front spacer bolt 70*d*, and the upper rear spacer bolt 68*d* rests on the lower rear spacer bolt 70*d*.

A quantity of baking or pouring composition adapted to the volume of this baking cavity is placed in the open baking cavity while the baking tong is open. Upon closure of the baking tong 60, the baking cavity is closed, and the baking or pouring composition spreads out in the baking cavity and is shaped into a thin-walled, flat molded article. This thin-walled, flat molded article is then baked in the closed baking cavity of the externally heated baking mold 71. The quantity of heat required for this is supplied from outside to the closed baking mold 71 in the baking chamber 57 of the oven 56. In the baking chamber 57 of the oven 56, heating devices, not shown in the drawing, extending in the longitudinal direction of the oven 56, such as elongated, stationary gas burners, infrared radiant heaters or the like are provided, by way of which the endless baking tong chain 59 travels, with the baking molds 71 contained in its baking tongs 60, in the travel direction 61.

2.3. Baking Tong Chain

The open- and closable baking tongs 60 are connected to one another via two endless transport chains 75 and 76, which extend parallel to one another, to form the endless baking tong chain 59, which can be set into circulation by means of a drive motor not shown in the drawings.

Each baking tong 60 is secured by its lower tong part 70 to one of the chain straps 75*a*, 76*a* of the transport chains 75, 76 and is supported via running wheels 77 mounted on the bolts of the transport chains 75, 76 in the upper and lower transport planes 62 and 65 on rails 78 mounted laterally in the frame of the oven 56.

During the circulation of the baking tong chain 59, the lower tong parts 70 and the upper tong parts 68 traverse different paths, each of them closed, in the oven 56. The lower tong parts 70 traverse a path predetermined by the two lateral transport chains 75, 76 and by the running wheels 77 and rails 78. This path is shown in dot-dashed lines in FIG. 20 and extends through both transport planes 62, 65 and via both turning points 66, 67. The upper tong parts 68 traverse a path which is predetermined in the baking chamber 57 by the closed baking tongs 60 and in the front head 58 by stationary guide rails, shown in dot-dashed lines in the drawings, for the control rollers 74 of the upper tong parts 68. In the front head 58, the path of the control rollers 74 of the upper tong parts 68 moves outward in a wide arc, at the front turning point 66, away from the path of the lower tong parts 70 and then extends as far as the pouring station 64 parallel to the path of the lower tong parts 70 in the upper transport plane 62. After the pouring station 64, the path of the control rollers 74 of the upper tong parts 68 again approaches the path of the lower tong parts 70.

During the circulation of the baking tong chain 59, the baking tongs 60 are transported through the upper transport plane 62 with the upper tong part 69 pointing upward. On passing through the rear turning point 67, the baking tong 60 is upended and then passes through the lower transport plane 65 with its upper tong part 69 pointing downward. On passing through the front turning point 66, the baking tong 60 is inverted again and then passes through the upper transport plane 62 with its upper tong part 69 pointing upward again.

2.4. Opening and Closing of the Baking Tongs

In the front head 58, the open- and closable baking molds 71 are opened and closed by opening and closing the baking tongs 60. When the baking tongs 60 are opened and closed about their baking tong joint 69, the open- and closable baking molds 71 are opened and closed at their main mold parting planes, substantially perpendicular thereto.

During one circuit of a baking tong chain 59, each baking tong 60 is hinged open before the pouring station 64, and a baking or pouring composition is placed through the stationary pouring device 64*a* into the lower mold half 73 of the baking mold 71. After the pouring station 64, the baking tong 60 is closed and is transported closed, for baking the flat, thin-walled molded article, through the baking chamber 57 and back again into the front head 58. In the front head 58, on passing through the front turning point 66, the baking tong 60 is hinged open, and the baked, thin-walled, flat molded article is taken out of the opened baking mold 71 and transported out of the oven 56 at the discharge station 63. After passing through the discharge station 63, the hinged-open baking tong 60 is transported back in the upper transport plane 62 to the pouring station 64, where once again a baking or pouring composition is placed in the lower mold half 73 of the opened baking mold 71 with the baking tong 60 opened.

2.5. Further Embodiments of the Baking Tongs

Figure 23:
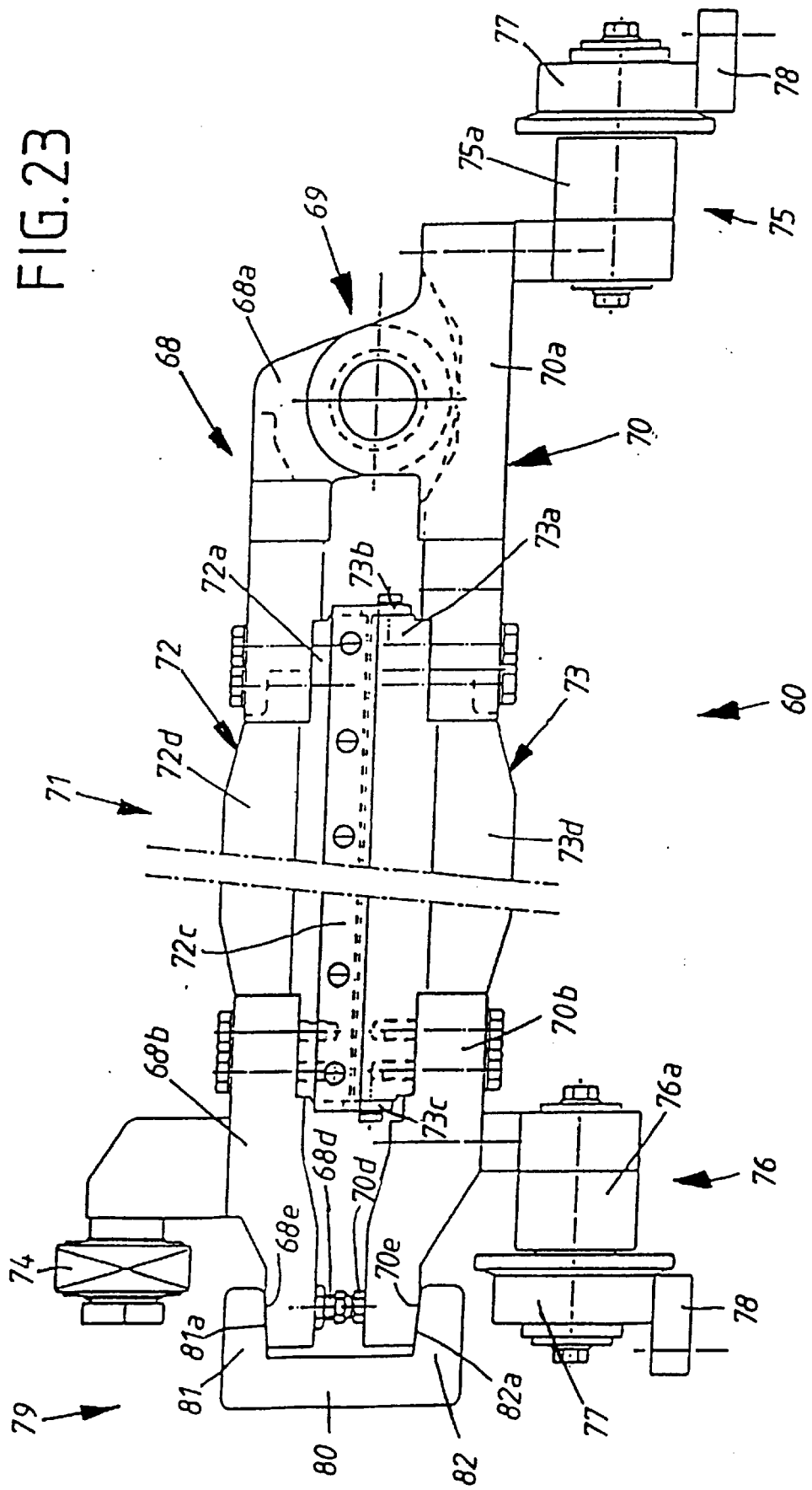
FIG. 23 shows the back side of a first exemplary embodiment of a baking tong for the oven of FIG. 21 in the upper transport plane after passing the closing station, the baking tong and baking mold being shown closed and the clamp of the clamping device being shown tightened against the closed baking tong.
Figure 24:
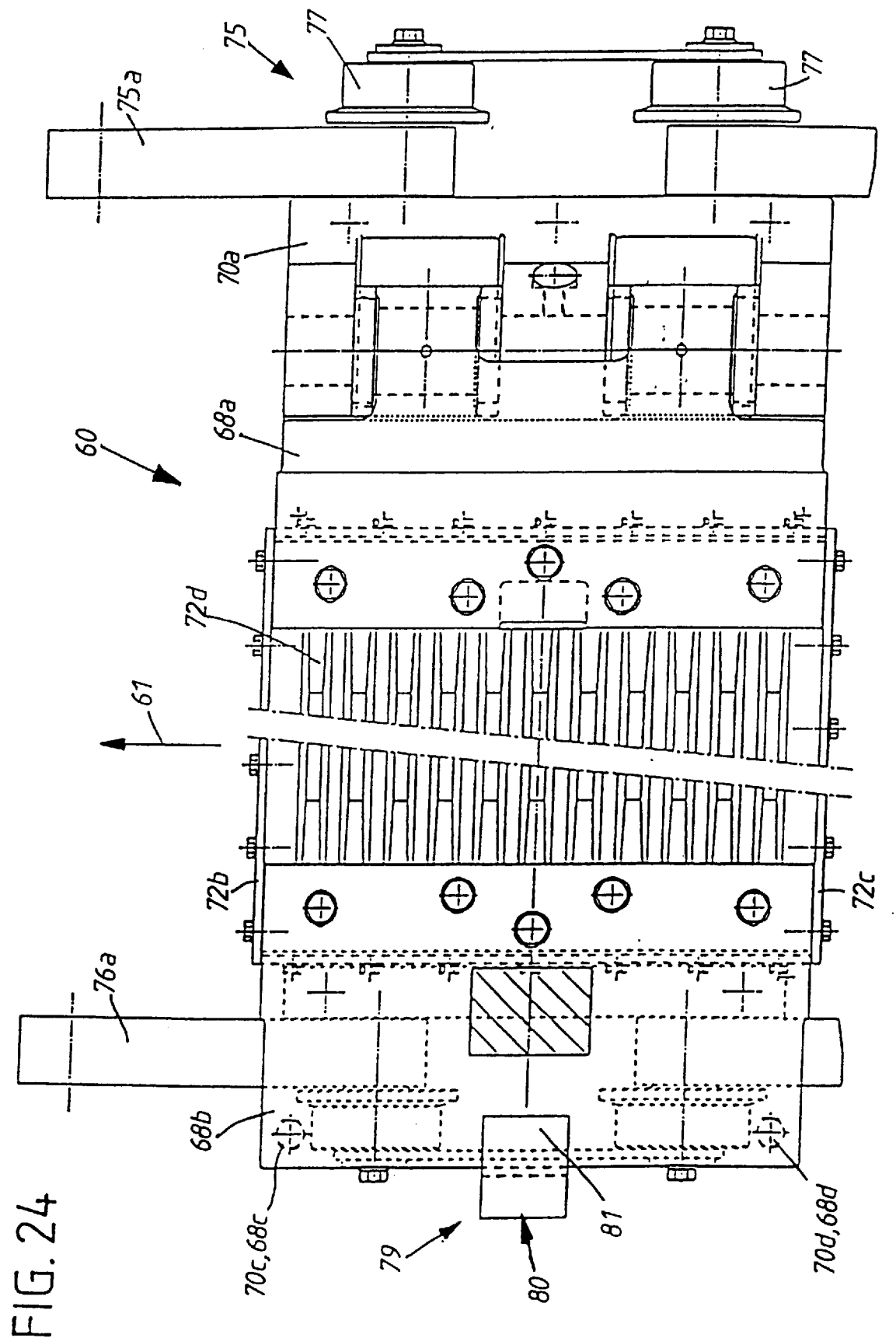
FIG. 24 shows a plan view on the baking tong of FIG. 23, with the clamping device mounted on the long side of the baking tong parallel to the travel direction.

In FIGS. 23 and 24; 25 and 26; and 27 and 28, three different exemplary embodiments of a baking tong 60 for an oven 66 as in FIGS. 21, 22 are shown. These baking tongs 60 each include one baking mold 71, described in further detail above, for producing flat, rectangular, thin-walled molded articles from baking or pouring compositions that expand during the baking process. On passing through the baking chamber 57 of the oven 56 in their closed state, these baking tongs 60 are kept closed by one or more self-adjusting clamping devices that can be tightened without play against the baking tong 60, or against the baking mold 71 contained in it. The three exemplary embodiments of the baking tongs 60 differ from one another in the disposition and embodiment of these clamping devices. For the individual parts of the baking tong 60, the same reference numerals will be used in the ensuing description of the three exemplary embodiments and in FIGS. 22–27.

2.5.1. Clamping Device On the Baking Tong

FIGS. 23 and 24 show an exemplary embodiment of a baking tong 60 with a first embodiment of a clamping device 79, which is disposed in the middle region of the long side, opposite the joint 69, of the baking tong 60. The clamping device 79 mounted laterally on the baking tong 60 is shown in its state in which it has been tightened against the closed baking tong 60.

This clamping device 79 includes two outer curved clamping faces 68e, 70e on the outside, remote from the main mold parting plane, of the upper and lower end portions 68b, 70b, respectively, of the baking tong 60. The two curved clamping faces 68e, 70e are disposed adjacent to the free outer longitudinal edge of the respective end portion 68b, 70b. The two curved clamping faces 68e, 70e are disposed symmetrically to one another with respect to the main mold parting plane of the closed baking mold 71 and are remote from the main mold parting plane.

The clamping device 79 also includes an elongated, substantially C-shaped clamp 80, separate from the baking tong 60, which has two clamping portions 81, 82 angled relative to the longitudinal axis of the clamp and spaced apart from one another. On the sides facing one another of the two clamping portions 81, 82, flat clamping faces 81a, 82a are provided for engagement with one of the two outer curved clamping faces 68e, 70e of the baking tong 60. Each flat clamping face 81a, 82a is inclined slightly relative to the longitudinal axis of the clamp 80 and rises outward away from the main body of the clamp 80.

During the circulation of the baking tong chain 59, this clamping device 79 is tightened when the clamp 80 is slipped on and is loosened from the closed baking tong 60 again by removal of the clamp 80.

After the pouring station 64, the baking tong 60 is closed. In this process the upper tong part 68 is pivoted about the joint 69 toward the lower tong part 72 with the aid of the control roller 74, until the spacer bolts 68c, 68d of the upper tong part 68 rest on the spacer bolts 70c, 70d of the lower tong part 70. In an application device, not shown in the drawings, downstream of the pouring station 64 in the travel direction 61, a clamp 80 is slipped onto the closed baking tong 60. The clamp 80 is disposed with its longitudinal axis perpendicular to the main mold parting plane of the baking mold 71 and is slipped onto the two end portions 68b, 70b of the baking tong 60 with its clamping portions 81, 82 crosswise to the travel direction 61. The flat clamping faces 81a, 82a of the clamping portions 81, 82 of the clamp 80 are oriented toward the main mold parting plane of the closed baking mold 71. The outer curved clamping faces 68e, 70e of the end portions 68b, 70b of the baking tong 60 face away from the main mold parting plane of the closed baking mold 71. When the clamp 80 is slipped on, the flat clamping faces 81a, 82a of the clamping portions 81, 82 are brought into a force-locking and self-inhibiting frictional engagement with the outer curved clamping faces 68e, 70e of the end portions 68b, 70b of the baking tong 60. The flat clamping faces 81a, 82a are displaced in this frictional engagement along the outer curved clamping faces 68e, 70e, crosswise to the travel direction 61, until by the elastic expansion of the clamp 80 a predetermined prestressing force is applied to the two tong parts 68, 70, with which force the tong parts 68, 70, resting on one another with their spacer bolts 68c, 68d, 70c, 70d, are pressed against one another. This prestressing force is preadjusted via the contact pressure of the clamp 80.

The closed baking tong 60 passes through the baking chamber 57 with the clamping device 79 tightened. Downstream of the baking chamber 57, the clamp 80 is removed again from the closed baking tong 60 crosswise to the travel direction 61 in a stripper device, not shown in the drawing, that precedes the discharge station 63. In this process, first the prestressing force applied to the two parts 68, 70 by the elastic expansion of the clamp 80 is undone. Next, the flat clamping faces 81a, 82a of the clamping portions 81, 82, in the force-locking and self-inhibiting frictional engagement, are displaced along the outer curves clamping faces 68e, 70e of the end portions 68b, 70b of the baking tong 60 until this frictional engagement is undone and the two tong parts 68, 70 are released.

The mutual position and mutual course of the clamping faces 81a, 82a and 68e, 70e depends on the materials chosen for a force-locking and self-inhibiting frictional engagement between these clamping faces 81a, 82a and 81, 82 and must be ascertained experimentally if necessary. In detail, this engagement is equivalent to the engagement conditions described above in conjunction with FIG. 19. As its movable clamping element, the clamping device 79 includes a clamp 80 that is independent of the baking tong 60. In the clamping device 79, the upper curved clamping face 68e on the upper end portion 68b of the baking tong 60 rises, in the engagement position of the clamp 80, gradually from the inside outward relative to the main mold parting plane of the baking mold 71, compared with the flat clamping face 81a, 82a of the corresponding clamping portion 81 of the clamp 80. In the same way, the lower curved clamping face 70e of the lower end portion 70b of the baking tong 60, in the engagement position of the clamp 80, gradually rises from the inside outward relative to the main mold parting plane of the baking mold 71, compared with the flat clamping face 82a of the corresponding clamping portion 82 of the clamp 80. In the engagement position of the clamp 80, the respective flat clamping face 81a, 82a of one clamping portion 81, 82, together with the corresponding curved clamping faces 68e, 70e of an end portion 68b, 70b of the baking tong 60, defines a gap that tapers in crescent-like fashion in the slip-on direction and that ends at the engagement point at the angle that is less than the static friction angle of the pairing of materials chosen for the two clamping faces. This angle, in a preferred exemplary embodiment for the paired materials of hard metal and hard metal, is 6.

2.5.2. Clamping Device On the Baking Tong

Figure 25:
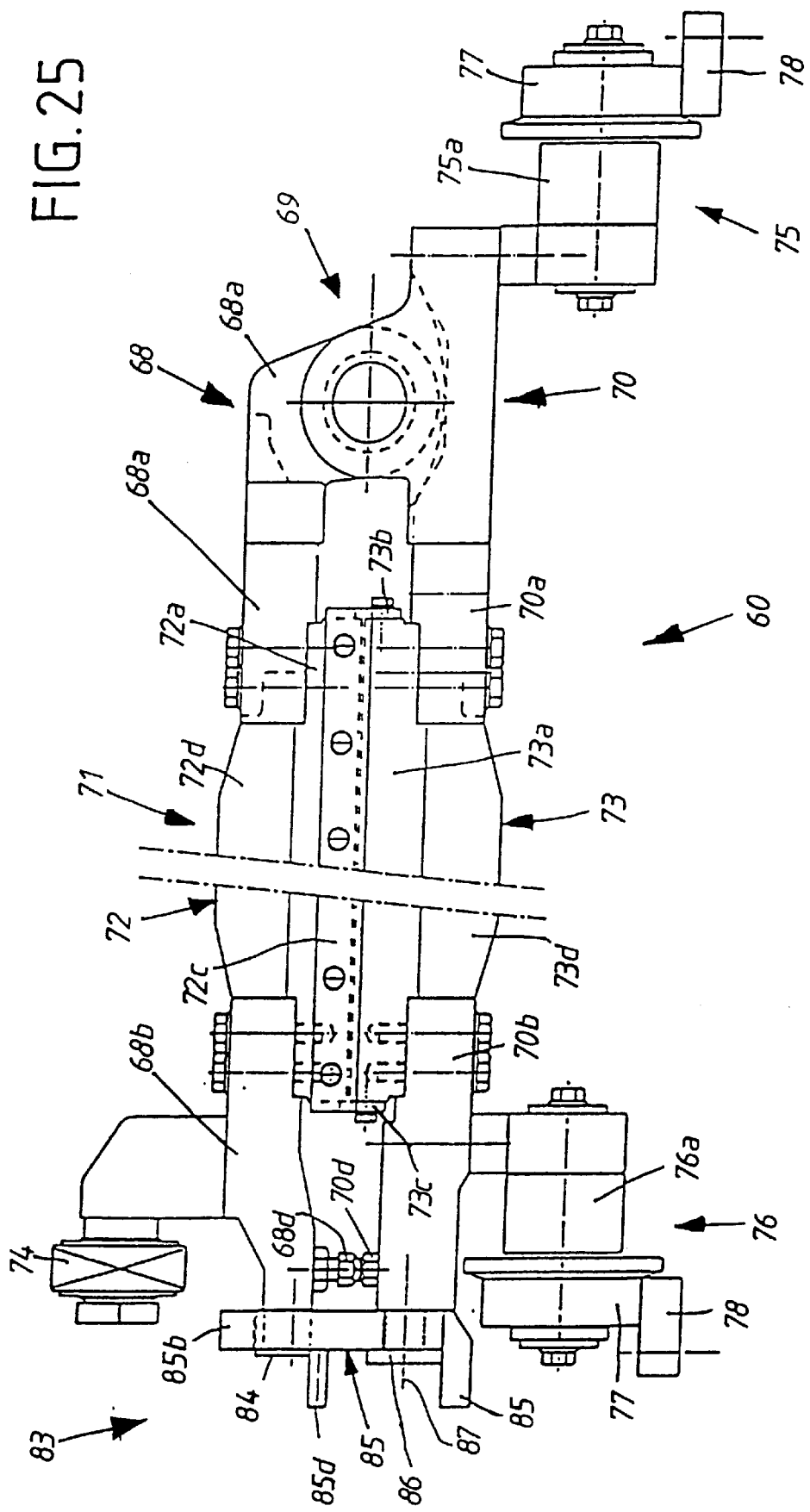
FIG. 25 shows the back side of a second exemplary embodiment of a baking tong for the oven of FIG. 21 in the upper transport plane after passing the closing station, the baking tong and baking mold being shown closed and the clamping lever of the clamping device being shown tightened against the closed baking tong.
Figure 26:
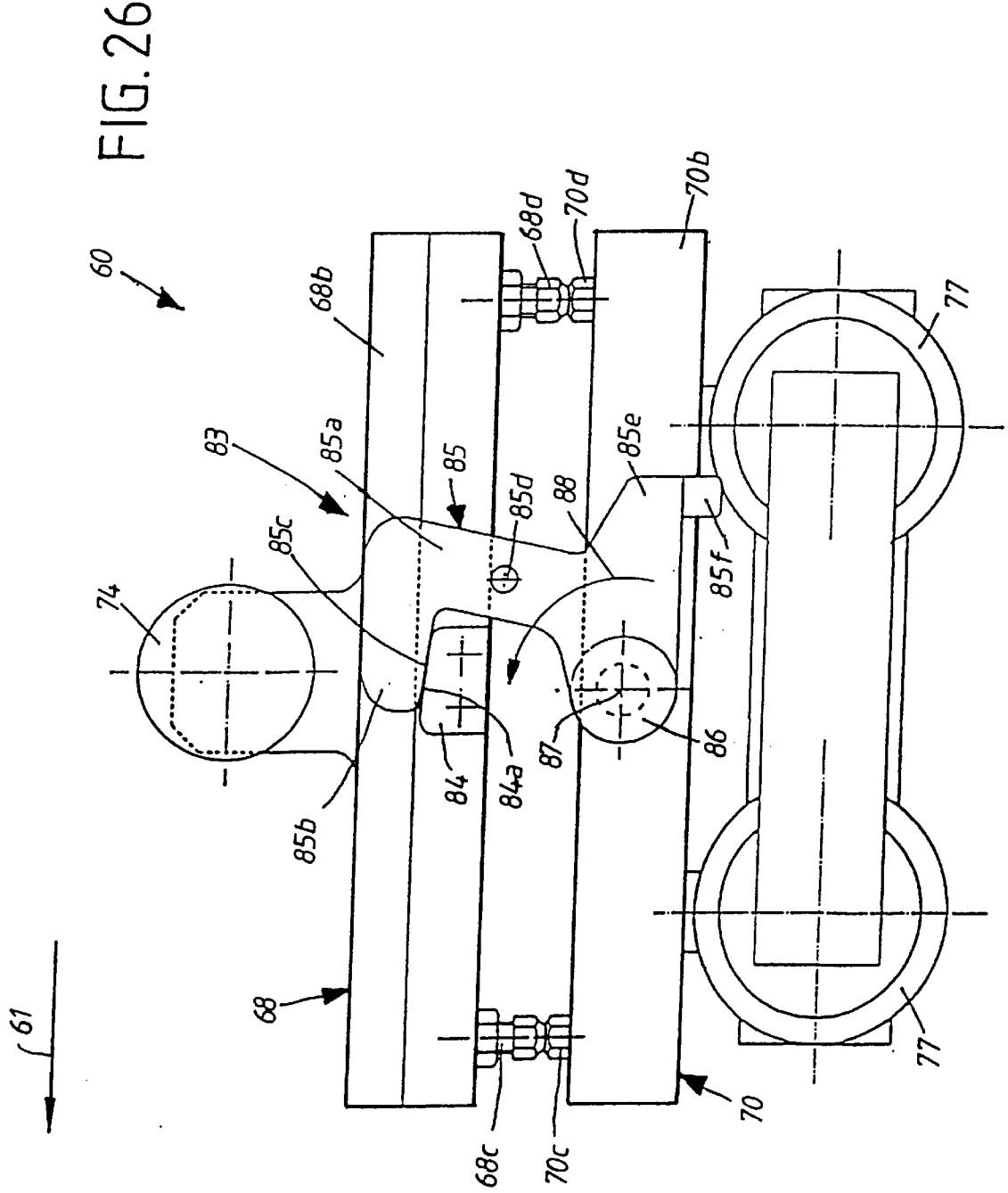
FIG. 26 shows an end view of the long side of the baking tong of FIG. 25 parallel to the travel direction, with the clamping device mounted on the long side of the baking tong parallel to the travel direction.

FIGS. 25 and 26 show an exemplary embodiment of the baking tong 60 with a second embodiment of a jv 83, which is located on the long side of the baking tong 60 opposite the joint 69 in the middle region of this long side. The clamping device 83 mounted laterally on the baking tong 60 is shown in its state in which it has been tightened on the closed baking tong 60.

The clamping device 83 includes an extension 84 protruding laterally from the upper end portion 68b of the baking tong 60, crosswise to the travel direction 61. Provided on the outside of this extension 84 is an outer curved clamping face 84a that faces away from the main mold parting plane of the baking mold 71. The clamping device 83 also includes a two-armed clamping lever 85, which extends parallel to the travel direction 61 and is pivotally supported, below the main mold parting plane of the baking mold 71, on an axle bolt 86 on the lower end portion 70b of the baking tong 60. This axle bolt 86 protrudes laterally outward from the lower end portion 70b, crosswise to the travel direction 61, and forms a pivot axis 87 for the clamping lever 85, which pivot axis is disposed crosswise to the travel direction 61 and parallel to the main mold parting plane of the baking mold 71. With the baking tong 60 closed, the axle bolt 86 is located opposite the extension 84 of the upper end portion 68 relative to the main mold parting plane of the baking mold 71. The clamping lever 85 can be pivoted about this angle bolt 86 out of a position of repose into a work position in the tightening direction 88. In its position of repose, the clamping lever 85 is located below the main mold parting plane of the baking mold 71. In its work position, the clamping lever 85 spans the main mold parting plane of the baking mold 71, from the lower tong part 70 to the upper tong part 68 of the baking tongs 60.

The clamping lever 85 includes a substantially C-shaped clamp 85a, with two spaced-apart portions oriented toward one another. With the inner portion of the clamping arm 85a, the clamping lever 85 is pivotally supported on the axle bolt 86. The outer portion of the clamping arm 85a, spaced apart from the pivot axis 87, is embodied as a clamping portion 85b, which on its inside toward the pivot axis 88 has a flat clamping face 85c for the force-locking and self-inhibiting frictional engagement with the outer, curved clamping face 84a of the upper end portion 68b of the baking tong 60. A first actuating journal 85d of the clamping lever 85 is mounted, eccentrically to the axle bolt 86, on the clamping arm 85a and protrudes laterally from the clamping arm 85a crosswise to the travel direction 61. The clamping lever 85 also includes an actuating arm 85e, which protrudes rearward counter to the tightening direction 88 form the inner portion of the clamping arm 85a and which on its rear end has a second actuating journal 85f of the clamping lever 85, protruding laterally crosswise to the travel direction 61.

After the pouring station 64, the already-closed baking tongs 60 of the baking tong chain 59 pass a first actuating device, not shown in the drawings but associated with the lateral clamping devices 83, for tightening the lateral clamping devices 83 against the already-closed baking tongs 60. The clamping lever 85 of the clamping device 83 of a baking tong 60 comes into engagement, by its first actuating journal 85d, with the first actuating device and is pivoted upward with its clamping arm 85a in the tightening direction 88 into its work position. In this pivoting motion, the clamping lever 85 is pivoted forward in the travel direction 61 with the flat clamping face 85c of its clamping portion 85b and is brought into a force-locking and self-inhibiting frictional engagement with the outer, curved clamping face 84a on the extension 84 of the upper end portion 68b of the baking tong 60. In this frictional engagement, the flat clamping face 85c is displaced forward in the travel direction 61 along the outer, curved clamping face 84a far enough that first the play of motion of the clamping lever 85 is eliminated, and then by the elastic expansion of the clamping arm 85a a predetermined prestressing force is exerted on the two tong parts 68, 70, with which force the tong parts 68, 70, resting on one another with their spacer bolts 68c, 68d, 70c, 70d, are pressed together. This prestressing force is preadjusted via the contact pressure exerted by the first actuating device on the first actuating journal 85d of the clamping lever 85.

After the baking chamber 57, the closed baking tongs 60 of the baking tong chain 59 pass a second actuating device, associated with the lateral clamping devices 83 but not shown in the drawings, for releasing the lateral clamping devices 83 from the still-closed baking tongs 60. The clamping lever 85 of the clamping device 83 of a baking tong 60 comes into engagement, by its second actuating journal 85f, with the second actuating device and is pivoted downward, counter to the tightening direction 88, with its clamping arm 85a into its position of repose. In this process, first the prestressing force exerted on the two tong parts 68, 70 by the elastic expansion of the clamping arm 85a is reduced. Next, the flat clamping face 85c of the clamping portion 85b, in the force-locking and self-inhibiting frictional engagement, is displaced along the outer, curved clamping face 84a of the extension 84 counter to the travel direction 61 until the play of motion of the clamping lever 85 is re-established, this frictional engagement is undone, and the two tong parts 68, 70 are released.

The mutual position and mutual course of the clamping faces 84a, 85c depends on the pairing of materials chosen for a force-locking and self-inhibiting frictional engagement between the flat clamping face 85c of the clamping portion 85b and the curved clamping face 84a on the extension 84 of the end portion 68b of the baking tong 60 and must be ascertained experimentally if necessary. In detail, this engagement is equivalent to the engagement conditions explained above in conjunction with FIG. 19.

2.5.3. Clamping Devices On the Baking Mold

Figure 27:
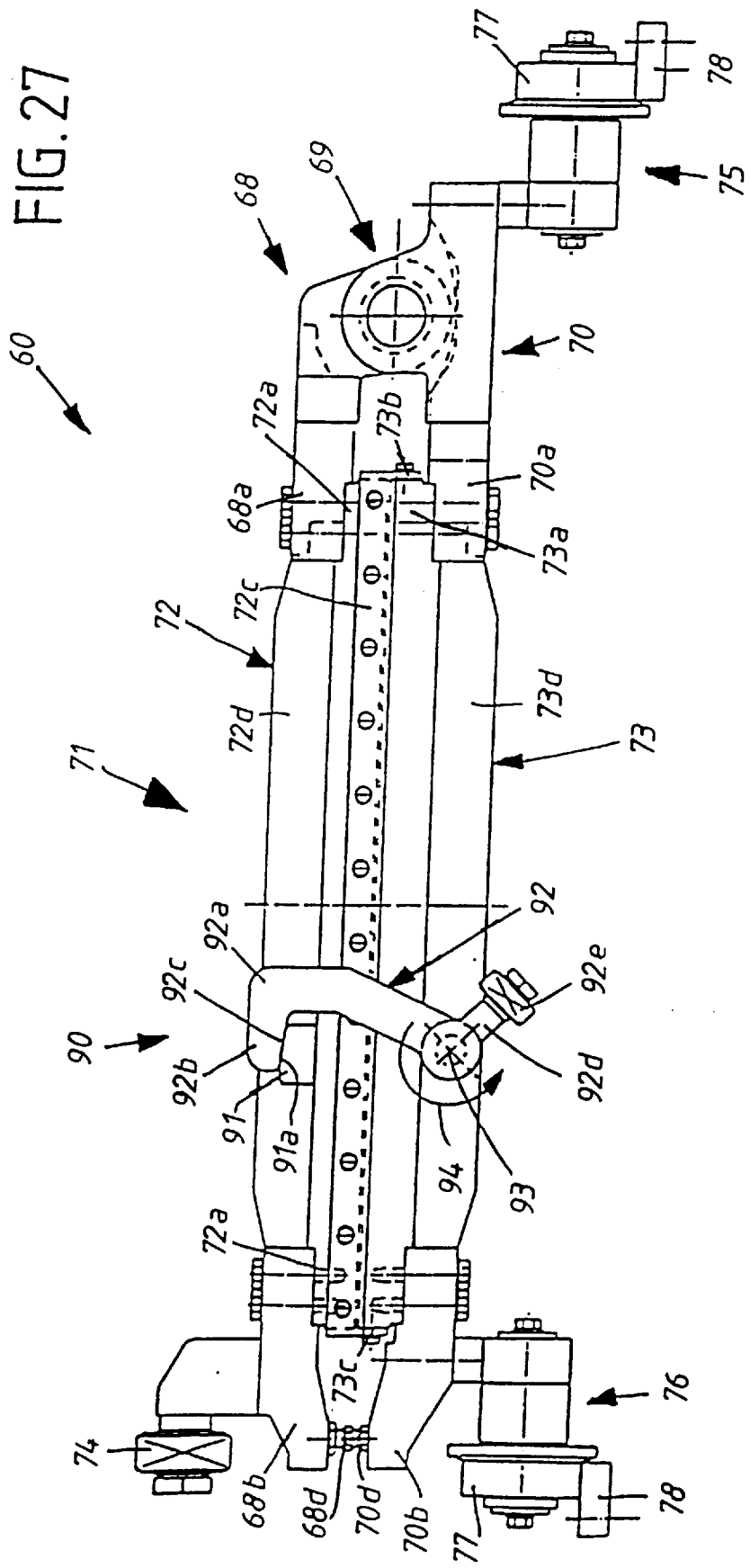
FIG. 27 shows the back side of a third exemplary embodiment of a baking tong for the oven of FIG. 21 in the upper transport plane after passing the closing station, the baking tong and baking mold being shown closed and the clamping levers of the clamping device being shown tightened against the closed baking tong.
Figure 28:
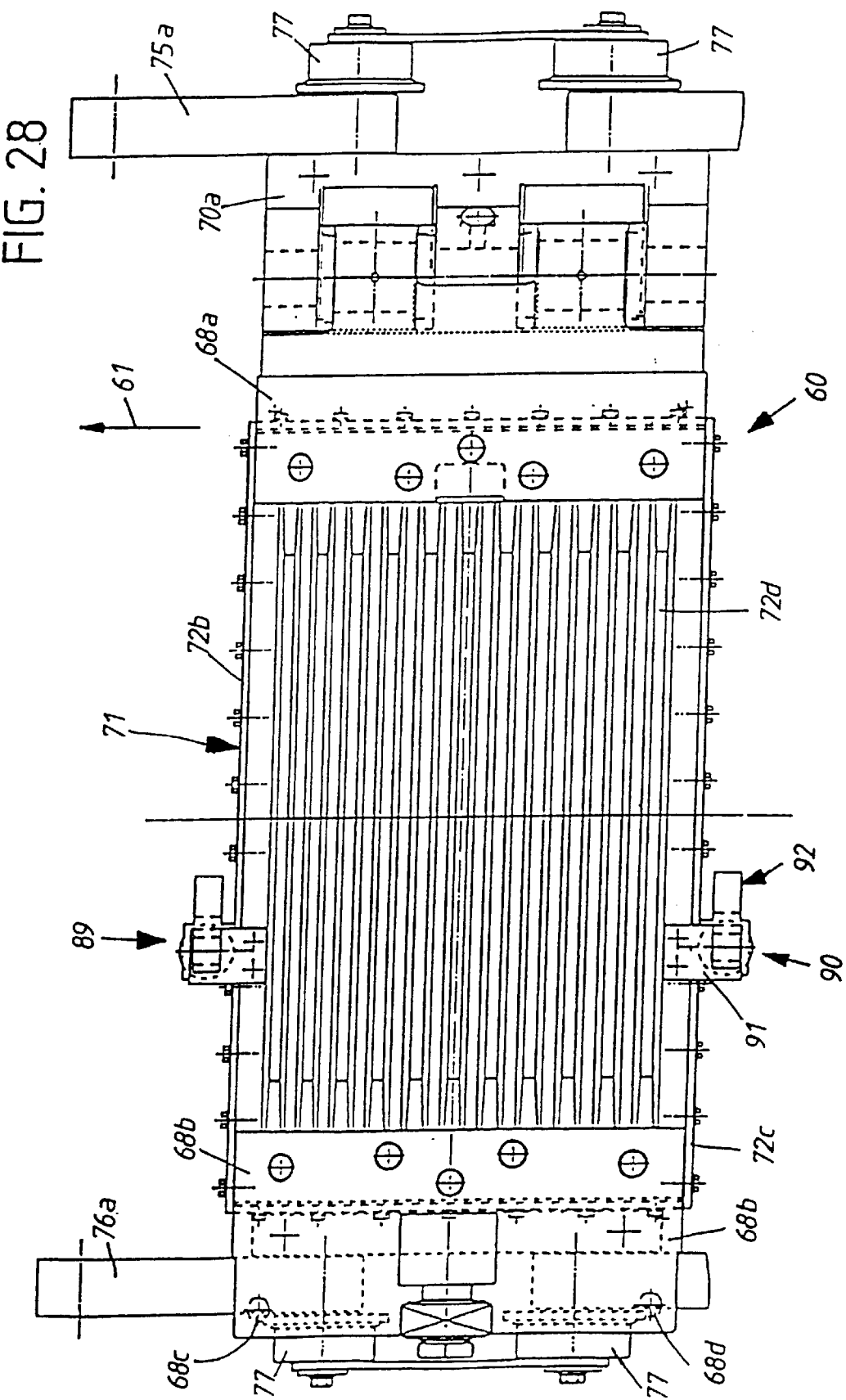
FIG. 28 shows a plan view on the baking tong of FIG. 27 with the two clamping devices mounted on the transverse sides of the baking mold located crosswise to the travel direction.

FIGS. 27 and 28 show an exemplary embodiment of the baking tong 60 in which there are two clamping devices 89 and 90, facing one another in the travel direction 61 of the baking tong 60, mounted on the two transverse sides of the baking mold 71 extending crosswise to the travel direction 61. The two clamping devices 89, 90 mounted laterally on the baking mold 71 are tightened without play against the closed baking mold 71 with baking tong 60 closed. In FIGS. 27 and 28, they are shown in their state in which they have been tightened against the closed baking mold 71. The two clamping devices 89, 90 have the same construction, so that the ensuing description of the rear clamping device 90, visible in FIG. 27 and mounted on the rear transverse side of the baking mold 71, logically applies as well to the front clamping device 89 mounted on the front transverse side of the baking mold 71.

The rear clamping device 90 includes a rear extension 91, protruding rearward counter to the travel direction 61 from the upper mold half 72 of the baking mold 71, with an outer, curved clamping face 91a on its outside remote from the main mold parting plane of the baking mold 71. The rear clamping device 90 also includes a rear two-armed clamping lever 92, disposed crosswise to the travel direction 61, which is pivotally supported below the main mold parting plane of the baking mold 71 on the lower mold half 73. The rear clamping lever 92 is pivotally supported on a rear axle bolt, which with the baking mold 71 closed is opposite the rear extension 91 of the upper mold half 72 relative to the main mold parting plane of the baking mold 71 and protrudes rearward from the lower mold half 73, counter to the travel direction 61. This rear axle bolt forms a pivot axis 93 which is parallel to the travel direction 61 and to the main mold parting plane of the baking mold 71 and about which the rear clamping lever 92 can be pivoted out of a position of repose into a work position in the tightening direction 94. In its position of repose, the rear clamping lever 92 is located below the main mold parting plane of the baking mold 71. In its work position, the rear clamping lever 92 spans the main mold parting plane of the baking mold 71, from the lower mold half 73 to the upper mold half 72 of the baking mold 71.

The rear clamping lever 92 includes a substantially C-shaped clamping arm 92a with two portions facing one another and spaced apart from one another. By the inner portion of the clamping arm 92a, the clamping lever 92 is pivotally supported on the rear axle bolt. The outer portion of the clamping arm 92a, spaced apart from the pivot axis 93, is embodied as a clamping portion 92b, which on its inside toward the pivot axis 93 has a flat clamping face 93c for the force-locking and self-inhibiting frictional engagement with the outer, curved clamping face 91a of the rear extension 91 of the upper mold half 72. The clamping lever 92 also includes an actuating arm 92d, protruding from the inner portion of the clamping arm 92a and extending obliquely away from the pivot axis 93 relative to the clamping arm 92a; on its outer end, this actuating arm has a rotatable actuating roller 92e.

After the pouring station 64, the closed baking tongs 60 of the baking tong chain 59 pass through a first actuating device, not shown in the drawings but associated with the clamping devices 89, 90, for tightening the clamping devices 89, 90 against the closed baking molds 71. Both in the clamping device 89 and in the clamping device 90, the respective clamping lever 92, with the actuating roller 92e of its actuating arm 92d, comes into engagement with the first actuating device and is pivoted out of its position of repose into its work position. In this pivoting motion, the respective clamping lever 92 is pivoted upward by its clamping arm 92a about its pivot axis 93 in the tightening direction 94 and is brought into a force-locking and self-inhibiting frictional engagement, by the flat clamping face 92c of its clamping portion 92b, with the associated outer, curved clamping face 91a on the corresponding extension 91 of the upper mold half 72.

In the rear clamping device 92 of the baking mold 71, the clamping lever 92 is pivoted upward in the tightening direction 94 about its pivot axis 93 by the flat clamping face 92c of its clamping portion 92b. In the process, the flat clamping face 92c is brought into a force-locking and self-inhibiting frictional engagement with the outer, curved clamping face 91a on the rear extension 91 of the upper mold half 72. In this frictional engagement, the flat clamping face 92c is displaced forward in the tightening direction 94 on the outer, curved clamping face 91a far enough that the play of motion of the clamping lever 92 is eliminated and then subsequently until a predetermined prestressing force is brought to bear on the two tong parts 68, 70 by the elastic expansion of the clamping arm 92a, with which prestressing force the tong parts 68, 70 resting on one another with their spacer bolts 68c, 68d, 70c, 70d are pressed against one another. This prestressing force is preadjusted via the contact pressure exerted by the first actuating device on the actuating arm 92d of the clamping lever 85.

After the baking chamber 57, the closed baking tongs 60 of the baking tong chain 59 pass a second actuating device, not shown in the drawings but associated with the clamping devices 89, 90, for loosening the clamping devices 89, 90 from the still-closed baking molds 71. In both the clamping device 89 and the clamping device 90, the respective clamping lever 92 comes into engagement, by the actuating roller 92e of its actuating arm 92d, with the second actuating device and is pivoted out of its work position into its position of repose. In this pivoting motion, the respective clamping lever 92 is pivoted downward with its clamping arm 92a about its pivot axis 93 counter to the tightening direction 94 and is released by the flat clamping face 92c of its clamping portion 92b from the force-locking and self-inhibiting frictional engagement with the associated outer, curved clamping face 91a on the corresponding extension 91 of the upper mold half 72. In each clamping device 89, 90, first the prestressing force exerted on the two tong parts 68, 70 of the baking tong 60 by the elastic expansion of the respective clamping arm 92a is reduced. Then, in each clamping device 89, 90, the upper clamping face 92c of the clamping portion 92b of each clamping lever 92, in the force-locking and self-inhibiting frictional engagement, is displaced along the outer, curved clamping face 91a of the respective extension 91 of the upper mold half 72 of the baking mold 71 counter to the tightening direction 94 until the play of motion of the respective clamping lever 92 is re-established, this frictional engagement is undone, and the two tong parts 68, 70 of the baking tong 60 are released. The mutual position and mutual course of the clamping faces of the clamping devices 89, 90 depends on the pairing of materials chosen for a force-locking and self-inhibiting frictional engagement between the flat clamping face of the respective clamping portion and the curved clamping face on the respective extension of the upper mold half 72 of the baking mold 71 and must be ascertained experimentally if necessary. In detail, this engagement is equivalent to the engagement conditions described above in conjunction with FIG. 19.

3. Further Exemplary Embodiments of the Baking Tongs

In the baking tongs 7 described above for producing thin-walled, cone- or cup-shaped molded articles, the lower clamping devices, associated with the second mold parting plane of the baking molds 16 and each having one pivotable clamping lever 47 as its movable clamping element, may also be replaced by lower clamping devices, each having one substantially C-shaped clamp, separate from the baking mold 16, as its movable clamping element, which correspond substantially to the clamping device 79 described above in conjunction with FIGS. 23 and 24. In such a case, the further opening station 51 of the oven 1 associated with the lower clamping devices should be equipped with a device for stripping off the clamps, and the further closing station 50 of the oven 1 associated with the lower clamping devices should be equipped with a device for slipping the clamps on.

In the above baking tongs 7, described in conjunction with FIGS. 4–20, for producing thin-walled, cone- or cup-shaped molded articles, it is also possible to build into the baking tongs 7 of the baking tong chain 6 baking molds 16 in which when the thin-walled molded articles bake, such a slight pressure load is exerted on the lower end of the female die, formed by the two lower baking mold parts 21, 22, in the second mold parting plane that they can be received solely by the tightened upper clamping devices 30. In such baking tongs 7, the lower clamping devices associated with the second mold parting plane are omitted from the baking molds 16. Also omitted are the further opening station 51 associated with the lower clamping devices and the further closing station 50 associated with the lower clamping devices in the oven 1. A baking tong chain 6 equipped with such baking molds 16 that have only upper clamping devices 30 expediently includes somewhat-modified movement mechanisms for the lower baking mold parts 21, 22 of the baking tongs 7. The modified movement mechanisms press the lower baking mold parts 21, 22 of the baking tong 7 against one another by their sealing faces 21a, 22a oriented toward the second mold parting plane of the baking mold 16. This can be done for instance with the aid of contact-pressure springs that are disposed in the guide channels of the control straps 26a, 26b and can be brought into engagement with the control bolts 32c of the baking mold carriers 32 of the front lower baking mold parts 21. It can also be accomplished with the aid of contact-pressure springs that act directly upon the back sides, facing one another, of the adjacent lower baking mold parts 21, 22 of two adjacent baking tongs 7.

In the above-described baking tongs 60 for producing flat, thin-walled molded articles, it is also possible, instead of the joint 69 joining the respective upper tong part 68 to the lower tong part 70, to use at least one guide sword disposed crosswise to the travel direction 61 next to the respective baking mold 71, perpendicular to the main mold parting plane of the respective baking mold 71. This lateral guide sword, as in the baking tong 7, is rigidly connected to the upper tong part 68 in an upper guide head disposed crosswise to the travel direction 61 next to the upper mold half 72 of the baking mold 71, and is displaceably guided in a lower guide head of the lower tong part 70, perpendicular to the main mold parting plane of the baking mold 71, that is disposed crosswise to the travel direction 61 next to the lower mold half 73 of the baking mold 71.

4. Ovens With A Circulating Baking Tong Chain

Figure 29:
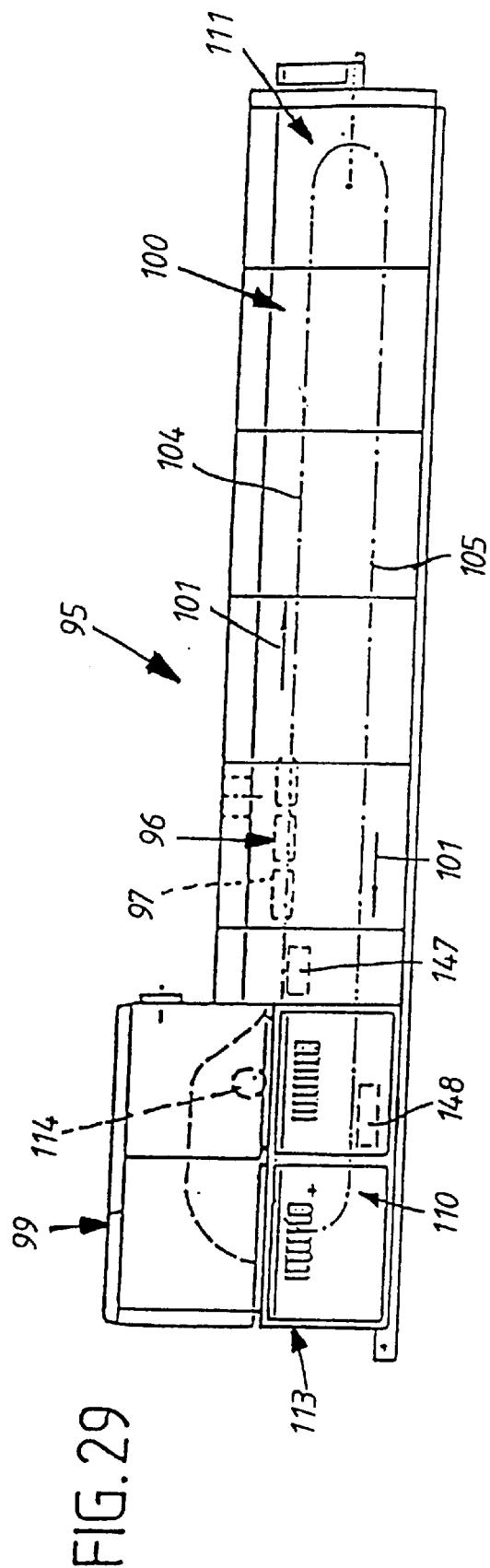
FIG. 29 shows a side view of a baking oven for producing flat, thin-walled molded articles with a front head, a baking chamber, and an endless baking tong chain circulating in the interior of the oven.
Figure 30:
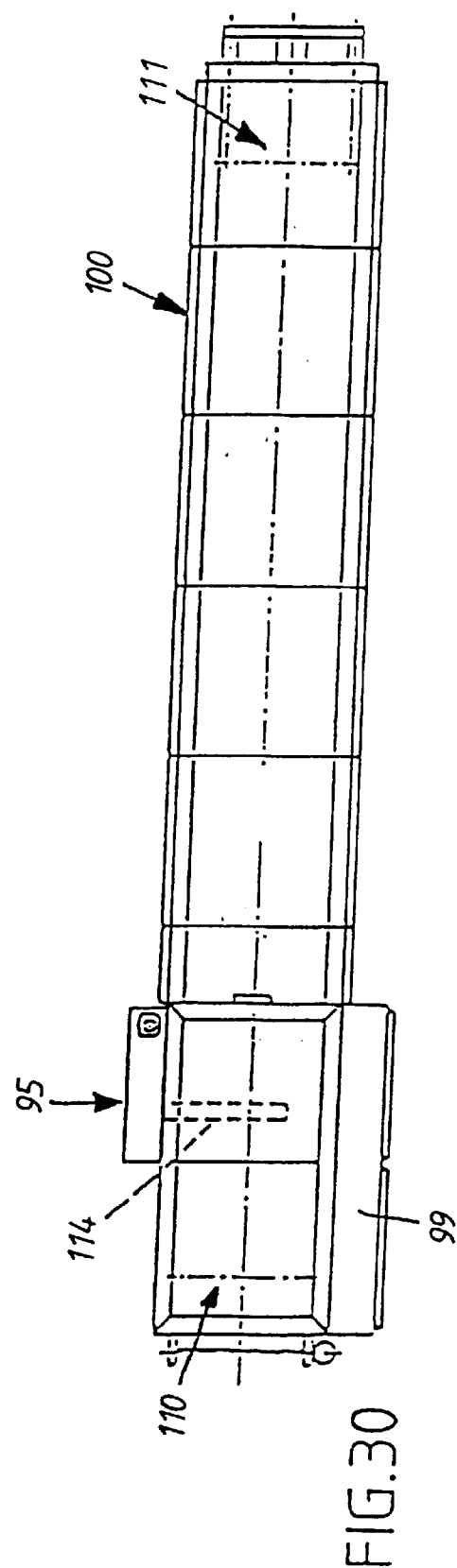
FIG. 30 shows a plan view on the oven of FIG. 29.

FIGS. 29 and 30 show an elongated oven 95 with an endless baking tong chain 96 circulating in it, whose baking tongs 97 contain the baking molds 98, made in two or more parts, in whose cavities the thin-walled molded articles are shaped from the respective baking or pouring compositions and baked.

The oven 95 is provided with an outer heat-insulating lining and comprises a front head 99 and an elongated baking chamber 100 adjoining it.

The baking tong chain 96 passes through the front head 99 and the baking chamber 100 in the direction of the arrow 101. The open- and closable baking tongs 97 of the baking tong chain 96 are disposed one after the other in the longitudinal direction of the oven 95 and are joined on their side edges parallel to the travel direction 101 to endless transport chains 102, 103, which are each disposed adjacent one side wall of the oven 95 and extend parallel to the longitudinal direction of the oven 95. The baking tong chain 96 passes through the oven 95 in two transport planes 104 and 105 located one above the other. Each transport plane is assigned lateral rails 106, 107 in the oven 95, on which the baking tongs 97 are supported by means of lateral running wheels 108, 109 that are mounted on the transport chains 102, 103.

In the front head 96 the baking tong chain 96 is deflected from the lower transport plane 105 to the upper transport plane 104 via a front turning point 110. On the rear end of the baking chamber 100, the baking tong chain 96 is deflected from the upper transport plane 104 to the lower transport plane 105 via a rear turning point 111. On passing through the turning points 110, 111, the baking tongs 97, together with the baking molds 98 contained in them, are each upended. The baking tongs 97 and the baking molds 98 received in them are transported in the closed state through the baking chamber, and as they pass the front head 99, they are first opened, then kept open and finally closed again, all with the aid of control rollers 122 mounted on the baking tongs 97.

In the front head 99, in the region of the front turning point 110 of the baking tong chain 96, a discharge station 113 for the thin-walled molded articles is provided, which in the baked, thin-walled molded articles are removed from the opened baking molds 98 and transported out of the oven 95. In the front head 99, a pouring station 114 for the baking or pouring compositions is provided in the upper transport plane 104 of the oven 95; in this station, the baking or pouring compositions are placed in the opened baking molds 98 in precisely metered quantities. This pouring station 114 follows the discharge station 113 in the travel direction 101 of the baking tong chain 96. A rod linkage 115, which extends along the path of the baking tong chain 96, is provided in the front head 99. The rod linkage 115 begins even before the discharge station 114 and does not end until after the pouring station 113. This rod linkage 115 is in engagement with the controllers 112 of the baking tongs 97 when these baking tongs, on passing the front head 99, are opened, kept open, and closed again. The baking tongs 97 passing the front head 99 are opened, together with the baking molds 98 contained in them, before reaching the discharge station 113, are kept open along the way from the discharge station 113 to the pouring station 114, and are closed again after leaving the pouring station 114.

The heat required for the baking process that takes place in the individual baking molds 98 is supplied to the baking molds 98 contains in the baking tongs 97 during the circulation of the baking tong chain 96. This heat can be supplied to the baking molds 98, depending on the design of the oven 95, by heating elements (such as electrical heating elements) built into the circulating baking tongs 97, or by heating elements disposed in the frame of the oven 95 that is disposed along the path of the baking tong chain 96 and that heat the baking molds 98 of the baking tongs 97 passing by them.

4.1 Baking Tongs

Each baking tong 97 has a platelike lower tong part 116, which extends crosswise to the travel direction 101 and is secured laterally to two chain straps 102a, 103a associated with one another of the two transport chains 102, 103. Each baking tong 97 also has a joint 117, mounted on the lower tong part 116 near one transport chain 103, with a pivot axis parallel to the travel direction 101. Each baking tong 97 also has a platelike upper tong part 118, which extends crosswise to the travel direction 101 and is pivotally supported in the joint 117 crosswise to the travel direction 101. On its side edge remote from the joint 117, the upper tong part 118 has a control roller 112, with which it is pivoted crosswise to the travel direction 101 relative to the lower tong part 118 to open and close the baking tong 97. With the baking tong 97 closed, the two tong parts 116, 118 are located one above the other with their front sides facing one another.

Each baking tong 97 includes an open- and closable baking mold 98, which comprises two mold halves 119, 120, which are secured with equal spacing from the joint 117 to the front sides of the two tong parts 116, 118; the lower mold half 119 is secured to the lower tong part 116, and the upper mold half 120 is secured to the upper tong part 118. The baking mold 98 is divided by a main mold parting plane into the two mold halves 119, 120, which with their front sides facing one another and with the baking mold 98 closed define one or more baking cavities, whose three-dimensional shape corresponds to the particular thin-walled molded articles to be made in the baking mold 98.

Each baking tong 97 extends with its two tong parts 116, 118 crosswise to the travel direction 101 laterally past the baking mold 98 received in it.

On the side of the baking mold 98 remote from the joint 117, the two tong parts 116, 118 form end portions 121, 122 that protrude laterally past the respective mold halves 119, 120. The end portion 121 of the lower tong part 116 is connected on its outer side edge to the chain strap 102a of the transport chain 102. The end portion 122 of the upper tong part 118 carries the control roller 112 on its outer side edge.

Spacer bolts 123, 124 oriented mutually toward one another are mounted, adjacent the baking mold 98, on the end portions 121, 122 of each of the two tong parts 116, 118; these bolts define the mutual spacing of the two mold halves 119, 120 when the baking mold 98 is closed. Each end portion 121, 122 on its front end has two spacer bolts 123, 124, which are perpendicular to the main mold parting plane of the baking mold 98 and are disposed one after the other in the travel direction 101. The spacer bolts 123 of the lower end portion 121, when the baking tong 97 is closed, rest on the spacer bolts 124 of the upper end portion 122. The spacer bolts 124 of the upper end portion 122 are adjustable along their longitudinal axis and hence at right angles to the main mold parting plane (FIG. 33).

4.1.1. Baking Molds

Figure 31:
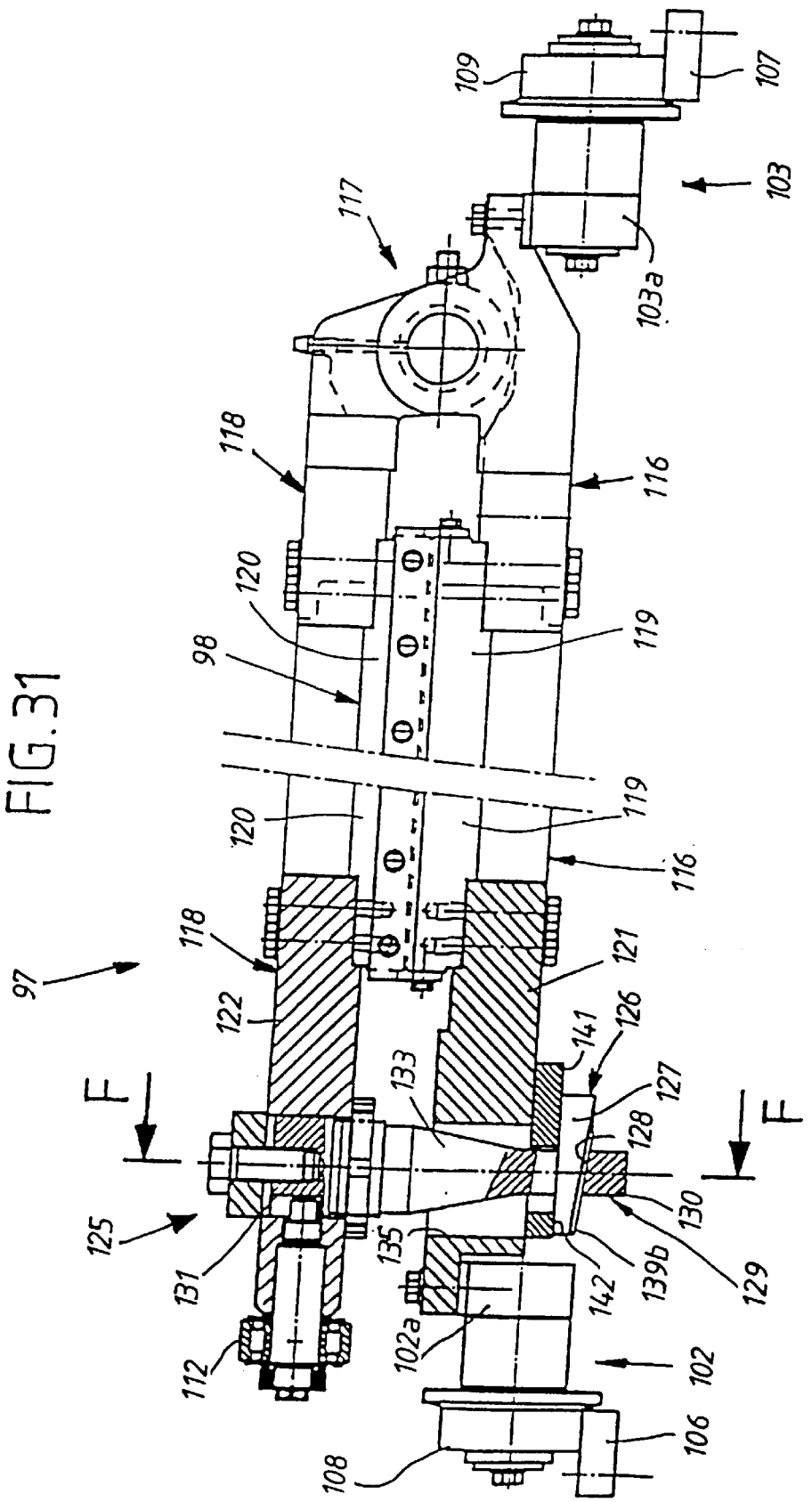
FIG. 31 shows the back side of a closed baking tong located in the upper transport plane of the oven if FIG. 29, the baking tong including a baking mold for producing rectangular flat sheets, and the end portions of the baking tong with the tightened clamping device being shown in a section perpendicular to the travel direction of the baking tong.

In the baking tong 97 of FIG. 31, both the lower mold half 119 and the upper mold half 120 of the baking mold 98 comprise a rectangular baking slab with side edges parallel and perpendicular to the travel direction 101, respectively, as well as two lateral strips, called closure strips, which are mounted on opposed side edges of the baking slab and each protrude past the flat, rectangular baking surface embodied on the back side of the baking slab.

With the baking tong 97 closed, the two mold halves 119, 120 define a single, parallelepiped baking cavity, defined on the outside by its box and its closure strips, for producing thin rectangular crackers. This baking cavity is closed off, on its side edges parallel to the travel direction 101, by the closure strips of the lower mold half 119, which are provided with steam channels, and on its side edges perpendicular to the travel direction 101 by the closure strips of the upper mold half 120. The height of this baking cavity determines the thickness of the thin rectangular sheets produced in it. This height is determined by the mutual spacing between the two mold halves 119, 120 that exists when the baking mold 198 is closed. This spacing is defined by the spacer bolts 123, 124 on the end portions 121, 122 of the two tong parts 116, 118 of the baking tong 97 and is set or adjusted by adjusting the spacer bolts 124.

Figure 32:
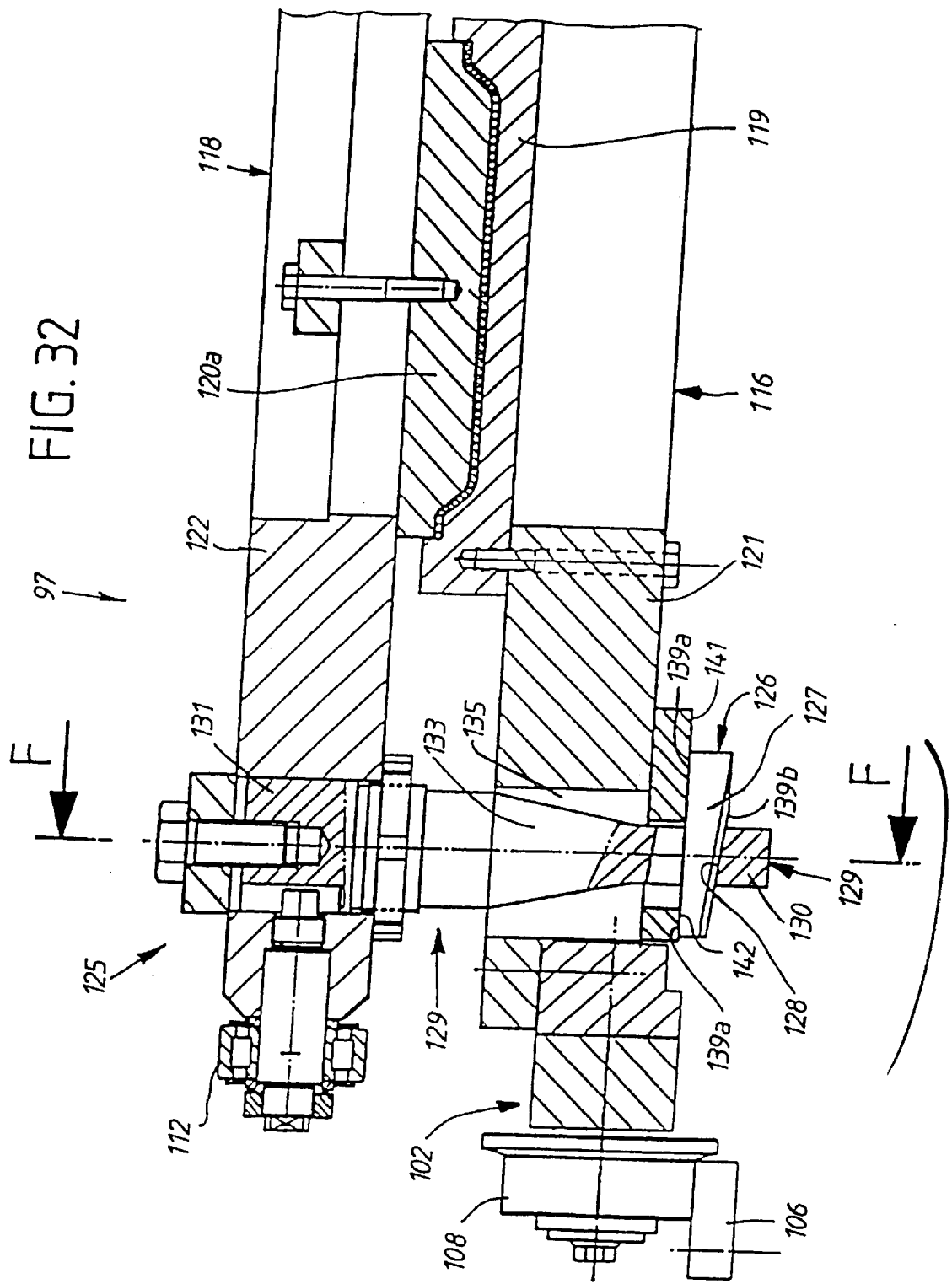
FIG. 32 shows the part of a closed baking tong that has the clamping device, which differs from that of FIG. 31 only in the baking mold, in a section perpendicular to the travel direction of the baking tong; the baking tong includes a baking mold for simultaneously producing a plurality of flat cuffs, and the clamping device is shown tightened against the end portions of the baking tong.

In the baking tong 97 of FIG. 32, the lower mold half 119 of the baking mold 98 is embodied as a one-piece, flat baking slab, which unites in itself on its front side a plurality of spaced-apart female dies. The upper mold half 120 of the baking mold 98 is embodied in multiple parts and includes a plurality of separate male dies 120a. With the baking tong 97 closed, the two mold halves 119, 120 define a plurality of baking cavities, separate from one another and closed off from the outside, for simultaneously producing a plurality of thin-walled, flat cups in a single baking tong 97. The height of these cavities determines the wall thickness of the cups made in them. This height is determined by the mutual spacing of the two mold halves 119, 120 when the baking mold 98 is closed. This spacing is defined by the spacer bolts 123, 124 on the end portions 121, 122 of the two tong parts 116, 118 of the baking tong 97 and is set or adjusted by adjusting the spacing bolts 124.

4.1.2. Clamping Device On the Baking Tong

Each baking tong 97 is provided, on the side of the baking mold 98 remote from the joint 117, with a clamping device 125 which is actuated externally, with the baking tong 97 closed, when the two tong parts 116, 118 support one another by the spacer bolts 123, 124 of their end portions 121, 122. The clamping device 125 is actuated from outside once each in the front head 99 after the closure and before the opening of the baking tong 97.

After the closure of the baking tong, the clamping device 125 is tightened form-lockingly against the end portions 121, 122, in the course of which it must be assured that on the one hand the two tong parts 116, 118 are supported on one another via their spacer bolts 123, 124 and that the clamping element 126 is in play-free engagement, by its clamping portion 127, with the clamping face 128 of the clamping element 129. During the baking process, with the baking tong 97 closed, the clamping device 125 acts counter to the internal pressure developing in the cavity of the closed baking mold 98, which internal pressure presses on the baking surfaces facing one another of the two mold halves 119, 120 of the baking mold 98 and acts in the opening direction of the baking tong 97. The prestressing force exerted by the clamping device 125 in the closing direction of the baking tong 97 is always greater than the force acting in the opening direction of the baking tong 97, which is generated by the internal pressure of the baking mold 98 during the baking process. Before the baking tong 97 is opened, the clamping device 125 is loosened, as long as the two tong parts 116, 118 are still pressed together by a contact-pressure device via the spacer bolts 123, 124 of their end portions 121, 122.

The clamping device 125 includes a clamping element 126, movably supported on the end portion 121 of the one tong part 116; this clamping element can be tightened with its clamping portion 127 against a clamping face 128 of an elastically expandable clamping element 129 that is rigidly connected to the end portion 122 of the other tong part 118. With the baking tong 97 closed and still unlocked, the two end portions 121, 122 face one another, and the movable clamping element 126 is located laterally beside the elastically expandable clamping element 129.

The clamping device 125 is actuated in the oven 95 by a separating actuating device of the oven 95 before the opening of the closed baking tong 97 and after the closure of the open baking tong 97. These two actuating devices each shift the movable clamping element 126 of the clamping device 125. Upon actuation of the clamping device 125 after the closure of the baking tong 97, the movable clamping element 126 is first moved toward the elastically expandable clamping element 129, until the movable clamping element 126 rests without play with its clamping portion 127 on the clamping face 128 of the elastically expandable clamping element 129.

A force-locking and self-inhibiting frictional engagement is provided between the clamping portion 127 of the movable clamping element 126 and the clamping face 128 of the elastically expandable clamping element 129. After the play-free engagement of the clamping device, the further shifting travel of the movable clamping element 126 relative to the elastically expandable clamping element 129 has the effect that the two end portions 121, 122 are pulled toward one another. As a result, in the first portion of this shifting travel, the play of motion of the baking tong 97 and the clamping device 125 is eliminated. In the ensuing portion of this shifting travel, the elastically expandable clamping element 129 is elastically expanded. This shifting travel does not end until as a result of the elastic expansion of the elastically expandable clamping element 129, a predetermined prestressing force that prevents the spacer bolts 123, 124 from lifting away from one another during the baking process is exerted upon the two tong parts 116, 118.

FIGS. 31 and 32 show two closed baking tongs 97 with clamping devices 125, in which one elastically expandable clamping element 129, rigidly connected to the upper end portion 121, protrudes downward past the lower end portion 121 and is brought into engagement on the back side of the lower end portion 121 with a movable clamping element 126, which is clamped in place between the portion of the elastically expandable clamping element 129 that protrudes past the lower end portion 121 and the lower end portion 121 itself.

The elastically expandable clamping element 129 is embodied as an elongated journal that tapers longitudinally, protrudes downward past the front end of the upper end portion 122, and has a head part 130 that is spaced apart from the upper end portion 122. The cylindrical securing portion 131 disposed on the upper end of the journal-like clamping element 129 is inserted into a bore 132 of the upper end portion 122 and is connected to it in a manner fixed against relative rotation, or nonrotatably. The securing portion 131 is adjoined by an elastically expandable portion 133 that tapers conically toward the bottom and that on its tapered end merges with the head portion 30. The head portion 130 includes a transverse channel 134, which is parallel to the main mold parting plane of the baking mold 98 and perpendicular to the travel direction 101 of the baking tong 97, and which formed an eyelet in the head part 130 into which the clamping portion 127 of the movable clamping element 126 can be introduced. The clamping face 128 of the elastically expandable clamping element 129 is embodied in the transverse channel 134, on its channel wall toward the front end of the upper end portion 122.

Upon closure of the baking tong 97, the upper tong part 118 is pivoted counter to the lower tong part 116 until the spacer bolts 124 of the upper end portion 122 rest on the spacer bolts 123 of the lower end portion 121. During this pivoting motion, the elastically expandable clamping element 129, with its head part 130 at the front end of the lower end portion 121, plunges into a recess 135 in the lower end portion 121. Once the tong parts 116, 118 rest on one another with their spacer bolts 123, 124, the elastically expandable clamping element 129 protrudes with its head part 130 out of the recess 135 at the back side of the lower end portion 121. For tightening the clamping device 125, the clamping portion 127 of the movable clamping element 126 is moved in the direction of the arrow 136 along the back side of the lower end portion 121 and is tightened both on the upper tong part 118 and on the lower tong part 116. The clamping portion 127 is first pushed through the transverse conduit 134 of the head part 130 and then is clamped firmly between the head part 130 and the back side surrounding the recess 135, of the lower end portion 121.

The movable clamping element 126 is embodied as a single-armed lever, which extends on the back side of the lower end portion 121 substantially parallel to the travel direction 101 of the baking tong 97. The lever 126 is pivotally supported crosswise to the travel direction 101 of the baking tong 97 on a pivot axis 137 that is perpendicular to the main mold parting plane of the baking mold 98. The free end 138 of the lever 126, opposite from the pivot axis 137, is embodied as hooklike and is provided with a hook portion 139, protruding freely in the tightening direction 136 and curved in an arc, which is embodied as a clamping portion 127. The hook portion 139 tapers in wedgelike fashion to a free end 140 that points frontward in the tightening direction 136.

The hook portion 139, on its inner side face 139a toward the back side of the lower end portion 121, is provided with a clamping face that is associated with the clamping faces 141, 142 (FIG. 32) that are disposed on the back side, surrounding the recess 135, of the lower end portion 121. On the outer side face 139, remote from the lower end portion 121, of the hook portion 139, a clamping face is formed, with which the clamping face 128, disposed in the transverse conduit 134 of the head part 130, of the elastically expandable clamping element 129 is associated.

For actuating the lever 126, this lever is provided with an actuating roller 143 mounted between its free end 138 and its pivot axis 137. Also for actuating the lever 126, a spiral spring 144 engaging the lever 126 and the lower end portion 121 is provided, which is disposed behind the lever 126 counter to the tightening direction 136 and acts upon the lever 126 in the tightening direction 136. The spiral spring 144 is supported on the lever 126 in an abutment 145 disposed between the free end 138 of the lever and its pivot axis 137. On the lower end portion 121, the spiral spring 144 is supported in an abutment 146 which is laterally offset from the pivot axis 137 crosswise to the travel direction 101.

The movable clamping element 127, embodied as a one-armed lever, can be pivoted about the pivot axis 137 between a position of repose, an uncovering position (FIG. 37) and a work position (FIGS. 34, 35, 36), with the aid of both the actuating roller 143 and the spiral spring 144. In the position of repose, the movable clamping element 126 protrudes by its clamping portion 127 past the recess 134, and the spiral spring 144 is relaxed.

In the front head 99, a first actuating device 147 for actuating the clamping devices 125 of the baking tongs 97 is located after the pouring station 114 in the travel direction 101. Each baking tong 97 moving past the first actuating device 147 comes into engagement, by the actuating roller 143 of the movable clamping element 126 of its clamping device 125, with the first actuating device 147. By this engagement, the movable clamping element 126 is pivoted counter to the tightening direction 136 out of its position of repose into its uncovering position (FIG. 37), as a result of which the spiral spring 144 is tensed and the recess 135 is uncovered for the passage through it of the elastically expandable clamping element 129.

From the uncovering position, the clamping element 126 is pivoted in the tightening direction 136 by the tensed spiral spring 144 until it reaches the work position (FIGS. 34, 35, 36), and the clamping device 125 is tightened. In this process, the clamping face provided on the inner side face 139a of the hook portion 139 is displaced in the tightening direction 136 along the clamping faces 141, 142 surrounding the recess 135 and located on the back side of the lower end portion 121. In addition, the clamping face provided on the outer side face 139b of the hook portion 139 is moved in the tightening direction 136 along the clamping face 128, located in the transverse conduit 134 of the head part 130, of the elastically expandable clamping element 129. The hook portion 139 is displaced with its clamping faces along the clamping faces 128, 141, 142, respectively associated with its clamping faces, of the lower end portion 121 or the elastically expandable clamping element 129 until the elastic expansion, caused in the elastically expandable clamping element 129 by this displacement, is equivalent to the prestressing force predetermined by the spiral spring 144. The terminal position of the movable clamping element 126 corresponding to a predetermined prestressing force and the pivoting travel to be traversed by this clamping element until their change as the wear of the interengaged clamping faces increases, but these changes do not affect the pressure conditions in the baking mold or the contact pressures operative at the sealing faces of the baking mold or the spacer bolts 123, 124 of the end portions 121, 122.

Figure 36:
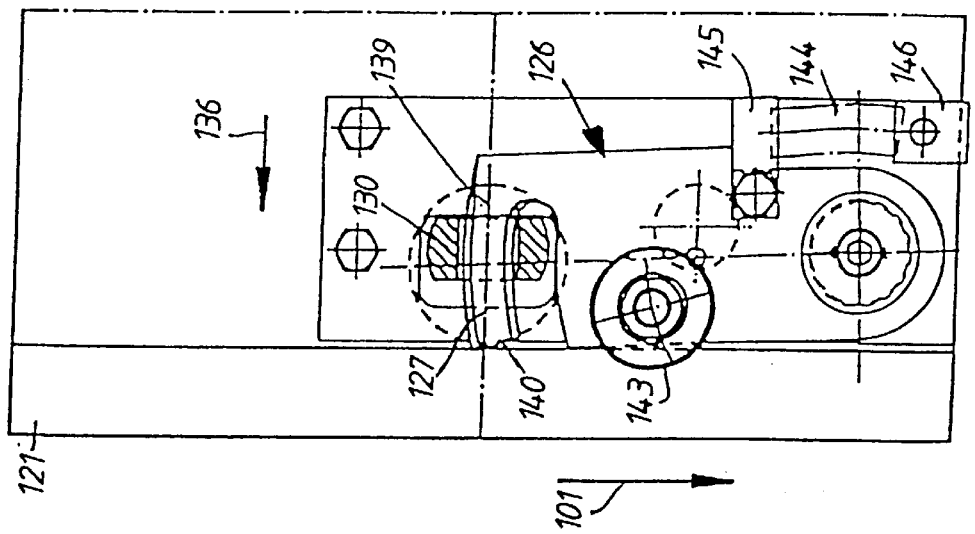
FIG. 36, similarly to FIG. 34, shows a view from below of the lower end portion of the baking tong with the clamping device tightened in a condition of greater wear.
Figure 35:
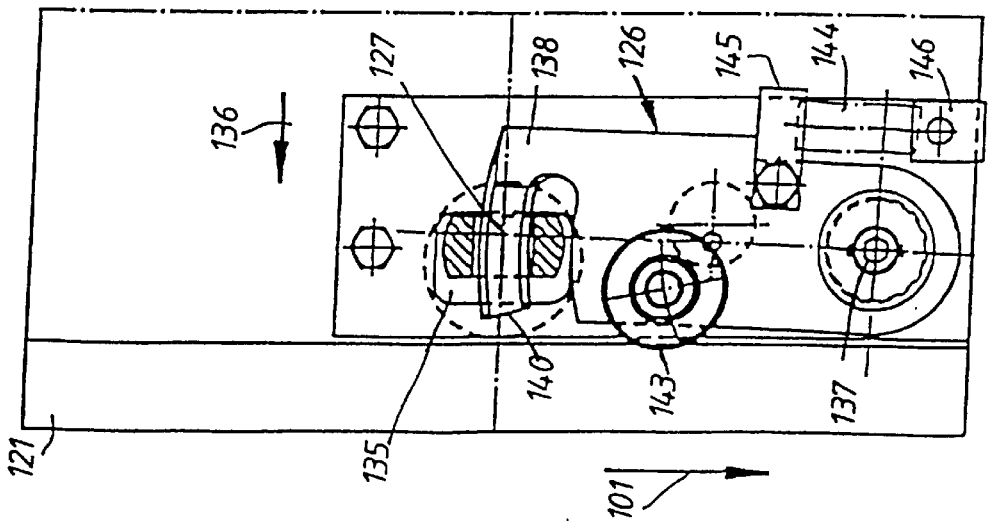
FIG. 35, similarly to FIG. 34, shows a view from below of the lower end portion of the baking tong, with the clamping device tightened while wear has not yet occurred.

In FIGS. 34–36, various terminal positions of the movable clamping element 126, moved to its work position by the spiral spring 144 with the same spring force, are shown. These terminal positions correspond to different amounts of wear on the interengaged clamping faces 138, 139a, 139b, 141, 142. The respective degree of wear can be seen from the depth to which the hook portion 139 of the movable clamping element 126 protrudes into the transverse conduit 134 of the head part 130 of the elastically expandable clamping element 129, or how far the hook portion 139 with its free end 140 protrudes laterally past the head part 130. FIG. 34 shows the work position of the movable clamping element 126 with medium wear, FIG. 35 shows it still without wear, and FIG. 36 shows it with major wear. In the work position of the movable clamping element 126, the elastically expandable clamping element 129 is elastically expanded and exerts a predetermined prestressing force on the two tong parts 116, 118. The magnitude of the expansion, creating this prestressing force, of the clamping element 129 is determined by the spiral spring 144 of the clamping device 125 acting on the elastically expandable clamping element 126 and is quasi-frozen in by the movable clamping element 126 tightened into its work position and is fixed by the self-inhibiting frictional engagement of the pressed-together clamping faces.

In the front head 99, a second actuating device 148 for actuating the clamping devices 125 of the baking tongs 97 precedes the discharge station 113. Each baking tong 97 moving past the second actuating device 148 comes into engagement, by the actuating roller 143 of the movable clamping element 126 of its clamping device 125, with the second actuating device 148. By this engagement, the movable clamping element 126 is pivoted counter to the tightening direction 136 out of its work position into its uncovering position (FIG. 37), and as a result the clamping device 125 is released, and the recess 135 is uncovered so that the elastically expandable clamping element 129 can be pulled out.

Upon the release of the clamping device 125, the clamping element 126 is moved counter to the action of the spiral spring 144, and the tension of this spring is increased. In this process, the clamping face provided on the inner side face 139a of the hook portion 139 is displaced counter to the tightening direction 136 along the clamping faces 141, 142 that surround the recess 135 and are disposed on the back side of the lower end portion 121. In addition, the clamping face provided on the outer side face 139b of the hook portion 139 is displaced counter to the tightening direction 136 along the clamping face 128, located in the transverse conduit 134 of the head part 130, of the elastically expandable clamping element 129.

The clamping element 126 is held in its uncovering position by the second actuating device 148 until the elastically expandable clamping element 129 has been pulled out of the recess 135 by the opening or hinging open of the baking tong 97. Not until then is the actuating roller 143 released by the second actuating device 148 and the clamping element 126 is pivoted back into its position of repose by the spiral spring 144.

Figure 37:
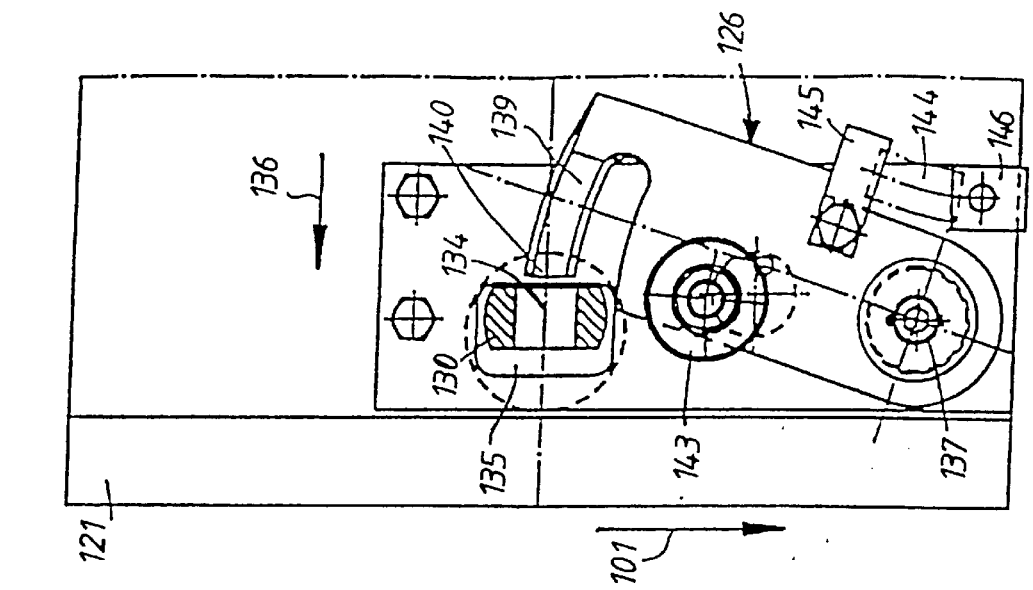
FIG. 37, similarly to FIG. 34, shows a view from below of the lower end portion of the closed baking tong, in which the movable clamping element is not yet in engagement with the elastically expandable clamping element.

In the baking tongs 97 of FIGS. 31, 37, the motion of the movable clamping element 126 inside the clamping device 125 that is required to generate the elastic expansion of the elastically expandable clamping element 129 is generated by the spiral spring 144 that acts on the elastically expandable clamping element 126. This motion of the movable clamping element 126 can also be generated outside the clamping device 125 and inside the first actuating device 147, while transmits this motion to the movable clamping element 126 of the clamping device 125 of a baking tong 97 as it passes the first actuating device 147. If this kind of first actuating device 147 is used, then the spiral spring 144 together with its abutments 145, 146 can be omitted from the clamping devices 125 of the baking tongs 97.

Figure 40:
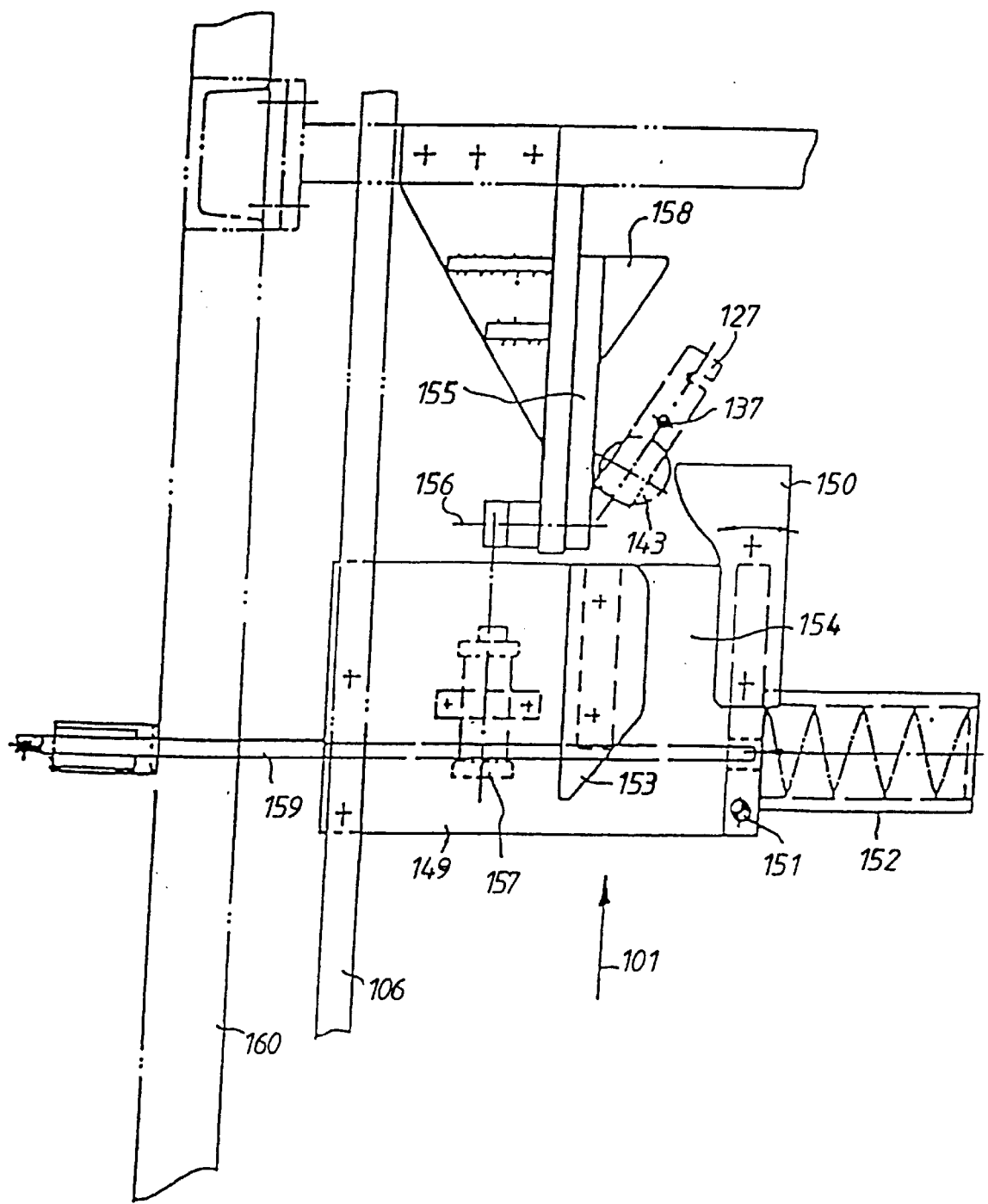
FIG. 40 shows the actuating device of FIG. 38 from above.

FIGS. 39–40 show a first actuating device 147, associated with the upper transport plane 104 of the oven 95, for baking tongs 97 from whose clamping devices 125 the spiral springs 144 together with their abutments 145, 146 have been omitted. This actuating device 147 has a plate 149, secured to the underside of the rail 106 and parallel to the upper transport plane 104, on whose top side a camlike closing element 150 is supported pivotally about a pivot axis 151 that is perpendicular to the upper transport plane 104. The closing element 150 is prestressed into its work position by a compression spring 152. A runup element 153 is also secured to the top side of the plate 149; it is located opposite the closing element 150, crosswise to the travel direction 101, and precedes it counter to the travel direction 101. The closing element 150 and the runup element 153 define a guide channel 154, extending substantially in the travel direction 101, for the actuating roller 143 of the movable clamping elements 126.

When a baking tong 96 passes this actuating device 147, the movable clamping element 126 of the clamping device 125, with its control roller 143, initially runs up onto the runup element 153 and then continues along the runup element 153. As a result, the movable clamping element 126 is first pivoted crosswise to the travel direction 101 into its uncovering position and is then retained in this uncovering position. Next, the movable clamping element 126 with its control roller 143 strikes the closing element 150 and is pivoted thereby, crosswise to the travel direction 101, into its work position. The movable clamping element 126 is pivoted in the tightening direction 136 as far as its work position in this process, and at the same time the closing element 150 is positively displaced out of its outset position counter to the tightening direction 136.

The compression spring 152 generates the motion of the movable clamping element 126 that is required to generate the elastic expansion of the elastically expandable clamping element 129. The compression spring 152 moves the movable clamping element 126 with the same spring force along the clamping faces of the clamping device 125, until it is blocked in its work position by the elastically expandable clamping element 129. At the same time, a displacement distance traversed by the closing element 150 inside the first actuating device 147 corresponds to the pivoting travel traversed by the movable clamping element 126 inside the clamping device 125. During the operation of the oven 95, the wear of the clamping faces of the clamping device 125 of a baking tong 97 increases, and the displacement travel traversed in each case by the closing element 150 as the clamping device 125 of this baking tong 97 is tightened decreases.

In the event of a malfunction of the oven 97 that leads to premature blockage of the pivoting travel of the clamping element 126 as the clamping device 125 of a baking tong 97 is tightened, then the positive displacement travel of the closing element 150 of the first actuating device 147 is increased disproportionately.

The actuating device 147 has a bell crank 155, which is supported pivotally in the frame of the oven 95 crosswise to the travel direction 101 about a pivot axis 156 perpendicular to the upper transport plane 104, and which can be pivoted out of its position of repose into its work position by means of an actuating cylinder 157. The ball crank 155 has an opening element 158, which in the work position of the bell crank 155 protrudes into the path of the control rollers 143 of the clamping elements 126 and pivots the clamping element 126 back again into its uncovering position when its control roller 143 runs along the opening element 158. The closing element 150 is connected to a switching rod 159, which leads to a switch 161, secured to the outside of the side wall 160 of the oven 95, that is connected to the actuating cylinder 157 engaging one arm of the bell crank 155. This switch is not actuated until the positive displacement travel traversed by the closing element 150 when a clamping device 125 is tightened exceeds a predetermined magnitude.

In the case of the elastically expandable clamping element 129 protruding from the front end of one of the end portions 121, 122 of the tong parts 116, 118, the clamping face 128 oriented toward the respective end portion 121, 122 and intended for engagement with the clamping portion 127 of the movable clamping element 126 may also be disposed in a laterally open slit in the hooklike head part 130 of the elastically expandable clamping element 129, or on the back side, oriented toward the respective end portion 121, 122, of the hammerhead-like head part 130 of the elastically expandable clamping element 129.

The movable clamping element 126 may also be embodied as a stiff hook, which is pivotally supported on one of the end portions 121, 122 of the tong parts 116, 118 about a pivot axis parallel to the main mold parting plane of the baking mold 98 and can be pivoted about this pivot axis between a position of repose, an uncovering position, and a work position. The movable clamping element 126 may also be embodied as a rigid pusher, which is supported displaceably on one of the end portions 121, 122 of the tong parts 116, 118 parallel to the main mold parting plane of the baking mold 98 and can be displaced along a rectilinear or curved path between a position of repose, an uncovering position, and a work position.

The present invention also includes baking tongs 97 whose clamping devices 125 are equipped for pressing together the mold halves 119, 120, 120a or tong parts 113, 118 of the closed baking mold 98 or baking tong 97 with the embodiments most recently described above of the movable clamping element 126 or the elastically expandable clamping element 129. In these baking tongs 97 as well, spiral springs or compression springs may be disposed inside the respective clamping device 125, which generate the motion of the movable clamping element 126 that is required to generate the elastic expansion of the elastically expandable clamping element 129. As an alternative to this, the spiral spring or compression spring which generates the motion of the movable clamping element 126 for generating the elastic expansion of the elastically expandable clamping element 129 may also be disposed in the first actuating device 147 for actuating the clamping devices 125.

The mutually associated clamping faces 139 and 141, 142 and 139b and 128 are each inclined at angles differing slightly from one another relative to the main mold parting plane of the baking mold 98, and when the clamping device 127 is tightened they form a gap that narrows in the tightening direction 136. The mutual position and mutual course of the clamping faces 139 and 141, 142 and 139b and 128 depends on the material selected for a force- locking and self-inhibiting frictional engagement between these clamping faces 139 and 141, 142 and 139b and 128 and must at best be ascertained experimentally. The opening angle of this gap is less than the static friction angle of the pair of materials that has been selected for the two clamping faces 139 and 141, 142 and 139b and 128 for a force-locking and self-inhibiting frictional engagement between them. The opening angle of this gap, in a preferred exemplary embodiment for the paired materials of hard metal and hard metal, is 6.

With the baking tong 97 closed, the self-supporting tong parts 116, 118 take on the internal pressures that occur in the respective baking mold 98 during the baking process and transmit them to the joint 117 adjacent to one side edge of the baking tong 97 and to the clamping device 125 disposed on the opposite side edge of the baking tong 97 and tightened there. The joint 117 and the tightened clamping device act counter to the internal pressures that act in the opening direction of the baking tong 97 and keep the baking tong 97 closed. The mold halves 119, 120, 120a of the baking molds 98 may already be integrated with the self-supporting tong parts 116, 118, or else they are embodied as mold halves that are removable from the self-supporting tong parts and that themselves, without being supported on the self-supporting tong parts, do not withstand the internal pressures occurring during the baking process. The baking molds integrated or built into the self-supporting tong parts may be flat baking slabs, or baking molds comprising a female die and male die for relatively low cups, deep cups, cones or the like.

1 oven
2 baking chamber of the oven 1
3 front head of the oven 1
4 pouring station of the oven 1
4a pouring device of the oven 1
5 discharge station of the oven 1
6 baking tong chain of the oven 1
7 baking tongs of the oven 1
8 travel direction of the baking tongs 7 in the oven 1
9 upper transport plane of the baking tong chain 6 of the oven 1
10 lower transport plane of the baking tong chain 6
11 front turning point of the baking tong chain 6 11a
11a a center axis 11
11b front chain wheels for the transport chains 23, 24
12 rear turning point of the baking tong chain 6
12a middle axis of 12
12b rear chain wheels for the transport chains 23, 24
13 lower tong part of the baking tong 7
13a main portion of the lower tong part 13
13b lower guide head
13c front transverse wall 13a
13d rear transverse wall 13a
13e side wall of 13a at the free end
13f side wall of 13a at the guide sword 14
13g axle bolt of the bearing arm 32a of a baking mold carrier 32 of the front lower baking mold part 21
13h axle bolt of the bearing arm 33a of a baking mole carrier 32 of the rear lower baking mold part 22
13i stop face on the stop block m, turned away from the second mold parting plane, pointing in travel direction 8, for the stop face 32b which is parallel to the second mold parting plane on a baking mold carrier 32 of the front lower baking mold part
13k stop face on the stop block m, turned way from the second mold parting plane, pointing backwards in travel direction 8, for the stop face 33b which is parallel to the second mold parting plane on a baking mold carrier 33 of the rear lower backing mold part 22
13m stop block on the front or rear transverse wall 13c or 13d of 13a
14 guide sword of the baking tong 7
14a longitudinal center plane of the guide sword 14
14b central plane of the guide sword 14
14c front, inner guide face
14d front, outer guide face
14e rear, inner guide face
14f rear, outer guide face
15 upper tong part of the baking tong 7
15a main portion
15b
15c inner end region of 15a, following 15b, at the guide sword 14 of the baking tong 7
15d free end of 15a
15e inner control face on the end region 15c of 15a, for the inner control strap 26a of the movement mechanism 26

15f outer control face on the free end 15d of 15a for the outer control strap 26b of the movement mechanism 26
16 baking mold
17 upper mold half of the baking mold 16
17a sealing faces of 17 at the upper end 19b of 19 facing the main mold parting plane
18 lower mold half of the baking mold 16
18a sealing faces of 18 on the upper, free end 20a of 20 facing the main mold parting plane
19 mold cores of the female die, upper mold half 17
19a free ends of the mold cores 19
19b upper ends of the mold cores 19
20 mold recesses of the male die, or lower mold half 18
20a free ends of the mold recesses 20
21 front lower baking mold part of the baking mold 16
21a sealing faces of 21 for the second mold parting plane
21b front, upper, outer, curved clamping face of 21
21c lower, outer, curved clamping face of 21
21d hard metal insert of 21 for 21b
21e hard metal insert of 21 for 21c
22 rear lower baking mold part of the baking mold 16
22a sealing face of 22 for the second mold parting plane
22b rear, upper, outer, curved clamping face of 22
22c hard metal insert of 22 for 22b
22d curve radius of 22b
22e curve radius of 22b
23 transport chain, at the free end of the baking tong 7
23a chain straps of 23
24 transport chain, at the guide sword 14
24a chain straps of 24
25 baked, cone- or cup-shaped molded article
26 movement mechanism for the lower baking mold parts 21, 22
26a inner control strap at the inner end region 15c of 15a
26b outer control strap at the free ends 15d of 15a
26c inner thrust rod for inner control strap 26a
26d outer thrust rod for outer control strap 26b
26e stationary control rails of the oven 1 for the thrust rods 26c, 26d of the control straps 26a, 26b
27 guide rails for the control rollers 28 of the upper tong part 15
28 control rollers of the upper tong part 15 of the baking tong 7
29 running wheels of the baking tong chain 6
30 upper clamping device
31 lower clamping device
32 baking mold carrier of the front lower baking mold part 21
32a bearing arm of 32
32b stop face of 32 for the stop face 13i of 13m on the front or rear transverse wall 13c or 13d of 13a parallel to the second mold parting plane
32c control bolt of 32 parallel to the second mold parting plane in the guide channel 40 of a control strap 26a, 26b of the movement mechanism
33 baking mold carrier of the rear lower baking mold parts
33a bearing arm of 33
33b control bolt of 33 parallel to the second mold parting plane for the stop face 13k of 13m on the front or rear transverse wall 13b or 13d of 13a
33c
34 opening of the lower guide head 13b for the guide sword 14
34a longitudinal center plane of the opening 34
34b transverse center plane of the opening 34
35 upper plane of the opening 34
35a front roller body
35b rear roller body
36 lower plane of the opening 34
36a front roller body
36b rear roller body
37 upper guide roller in the opening 34
37a front inner guide roller
37b front outer guide roller
37c rear inner guide roller
37d rear outer guide roller
38 lower guide roller in the opening 34
38a front inner guide roller
38b front outer guide roller
38c rear inner guide roller
38d rear outer guide roller
39 cup springs
40 guide channel of a control strap 26a, 26b of the movement mechanism
40a front stop face facing backwards contrary to the travel direction 8 in the guide channel 40 for the control bolt 32c of a baking mold carrier 32 of the front lower baking mold part
40b upper side wall (without step) of 40
40c lower side wall of 40 with step and with rear stop face 40d pointing in travel direction 8 for the control bolt 32c of a baking mold carrier 32 of the front lower baking mold part
40d rear stop face in the guide channel 40 pointing in travel direction 8 for the control bold 32c of a baking mold carrier 32 of the front lower baking mold part
41 front, two-armed clamping lever of the upper clamping device 30
41a front, C-shaped clamping lever of 41
41b outer, curved engagement face of the clamping lever 41a for the first front closing roller 45a of the closing station 45
41c clamping portion of the clamping arm 41a
41d flat clamping face of the clamping portion 41c
41e rear actuating arm of 41
41f outer engagement face of 41e for the first, front opening roller 46a of the opening station 46
41g hard metal insert for the flat clamping face 41d of the clamping portion 41c
42 rear, two-armed clamping lever of the upper clamping device 30
42a rear, C-shaped clamping arm of 42
42b outer, curved engagement face of the clamping arm 42a for the second rear closing roller 45b of the closing station 45
42c rear clamping portion of the clamping arm 42a
42d flat clamping face of the clamping portion 42c
42e front actuating arm of 42
42f outer engagement face of 42e for the second, rear closing roller 45b of the closing station 45
42g tightening direction for the rear, two-armed clamping lever 42
42h hard metal insert of 42c for the flat clamping face 42d
42i pivoting radius for the flat clamping face 42d of 42c
43 bearing of the two clamping levers 41, 42 of the upper clamping device 30
44 pivot axis of the two clamping levers 41, 42 of the per clamping device 30
45 closing station for the two clamping levers 41, 42 the upper clamping device 30
45a first, front closing roller for the outer, curved engagement face of the clamping arm 41a of the front, two-armed clamping lever 41 of the upper clamping device 30
45b second, rear closing roller for the outer curved engagement face of the clamping arm 42a of the rear, two-armed clamping lever 42 of the upper clamping device 30

46 opening station
46a first, front opening roller for the outer engagement face of the rear actuating arm 41e of the front, two-armed clamping lever 41 of the upper clamping device 30
46b second, rear opening roller for the outer engagement face 42f of the front actuating arm 42e of the rear, two-armed clamping lever 42 of the upper clamping device 30
47 lower clamping lever of the lower clamping device 31
47a lower, C-shaped clamping arm of 47
47b outer, curved engagement face of 47a for the closing roller 50a of the further closing station 50
47c clamping portion of the clamping arm 47a
47d flat clamping face of the clamping portion 47c of the clamping arm 47a
47e rear actuating arm of 47
47f outer engagement of 47e for the opening roller 51a of the further opening station 51
48 bearing of the lower clamping arm 47 of the lower clamping device 31 on the rear lower baking mold part 22
49 pivot axis of the lower clamping arm 47 in the
50 further closing stations
50a closing roller
51 further opening stations
51a opening roller of 51
52 interstice for guide baffle 53
53 guide baffle
53a beginning of 53
53b end portion of 53
53c inner portion of the end portion 53b, neighboring the path of the guide swords 14 of the baking tongs 7
53d outer portion of the end portion 53b, neighboring the path of the free ends of the baking tongs 7
54 conveyor belt of the discharge station 5
55 blowing station
55a blow pipes of 55
55b blow nozzles of 55a
56 oven
57 baking chamber of 56
58 front head of 56
59 baking tong chain of 56
60 open- and closable baking tongs of the baking tong chain 59
61 travel direction of the baking tongs 60 or the baking tong chain 59 in the oven 56
62 upper transport plane in the oven 56
63 discharge station of 56
64 pouring station of 56
64a stationary pouring station of 64
65 lower transport plane in the oven 56
66 front turning point of the baking tong chain 59 in the oven 56
67 rear turning point of the baking tong 59 in the oven 56
68 upper tong part of the baking tong 60
68a upper hinge portion of 68 or 69
68b upper end portion of 68
68c upper, front spacer bolt on the upper end portion 68b of 68
68d upper, rear spacer bolt on the upper end portion 68b of 68
68e outer, curved clamping face on the upper end portion 68b of 68
69 joint of the baking tong 60
70 lower tong part of the baking tong 60
70a lower end portion of 68 or 69
70b lower end portion of 70
70c lower, front spacer bolt on the lower end portion 70b of 70
70d lower, rear spacer bolt on the lower end portion 70b of 70
70e outer, curved clamping face on the lower end portion 70b of 70
71 baking mold of the baking tong 60
72 upper mold half of 71
72a upper baking slab of 72
72b front, upper closure strip of 72
72c rear, upper closure strip of 72
72d upper reinforcement webs of 72
73 lower mold half of 71
73a lower baking slab of 73
73b inner, lower closure strip of 73
73c outer, lower closure strip of 73
73d lower reinforcement webs of 73
74 control rollers
75 transport chain in the joint 69 of the baking tong 60
75a chain strap of 75
76 transport chain on the free end of the baking tong 60
76a chain strap of 76
77 running wheels of the baking tong chain 59
78 rails of the oven 56
79 clamping device for the baking tong 60, first embodiment
80 C-shaped clamp of the claming device 79
81 upper clamping portion of the clamp 80
81a upper, flat clamping face of the clamp 80
82 lower clamping portion of the clamp 80
82a lower, flat clamping portion of the clamp 80
83 clamping device for the baking tong 60, second embodiment
84 lateral extension of the upper end portion 68b of the upper tong part 68 of the baking tong 60
84a outer, curved clamping face of 84
85 two-armed clamping lever of the clamping device 83
85a front, C-shaped clamping arm of 85
85b clamping portion of the clamping arm 85a
85c flat clamping face of the clamping portion 85b of the clamping arm 85a
85d first actuating journal of 85 for loosening the two-armed clamping lever 85 of the clamping device 83
85e rear actuating arm of 85
85f second actuating journal of 85 for tightening the two-armed clamping lever 85 of the clamping device 83
86 axle bolt at the lower end portion 70b of the lower tong part 70 of the baking tong 60 for the two-armed clamping lever 85 of the clamping device 83
87 pivot axis of the axle bolt 86 on the lower end portion 70b of the lower tong part 70 of the baking tong 60 for the two-armed clamping lever 85 of the clamping device 83
88 pivot axis device of the two-armed clamping lever 85 of the clamping device 83
89 front clamping device for the baking tong 60 attached on the baking mold 71
90 rear clamping device for the baking tong 60 attached on the baking mold 71
91 rear extension of the upper mold half 72 of the baking mold 71 of the baking tong 60
91a outer, curved clamping face of 91
92 clamping lever of the rear clamping device 90 for the baking mold 71 of the baking tong 60
92a clamping arm of 92
92b clamping portion of the clamping arm 92a
92c flat clamping face of the clamping portion 92b of 92a
92d actuating arm of 92
92e actuating roller of 92
93 pivot axis on the lower mold half 72 of the baking mold 71 of the baking tong 60 for the clamping lever 92 of the rear clamping device 90

94 tightening direction of the clamping lever 92 of the rear clamping device 90
95 oven
96 baking tong chain of 95
97 baking tong of 95
98 baking mold in 97
99 front head of 95
100 baking chamber of 95
101 arrow of the baking tongs 97 in the oven 95
102 left transport chain of 96
102a chain straps
103 right transport chain of 96
103a chain straps
104 upper transport plane of 95
105 lower transport plane of 95
106 left rail of the upper transport plane 104
107 right rail of the upper transport plane 104
108 left running wheels of 96
109 right running wheels of 96
110 front turning point of 96
111 rear turning point of 96
112 controller on the upper tong part 118
113 pouring station of 95
114 discharge station
115 rod linkage in the front head 99
116 lower tong part of 97
117 link of 97
118 upper tong part of 97
119 lower mold half of 98
120 upper mold half of 98
120a female die as part of the upper mold half 120
121 lower end portion of 97
122 upper end portion of 97
123 lower spacer bolts of 97
124 upper spacer bolts of 97
125 clamping device of 97
126 movable clamping element of 125
127 clamping portion of 126
128 clamping face of 129
129 elastically expandable clamping element of 125
130 head part of 129
131 securing portion of 129
132 bore for 131 in 122
133 elastically expandable portion of 129
134 recess in 130
135 recess in 121 for 129
136 tightening direction of 127
137 pivot axis of 126
138 free end of 126
139 hook portion of 126
139a inner clamping faces of 139 with clamping portion
139b outer clamping faces of 139 with clamping
140 free end of 139
141 clamping face on the back side of 121
142 clamping face on the back side of 121
143 actuating roller of 125 for 126
144 spiral spring of 125 for 126
145 abutment of 144 on 126
146 abutment of 144 on 121
147 first actuating device for 125, after 114
148 second actuating device for 125, before 113
149 plate on the bottom side of 106
150 closing element
151 pivot axis of 150
152 compression spring
153 runup element
154 guide channel
155 bell crank
156 pivot axis of 155
157 actuating cylinder for 155
158 opening element
159 switching rod
160 side wall of 95
161 switch

We claim:

1. A baking tong assembly for producing thin-walled molded articles from compositions that expand during a baking process, comprising:
a baking mold having an upper mold half and a lower mold half separated from said upper mold half by a main mold parting plane and defining therewith a baking cavity for molding and baking thin-walled molded articles therein;
a baking tong having a lower tong part receiving said lower mold half and an upper tong part receiving said upper mold half, said upper tong part being movable relative to said lower tong part for selectively opening and closing said baking mold;
a clamping device for clamping said baking mold parts of the closed baking mold by firmly pressing together at least said two mold halves with a predetermined prestressing force; said clamping device including at least one elastically expanding clamping element which is movable when said baking mold is closed, said at least one clamping element being stationarily clampable to said two mold halves for clamping said clamping device and for introducing the prestressing force.

2. The assembly according to claim 1, wherein said upper mold half is a male die and said lower mold half is a female die.

3. The assembly according to claim 1, wherein said clamping device is a substantially C-shaped clamp having free ends formed with clamping portions facing one another, and wherein said clamping device can be placed from outside onto said closed baking mold and removed therefrom, whereby each of said clamping portions is brought into a force-locking and self-inhibiting frictional engagement with a respective outer clamping face on one of said mold halves.

4. The assembly according to claim 1, wherein said clamping device is a substantially C-shaped clamp having free ends formed with clamping portions facing one another, and wherein said clamping device can be placed from outside on said baking tong when the baking mold is closed, and removed therefrom, whereby each of said clamping portions is brought into force-locking and self-inhibiting frictional engagement with a respective outer clamping face formed on a respective said tong part.

5. The assembly according to claim 1, wherein said clamping device is a substantially C-shaped clamp having free ends formed with clamping portions facing one another, and said mold parts or said tong parts being formed with outer clamping faces to be brought into force-locking and self-inhibiting frictional engagement with a respective said clamping portion of said C-shaped clamp, said clamping faces being disposed in mirror symmetry on both sides of said main mold parting plane.

6. The assembly according to claim 1, wherein at least one clamping device is mounted on one of said mold halves for pressing together said mold halves of the closed baking mold, said clamping device being externally actuatable and being firmly clampable to and removable from the other mold half, said clamping device including at least one clamping lever pivotally supported about a pivot axis on one of said mold halves and formed with a clamping portion oriented toward the pivot axis, said clamping portion of said clamping lever, upon pivoting relative to the one mold half, is brought into force-locking and self-inhibiting frictional engagement with an outer clamping face formed on the other mold half, and, after the force-locking and self-inhibiting frictional engagement has been established, said clamping lever is further pivotable relative to said mold halves for eliminating the play of motion and moreover until a prestressing force is brought to bear by an elastic expansion of said clamping element.

7. The assembly according to claim 6, wherein said clamping lever is one of two clamping levers pivotally supported on the one mold half about a common pivot axis, and wherein and the other mold half is formed with two outer, mutually spaced-apart clamping faces, with which clamping faces the clamping portions of the clamping levers can each be brought into a force-locking and self-inhibiting frictional engagement.

8. The assembly according to claim 6, wherein said pivot axis of said clamping lever and said outer clamping are disposed substantially symmetrically to the main mold parting plane.

9. The assembly according to claim 1, wherein said clamping device for pressing together said mold halves of the closed baking mold is mounted on one of said tong parts and is externally actuatable and can be firmly clamped to and unclamped from the other of said tong parts, said clamping device including at least one clamping lever pivotally supported about a pivot axis on the one tong part and formed with a clamping portion oriented toward the pivot axis, said clamping portion, upon pivoting of said clamping lever relative to the one tong part, is brought into the force-locking and self-inhibiting frictional engagement with an outer clamping face formed on the other tong part, and said clamping lever, after the force-locking and self-inhibiting frictional engagement has been established, is pivotable relative to said tong parts for eliminating the play of motion and moreover until a prestressing force is brought to bear by an elastic expansion of said clamping lever.

10. The assembly according to claim 9, wherein said clamping lever is one of two clamping levers pivotally supported on said one tong part about said pivot axis and the outer clamping face is one of two mutually spaced-apart, outer clamping faces formed on the other tong part, whereby each of said clamping faces can be brought into a force-locking and self-inhibiting frictional engagement with a respective clamping portion of said clamping levers.

11. The assembly according to claim 10, wherein said pivot axis of said clamping lever and said outer clamping face are disposed substantially symmetrically to the main mold parting plane.

12. The assembly according to claim 1, wherein said lower mold half is a two-piece female die being divisible along a second mold parting plane perpendicular to said main mold parting plane into two lower baking mold parts, and at least one of said lower baking mold parts is movably received in said lower tong part; and including at least one lower clamping device for clamping together the two lower baking mold parts resting on one another when the female die is closed with their sealing faces oriented toward the second mold parting plane, whereby said lower clamping device is firmly clampable to both said lower baking mold parts for eliminating the play of motion and to exert a predetermined prestressing force pressing said two lower baking mold parts against one another.

13. The assembly according to claim 12, wherein said lower clamping device includes at least one substantially C-shaped clamp having free ends formed with clamping portions facing one another, and each of said lower baking mold parts is formed with an outer clamping face which comes into a force-locking and self-inhibiting frictional engagement with a respective one of said clamping portions, whereby said clamp is displaceable with its clamping portions in force-locking and self-inhibiting frictional engagement with the respective outer clamping face until the play of motion is eliminated and moreover until a prestressing force is brought to bear by an elastic expansion of the clamp.

14. The assembly according to claim 13, wherein said outer clamping faces are disposed mirror symmetrically relative to said second mold parting plane.

15. The assembly according to claim 1, wherein said lower mold half is a two-piece female die being divisible along a second mold parting plane perpendicular to said main mold parting plane into two lower baking mold parts, and at least one of said lower baking mold parts is movably received in said lower tong part; and including at least one externally actuatable lower clamping device mounted on one of the lower baking mold parts for pressing together said two lower baking mold parts resting on one another when said female die is closed with their sealing faces oriented toward said second mold parting plane, wherein said lower clamping device is firmly clampable to the other of said lower baking mold parts for eliminating the play of motion and to exert a predetermined prestressing force pressing said two lower baking mold parts against one another.

16. The assembly according to claim 15, wherein said lower clamping device includes at least one clamping lever pivotally supported about a pivot axis on one of said lower baking mold parts and formed with a clamping portion facing towards said pivot axis, and including an outer clamping face formed on the other of said lower baking mold parts, whereby said clamping portion of said clamping lever, upon pivoting relative to the one lower baking mold part, comes into force-locking and self-inhibiting frictional engagement with said outer clamping face, and said clamping lever, from its position in which said clamping portion is force-lockingly and frictionally engaged with said clamping face, being pivotable relative to said two lower baking mold parts until the play of motion is eliminated and moreover until a prestressing force is brought to bear by an elastic expansion of said clamping lever.

17. The assembly according to claim 16, wherein said pivot axis of said clamping lever and said outer clamping face of said lower clamping device are disposed substantially symmetrically relative to said second mold parting plane.

18. A baking tong assembly for producing thin-walled molded articles from compositions that expand during a baking process, comprising:
   a baking tong and a baking mold received in said baking tong, said baking mold having an upper mold half embodied as a male die and a lower mold half embodied as a female die and separated from said upper mold half by a main mold parting plane, said baking mold defining therein at least one baking cavity for molding and baking thin-walled molded articles;
   said baking tong having a lower tong part receiving said lower mold half and an upper tong part receiving said upper mold half, said upper tong part being movably disposed relative to said lower tong part for selectively opening and closing said baking mold;
   said lower mold half defining a second mold parting plane, perpendicular to said main mold parting plane, along which said lower mold half divides into two lower baking mold parts each having a sealing face oriented toward said second mold parting plane and being in mutual contact when said female die is closed, and said two mold halves and/or said two tong parts having one of stops and sealing faces which are in mutual contact when said baking mold is closed;

a clamping device for pressing together said mold halves and said lower baking mold parts of the closed baking mold, said clamping device being mounted on one of said upper mold half and said upper tong part and being externally actuatable for firmly clamping to said two lower baking mold parts and eliminating play of motion and exerting a predetermined prestressing force that presses together the two mold halves and the two lower baking mold parts; and said clamping device including at least two clamping levers pivotally supported about respective pivot axes on one of said upper mold half and said upper tong part, each of said clamping levers being provided with clamping portions oriented toward their pivot axes, said clamping portions coming into force-locking and self-inhibiting frictional engagement with a respective outer clamping face formed on said lower baking mold parts, wherein said clamping levers, with their clamping portions in the force-locking and self-inhibiting frictional engagement with the outer clamping face, are further pivotable until the play of motion is eliminated and, further, until a prestressing force is brought to bear by an elastic expansion of said clamping levers.

19. The assembly according to claim 18, wherein said two clamping levers are pivotable about a common pivot axis, said outer clamping faces of said clamping device on one of the lower baking mold parts being disposed substantially in mirror symmetry relative to said second mold parting plane, said common pivot axis and said outer clamping faces defining an isosceles triangle that is substantially symmetrical relative to said second mold parting plane.

20. The assembly according to claim 19, which further comprises at least one externally actuatable lower clamping device which, while said female die is closed, can be removably placed on the two lower baking mold parts, said lower clamping device being firmly clampable to said other lower baking mold part for eliminating the play of motion and to exert a predetermined prestressing force that presses the two lower baking mold parts against one another.

21. The assembly according to claim 20, wherein said lower clamping device includes at least one substantially C-shaped clamp having free ends formed with clamping portions facing towards one another and which each can be brought into the force-locking and self-inhibiting frictional engagement with a respective outer clamping face on a lower baking mold part, said clamp, with its clamping portions in force-locking and self-inhibiting frictional engagement with the respective outer clamping face, being displaceable along said clamping face until the play of motion is eliminated and further until the prestressing force is brought to bear by an elastic expansion of said clamp.

22. The assembly according to claim 21, wherein said two outer clamping faces of the clamping device are disposed mirror symmetrically on both sides of said second mold parting plane.

23. The assembly according to claim 19, which further comprises at least one externally actuatable lower clamping device for pressing together said two lower baking mold parts resting on one another when said female die is closed, said lower clamping device being mounted on one of said lower baking mold parts and being firmly clampable to the respectively other lower baking mold part for eliminating the play of motion and for exerting the predetermined prestressing force that presses the two lower baking mold parts against one another.

24. The assembly according to claim 23, wherein said lower clamping device includes at least one clamping lever pivotally supported about a pivot axis on the one lower baking mold part and formed with a clamping portion facing towards the pivot axis, said clamping portion, upon pivoting said clamping lever relative to the one lower baking mold part, can be brought into the force-locking and self-inhibiting frictional engagement with an outer clamping face formed on the other lower baking mold part, and, with the clamping portion in the force-locking and self-inhibiting frictional engagement with the clamping face, said clamping lever being pivotable relative to said two lower baking mold parts until the play of motion is eliminated and further until the prestressing force is brought to bear by an elastic expansion of said clamping lever.

25. The assembly according to claim 24, wherein said pivot axis of said clamping lever and said outer clamping face are disposed substantially symmetrically relative to said second mold parting plane.

26. A baking tong assembly for producing thin-walled molded articles from baking or pouring compositions that expand during the baking process, comprising:

a baking mold having an upper mold half and a lower mold half separated from said upper mold half by a main mold parting plane and defining therewith a baking cavity for molding and baking thin-walled molded articles therein;

a baking tong having a lower tong part receiving said lower mold half and an upper tong part receiving said upper mold half, said upper tong part being movable back and forth relative to said lower tong part for selectively opening and closing said baking mold;

at least one of stops and sealing faces on one of said mold halves and said tong parts, said stops or sealing faces being in mutual contact when said baking mold is closed;

at least one clamping device for pressing together one of said mold halves and said tong parts of the closed baking mold, said at least one clamping device, on being firmly clamped, presses together said two mold halves of the closed baking mold with a predetermined prestressing force and eliminates its own play of motion;

said at least one clamping device including a clamping element which is movable when said baking mold is closed and which is stationarily clampable to said mold halves or to said tong parts; said clamping element being movably supported on said one mold half or said one tong part and, when said baking mold is closed, said clamping element can be brought into engagement with an elastically expandable clamping element of said clamping device which is rigidly connected to the other of said mold halves or the other of said tong parts; said movable clamping element having a clamping portion formed thereon which may be brought into a form-locking and force-locking and self-inhibiting frictional engagement with at least one clamping face formed on said elastically expandable clamping element; and and said movable clamping element, while in force-locking and self-inhibiting frictional engagement with said clamping portion of said elastically expandable clamping element, being displaceable relative to said clamping element until the play of motion is eliminated and, further, until a prestressing force is brought to bear by an elastic expansion of said clamping element.

27. The assembly according to claim 26, which further comprises a clamping device mounted onto two end portions of said mold halves or said tong parts, wherein said elastically expandable clamping element protrudes from a front side of the first end portion and has a head part that, when said baking tong is closed, protrudes beyond a back side of said second end portion, while said movable clamping element is movably supported on the back side of said second end portion and has a clamping portion which is clampable between said head part of said elastically expandable clamping element and the back side of said second end portion; wherein mutually associated clamping faces are provided which can be brought into a force-locking and self-inhibiting frictional engagement with one another on said head part of said elastically expandable clamping element and on the backside of said second end portion and on said clamping portion of said movable clamping element; and wherein said movable clamping element, with its clamping portion in the form-locking and force-locking and self-inhibiting frictional engagement with said clamping faces is movable along the back side of said second end portion until the play of motion is eliminated and, further, until the prestressing force is brought to bear by elastic expansion of said elastically expandable clamping element.

28. The assembly according to claim 27, wherein said head part of said elastically expandable clamping element is formed with a passageway conduit, and said conduit is provided, on a channel wall thereof facing toward the front side of said first end portion, with a clamping face for engaging said clamping portion of said movable clamping element.

29. The assembly according to claim 27, wherein said movable clamping element is a hook-shaped lever pivotably mounted about an axis extending substantially perpendicular to said main mold parting plane, said lever carrying at least one actuating element for selectively tightening and loosening said clamping device, and said lever being formed with hook-like portion as a clamping portion having said clamping faces for the form-locking and force-locking and self-inhibiting frictional engagement.

30. The assembly according to claim 27, characterized in that the movable clamping element is embodied as a locking bolt that is displaceable parallel to the main mold parting plane and that has an actuating portion, with at least one actuating element for tightening and/or loosening the clamping device, and a clamping portion having the clamping faces intended for the form- and force-locking and self-inhibiting frictional engagement.

31. A baking oven for producing thin-walled molded articles from baking or pouring compositions that expand during the baking process, which comprises:
a pouring station for baking or pouring compositions, a discharge station distally of said pouring station delivering baked molded articles, an endless chain with a plurality of selectively closing baking tongs, said endless chain moving said baking tongs along a travel direction between said pouring station and said discharge station, through a baking chamber for baking the molded articles, around a first turning point preceding said discharge station and around a second turning point;
said baking tongs each having a lower tong part and an upper tong part and receiving selectively opening baking molds divisible about a main mold parting plane into an upper mold half and a lower mold half and externally actuated clamping devices maintaining said baking tongs closed during a baking process, each of said baking molds defining at least one cavity therein for molding and baking the molded articles;
said lower mold half of each of said baking molds being a female die divisible into two lower baking mold parts along a second mold parting plane extending substantially perpendicular to said main mold parting plane and being received in said lower tong part, said upper mold half being a male die received in said upper part, said upper part being movable perpendicularly to said main mold parting plane relative to said lower part for opening and closing said baking mold;
said baking molds being disposed in said baking tongs such that said second mold parting planes are oriented transversely to the travel direction, wherein in each of said baking tongs at least one of said two lower baking mold parts is movable back and forth in said lower tong part relative to said second mold parting plane;
mechanisms for selectively opening and closing said female dies, said mechanisms being disposed between respective said baking tongs and traveling with said baking tong chain, each of said mechanisms being activatable before reaching said first turning point and being deactivatable after passing said first turning point, said mechanisms upon passing through said first turning point converting changes in a spacing, parallel to the travel direction, between successive baking tongs, into movements of said lower baking mold parts relative to said second mold parting plane.

32. The oven according to claim 31, wherein each of said mechanisms disposed between respectively successive baking tongs within the baking tong chain is operatively associated with at least one of said lower baking mold parts of one of said two baking tongs.

33. The oven according to claim 31, wherein in each of said baking tongs, both lower baking mold parts are disposed in said lower tong part pivotally transversely to the travel direction.

34. The oven according to claim 31, which further comprises baking mold carriers disposed in each of said baking tongs, said baking mold carriers receiving said lower baking mold parts and being pivotable in said lower tong part transversely to the travel direction.

35. The oven according to claim 34, wherein each of said mechanisms disposed between two successive baking tongs in the travel direction includes at least one control strap spanning an interstice between said two baking tongs and is pivotable for activating and deactivating said mechanism, said control strap being pivotally connected to said one baking tong and being disposed for bringing into and out of engagement with a control bolt mounted on a lower baking mold part of the respectively other baking tong or said baking mold carrier thereof.

36. The oven according to claim 34, wherein each of said mechanisms disposed between two successive baking tongs includes at least one control strap spanning an interstice between two baking tongs being pivotable for activating and deactivating the movement mechanism, said control strap being pivotally connected to a rear lower baking mold part of a leading said baking tong in the travel direction, or to the baking mold carrier thereof, and being disposed to be brought into and out of engagement with a control bolt mounted on a forward lower baking mold part of a trailing baking tong in the travel direction, or on said baking mold carrier thereof.

37. The oven according to claim 35, wherein said control strap is elongated in the travel direction and protrudes with a rear end thereof, opposite the travel direction, past said control bolt of a respectively trailing baking tong, and wherein said control strap is formed with elongated guide conduit, which includes two interconnected paths of motion, of mutually different length, for the control bolt, between which paths the control bolt is movable back and forth by pivoting of the control strap upon activation and deactivation of said mechanism.

38. The oven according to claim 37, wherein said two paths of motion are substantially parallel to one another in a longitudinal direction of said guide conduit, wherein the relatively longer path of motion is open at the rear end of said control strap in the travel direction, and the relatively shorter path of motion extends in the travel direction from a front stop face for the control bolt, the stop face pointing rearward counter to the travel direction and being formed on the front end of a guide conduit, and reaching to a frontward-pointing, rear stop face on a step formed between the two ends of the guide conduit.

39. The oven according to claim 38, wherein the relatively shorter path of motion, a spacing between the front stop face and the rear stop face is greater than a diameter of said control bolt.

40. The oven according to claim 35, wherein each of said mechanisms includes a control mechanism for forced pivoting of said control straps upon activation or deactivation of said mechanism.

41. The oven according to claim 40, wherein said control mechanism for deactivating said control strap includes a control face operatively associated with said control strap and attached to an underside of said upper tong part of a trailing baking tong, and wherein said control face can be brought into engagement with a top side of said control strap.

42. The oven according to claim 40, wherein said control mechanism for activating said control strap includes a thrust rod, operatively associated with said control strap and displaceable in said lower tong part of the trailing baking tong at right angles to said main mold parting plane thereof, said thrust rod being capable of being brought into engagement with the underside of said control strap.

43. The oven according to claim 42, wherein said control mechanism for activating said control strap further includes a stationary cam rail operatively associated with said thrust rod and inclined relative to a travel path of said baking tongs, said cam rail being disposed in the oven preceding said first chain turning point in the travel direction.

44. In a method for baking cone-shaped or cup-shaped molded articles from baking or pouring compositions that expand during the baking process, a method for removing the baked molded articles from baking molds of selectively opening and closing baking tongs of an endless baking tong chain in a baking oven, wherein upper mold halves of the baking molds which are embodied as male dies with molding cores are received in upper tong parts of the baking tongs and lower mold halves of the baking molds which are embodied as female dies formed with mold recesses are received in lower tong parts of the baking tongs, the lower mold halves being separated from the respective upper mold halves along a main mold parting plane and being divisible into two lower baking mold parts along a second mold parting plane perpendicular to the main mold parting plane, and wherein the baking tongs, interconnected to form an endless baking tong chain, travel along a given travel direction through a pouring station for the baking or pouring compositions, through a baking chamber for baking the molded articles, and through a discharge station for the baked molded articles, through a rear turning point of the baking tong chain disposed in the baking chamber in which they travel from an upper transport plane via a rear turning point of the baking tong chain disposed in the baking chamber into a lower transport plane and back into the upper transport plane via a forward turning point of the baking tong chain preceding the discharge station in the travel direction, wherein the baking tongs on passing through the turning points are each turned upside down, the method for removing which comprises: prior to removing the baked molded articles, opening the baking tongs and the baking molds at the main mold parting plane on passing through the forward turning point, with the baking tongs oriented upside down, moving each of the mold cores of the male dies out of the baked molded articles that remain in the mold recesses of the female die by a fraction of a height of the molded articles with the upper tong part traveling rectilinearly along the second mold parting plane of the respective baking mold; subsequently opening the female dies by parting their lower baking mold parts, and catching the baked molded articles on the mold cores of the male dies protruding into them; completely moving each of the baked molded articles, together with the mold cores of the male dies protruding into them, out of the mold recesses of the female die with the respective upper tong part traveling rectilinearly along the second mold parting plane of the respective baking mold; on passing through the upper half of the forward turning point of the baking tong chain, causing the baked molded articles to separate by gravity from the mold cores of the male dies that protrude into them and remain in the second mold parting plane of the respective baking mold, and catching them by their ends toward the female dies on a guide face disposed outside the baking molds between the path of the upper tong parts and the path of the lower tong parts; further transporting the baked molded articles supported on the guide face along the guide face and outwardly past the guide face by means of the mold cores of the male dies that protrude into them and remain in the second mold parting plane of the respective baking molds; and discharging the baked molded articles from the baking molds on reaching the discharge station, and transferring the baked molded articles onto a transport device leading laterally out of the baking tong chain between the path of the upper tong parts and the path of the lower tong parts.

45. The method according to claim 44, disposing an arc-shaped stationary guide baffle between the path of the upper tong parts and the path of the lower tong parts, and catching and supporting the baked molded articles on passing through the upper half of the forward turning point of the baking tong chain with the stationary guide baffle.

46. The method according to claim 44, which further comprises blowing air in between the baked molded articles and the mold cores of the male dies protruding into them upon passing through the upper half of the forward turning point of the baking tong chain, for separating the baked molded articles from the mold cores of the male dies.

47. A baking tong assembly for producing thin-walled molded articles of baking or pouring compositions that expand during the baking process, for integration in an endless baking tong chain which travels along a travel direction in a baking oven, which comprises: a baking tong, a baking mold received in said baking tong, said baking mold having an upper mold half and a lower mold half separatable from said upper mold half by a main mold parting plane, said baking mold defines at least one molding and baking cavity therein for the thin-walled molded articles, said baking tong having a lower tong part receiving said lower mold half and an upper tong part receiving said upper mold half and being movable relative to said lower tong part for selectively opening and closing said baking mold, and at least one externally actuatable device for keeping said baking mold closed during a baking process;

a single guide sword extending perpendicularly to the main mold parting plane of said baking mold for guiding said upper tong part upon opening and closing of said baking mold, said guide sword being disposed inside said baking tong transversely to the travel direction laterally beside said baking mold and having an inner guide path adjacent said baking mold, and an outer guide path spaced apart therefrom transversely to the travel direction; said upper tong part having an upper guide head protruding laterally beyond said upper mold half transversely to the travel direction and being rigidly connected with said guide sword; and said lower tong part having a lower guide head protruding laterally beyond said lower mold half transversely to the travel direction, said guide sword being displaceably guided in said lower guide head with said inner and outer guide paths perpendicularly to said main mold parting plane.

48. The assembly according to claim 47, wherein said inner guide path of said guide sword is formed with two inner guide faces, oriented away from one another and toward said baking mold and extending longitudinally of the guide sword and obliquely to the travel direction; said outer guide path of said guide sword being formed with two outer guide faces, oriented away from one another and from said baking mold, and extending longitudinally of said guide sword and obliquely to the travel direction; and including inner guide rollers in engagement with said inner guide faces and outer guide rollers in engagement with said outer guide faces, said rollers being supported in said lower guide head with their respective axes located in at least two planes spaced apart from said main mold parting plane by respectively different distances and parallel to said main mold parting plane.

49. The assembly according to claim 48, wherein said guide rollers disposed in the lower guide head are conical and each having a pivot axis transverse to the travel direction and parallel to said main mold parting plane.

50. The assembly according to claim 49, which further comprises a common roller body supporting one conical inner guide roller and one conical outer guide roller in each plane parallel to said main mold parting plane, said common roller body being rotatably supported in said lower guide head about an axis extending transversely to the travel direction.

51. The assembly according to claim 50, wherein one of said guide rollers on each one roller body is formed integrally therewith, and the respectively other guide roller is disposed axially displaceably thereon.

52. The baking tong according to claim 49, wherein all but one of said conical guide rollers on said lower guide head are axially nondisplaceable, and the one conical guide roller on said lower guide head is supported axially resiliently, or said tong parts, or being pivotally secured to one of said mold halves or one of said tong parts while being firmly clampable to the other one of said mold halves or the other one of said tong parts, respectively;

said clamping device further including an outer clamping face formed on the other of said mold halves or on the other one of said tong parts, and said clamping element having one clamping portion that can be brought into force-locking and frictional engagement with said outer clamping face of said clamping device; and said clamping element, while its clamping portion is in force-locking and self-inhibiting frictional engagement with the respective outer clamping face of the clamping device, being displaceable along said clamping face until the play of motion is eliminated and, further, until a prestressing force is brought to bear by an elastic expansion of said clamping element.

53. A baking tong assembly for producing thin-walled molded articles from compositions that expand during a baking process, comprising:

a baking mold having an upper mold half and a lower mold half separated from said upper mold half by a main mold parting plane and defining therewith a baking cavity for molding and baking thin-walled molded articles therein;

a baking tong having a lower tong part receiving said lower mold half and an upper tong part receiving said upper mold half, said upper tong part being movable relative to said lower tong part for selectively opening and closing said baking mold;

a clamping device for clamping said baking mold parts of the closed baking mold by firmly pressing together at least said upper and lower tong parts with a predetermined prestressing force;

said clamping device including at least one elastically expanding clamping element which is movable when said baking mold is closed, said at least one clamping element being stationarily clampable to said upper and lower tong parts for clamping said clamping device and for introducing the prestressing force.

54. The assembly according to claim 1, wherein said clamping device further includes an outer clamping face formed on the other of said mold halves, and said clamping element having one clamping portion that can be brought into force-locking and frictional engagement with said outer clamping face of said clamping device; and said clamping element, while its clamping portion is in force-locking and self-inhibiting frictional engagement with the respective outer clamping face of the clamping device, being displaceable along said clamping face until a play of motion is eliminated and, further, until the prestressing force is brought to bear by an elastic expansion of said clamping element.

55. The assembly according to claim 53, wherein said clamping device further includes an outer clamping face formed on the other one of said tong parts, and said clamping element having one clamping portion that can be brought into force-locking and frictional engagement with said outer clamping face of said clamping device; and said clamping element, while its clamping portion is in force-locking and self-inhibiting frictional engagement with the respective outer clamping face of the clamping device, being displaceable along said clamping face until a play of motion is eliminated and, further, until the prestressing force is brought to bear by an elastic expansion of said clamping element.

* * * * *

UNITED STATES PATENT AND TRADEMARK OFFICE
CERTIFICATE OF CORRECTION

PATENT NO : 5,955,129
DATED : September 21, 1999
INVENTOR(S) : Franz Haas Sr. et al.

It is certified that error appears in the above-identified patent and that said Letters Patent is hereby corrected as shown below:

On the title page,
Item [86] should read as follows:

§ 371 Date:  May 16, 1997
§ 102(e) Date:  May 16, 1997

Signed and Sealed this

Thirty-first Day of October, 2000

Attest:

Q. TODD DICKINSON

Attesting Officer

Director of Patents and Trademarks